(12) United States Patent
Li et al.

(10) Patent No.: US 11,694,316 B2
(45) Date of Patent: *Jul. 4, 2023

(54) METHOD AND APPARATUS FOR DETERMINING EXPERIENCE QUALITY OF VR MULTIMEDIA

(71) Applicant: Huawei Technologies Co., Ltd., Shenzhen (CN)

(72) Inventors: Yi Li, Beijing (CN); Haoping Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

This patent is subject to a terminal disclaimer.

(21) Appl. No.: 17/381,936

(22) Filed: Jul. 21, 2021

(65) Prior Publication Data

US 2021/0350518 A1    Nov. 11, 2021

Related U.S. Application Data

(63) Continuation of application No. 16/678,245, filed on Nov. 8, 2019, now Pat. No. 11,138,715, which is a
(Continued)

(30) Foreign Application Priority Data

May 8, 2017    (CN) .......................... 201710318426.5

(51) Int. Cl.
*G10L 25/60* (2013.01)
*G06T 7/00* (2017.01)

(52) U.S. Cl.
CPC ............ *G06T 7/0002* (2013.01); *G10L 25/60* (2013.01); *G06T 2207/30168* (2013.01)

(58) Field of Classification Search
CPC ......... G06T 7/0002; G06T 2207/30168; G06T 19/006; G01L 25/60; H04N 13/388
See application file for complete search history.

(56) References Cited

U.S. PATENT DOCUMENTS

| 9,720,228 B2 * | 8/2017 | Harrison .............. G02B 3/0056 |
| 2002/0047987 A1 * | 4/2002 | Massengill ........ G02B 27/0172 351/204 |

(Continued)

FOREIGN PATENT DOCUMENTS

| CN | 101853522 A | 10/2010 |
| CN | 101889442 A | 11/2010 |

(Continued)

OTHER PUBLICATIONS

Hands, D., et al., "A Basic Multimedia Quality Model," IEEE Transactions on Multimedia, IEEE Service Center, US, vol. 6, No. 6, Dec. 1, 2004, XP011122194, 11 pages.

(Continued)

*Primary Examiner* — Said Broome
(74) *Attorney, Agent, or Firm* — Conley Rose, P.C.

(57) ABSTRACT

A method for determining experience quality of virtual reality (VR) multimedia includes, in a process of playing VR multimedia, obtaining a first sensory parameter, a second sensory parameter, and a third sensory parameter of the VR multimedia, where the first sensory parameter, the second sensory parameter, and the third sensory parameter are obtained by performing sampling separately according to at least two same perceptual dimensions, and are respectively parameters that affect fidelity experience, enjoyment experience, and interaction experience, and determining a mean opinion score (MOS) of the VR multimedia based on the first sensory parameter, the second sensory parameter, and the third sensory parameter of the VR multimedia. Because
(Continued)

the third sensory parameter is a parameter that affects the interaction experience, an interaction feature of the VR multimedia is considered.

32 Claims, 14 Drawing Sheets

Related U.S. Application Data continuation of application No. PCT/CN2017/120449, filed on Dec. 31, 2017.

(56) References Cited

U.S. PATENT DOCUMENTS

| | | | |
|---|---|---|---|
| 2015/0080675 | A1 | 3/2015 | Shin |
| 2016/0258758 | A1* | 9/2016 | Houston ............... G01D 5/145 |
| 2017/0006343 | A1 | 1/2017 | Miller et al. |

FOREIGN PATENT DOCUMENTS

| | | | |
|---|---|---|---|
| CN | 102685790 | A | 9/2012 |
| CN | 102868666 | A | 1/2013 |
| JP | H07210661 | A | 8/1995 |
| JP | 2009272961 | A | 11/2009 |
| JP | 2012520603 | A | 9/2012 |
| JP | 2014182719 | A | 9/2014 |
| JP | 2017538990 | A | 12/2017 |
| KR | 20150031361 | A | 3/2015 |
| KR | 101716770 | B1 | 3/2017 |

OTHER PUBLICATIONS

You, J., "Perceptual-based quality assessment for audio visual services: A survey," Signal Processing. Image Communication, Elsevier Science Publishers, Amsterdam, NL, vol. 25, No. 7, Aug. 1, 2010, XP027210099, 20 pages.

Song, J., et al., "QOE evaluation of video services considering users" behavior, IEEE International Conference on Multimedia and Expo (ICME), IEEE, Jul. 14, 2014, XP032639316, 6 pages.

Sutcliffe, A., et al., "Heuristic evaluation of virtual reality applications," Interacting with computers, vol. 16, Issue 4, Jun. 20, 2004, pp. 831-849.

Ronkko, J., et al., "Multimodal astronaut virtual training prototype," Int. J. Human-Computer Studies, Sep. 29, 2005, pp. 182-191.

Fang, J., "Psychological Evaluation of Design Effect in Virtual Reality," Master"s Degree Thesis of Shandong University Apr. 12, 2009, 103 pages.

Partial Translation of Fang, J., "Psychological Evaluation of Virtual Reality Design Effect," Master"s Degree Thesis of Shandong University Apr. 12, 2009, 10 pages.

Song, J., et al., "QoE Evaluation of Multimedia Services Based on Audiovisual Quality and User Interest," IEEE Transactions on Multimedia, vol. 18, No. 3, Mar. 2016, pp. 444-457.

"Series P: Telephone Transmission Quality, Telephone Installations, Local Line Networks, Audiovisual quality in multimedia services, Subjective video quality assessment methods for multimedia applications," ITU-T P.910, Apr. 2008, 42 pages.

"Series P: Terminals and Subjective and Objective Assessment Methods, Models and tools for quality assessment of streamed media, Parametric non-intrusive assessment of audiovisual media streaming quality, Amendment 2: New Appendix III—Use of ITU-T P.1201 for non-adaptive, progressive download type media streaming," ITU-T P.1201, Dec. 2013, 28 pages.

Toshiko Tominaga et al., Quality of Experience Assessment Methods for Cloud Gaming, IEICE (The Institute of Electronics, Information, and Communication Engineers) Technical Report, vol. 115, No. 327, Nov. 19, 2015, with the English Abstract, 7 pages.

\* cited by examiner

If a current time reaches a sampling time of a first sensory parameter of VR multimedia, and a network media event and an interactive media event occur at the current time, determine a fidelity experience score of the VR multimedia based on the first sensory parameter corresponding to the current time, determine an enjoyment experience score of the VR multimedia based on a second sensory parameter corresponding to the current time, the currently determined fidelity experience score, and a MOS of the VR multimedia at an end of a previous unit time period, and determine an interaction experience score of the VR multimedia based on a third sensory parameter corresponding to the current time ~ 601b Use the fidelity experience score, the enjoyment experience score, and the interaction experience score that are determined at the current time, as input parameters to calculate a MOS of the VR multimedia using a preset VR multimedia MOS calculation model ~ 602b

FIG. 6B

Determine an enjoyment experience score and an interaction experience score of VR multimedia using a unit time period as a unit ~ 601c Use a fidelity experience score recently determined before a current time, and the enjoyment experience score and the interaction experience score that are determined at the current time, as input parameters to calculate a MOS of the VR multimedia using a preset VR multimedia MOS calculation model ~ 602c

FIG. 6C

If a current time reaches a sampling time of a first sensory parameter of VR multimedia, and a network media event and an interactive media event occur at the current time, determine a fidelity experience score of the VR multimedia in a perceptual dimension based on a parameter that is obtained by performing sampling according to the perceptual dimension in the first sensory parameter corresponding to the current time, determine an enjoyment experience score of the VR multimedia in the perceptual dimension based on a parameter that is obtained by performing sampling according to the perceptual dimension in a second sensory parameter corresponding to the current time, the currently determined fidelity experience score in the perceptual dimension, and a MOS of the VR multimedia at an end of a previous network media event, and determine an interaction experience score of the VR multimedia based on a parameter that is obtained by performing sampling according to the perceptual dimension in a third sensory parameter corresponding to the current time ⸺ 801b Use the fidelity experience score, the enjoyment experience score, and the interaction experience score in the perceptual dimension that are determined at the current time, as input parameters to calculate an experience score of the VR multimedia in the perceptual dimension using a preset VR multimedia experience score calculation model in the perceptual dimension ⸺ 802b

FIG. 8B

Determine an enjoyment experience score and an interaction experience score in a perceptual dimension using an event as a unit ⸺ 801c Use a fidelity experience score in the perceptual dimension that is recently determined before a current time, and the enjoyment experience score and the interaction experience score in the perceptual dimension that are determined at the current time, as input parameters to calculate a MOS of VR multimedia in the perceptual dimension using a preset VR multimedia MOS calculation model in the perceptual dimension ⸺ 802c

FIG. 8C

If a current time reaches a sampling time of a first sensory parameter of VR multimedia, and a network media event and an interactive media event occur at the current time, determine a fidelity experience score of the VR multimedia in a perceptual dimension based on a parameter that is obtained by performing sampling according to the perceptual dimension in the first sensory parameter corresponding to the current time, determine an enjoyment experience score of the VR multimedia in the perceptual dimension based on a parameter that is obtained by performing sampling according to the perceptual dimension in a second sensory parameter corresponding to the current time, the currently determined fidelity experience score in the perceptual dimension, and a MOS of the VR multimedia at an end of a previous unit time period, and determine an interaction experience score of the VR multimedia based on a parameter that is obtained by performing sampling according to the perceptual dimension in a third sensory parameter corresponding to the current time ~901b Use the fidelity experience score, the enjoyment experience score, and the interaction experience score in the perceptual dimension that are determined at the current time, as input parameters to calculate an experience score of the VR multimedia in the perceptual dimension using a preset VR multimedia experience score calculation model in the perceptual dimension ~902b

FIG. 9B

Determine an enjoyment experience score and an interaction experience score of VR multimedia in a perceptual dimension using a unit time period as a unit ~901c Use a fidelity experience score in the perceptual dimension that is recently determined before a current time in the current unit time period, and the enjoyment experience score and the interaction experience score in the perceptual dimension that are determined at the current time, as input parameters to calculate a MOS of the VR multimedia in the perceptual dimension using a preset VR multimedia MOS calculation model in the perceptual dimension ~902c

FIG. 9C

METHOD AND APPARATUS FOR DETERMINING EXPERIENCE QUALITY OF VR MULTIMEDIA

CROSS-REFERENCE TO RELATED APPLICATIONS

This application is a continuation of U.S. patent application Ser. No. 16/678,245, filed on Nov. 8, 2019, which is a continuation of International Patent Application No. PCT/CN2017/120449 filed on Dec. 31, 2017, which claims priority to Chinese Patent Application No. 201710318426.5 filed on May 8, 2017. All of the aforementioned patent applications are hereby incorporated by reference in their entireties.

TECHNICAL FIELD

This application relates to the field of virtual reality (VR) technologies, and in particular, to a method and an apparatus for determining experience quality of VR multimedia.

BACKGROUND

VR multimedia is multimedia for which a plurality of cameras and sound capture devices are used to perform panoramic capture and reproduction of a real environment or a technology such as computer animation (CG) or a virtual engine is used to produce a virtual environment comparable to a real environment to implement a display function in three-dimensional space. When a user watches VR multimedia, the user may place, in a VR device, a terminal used for playing the VR multimedia, watch a video image from any angle such as up, down, left, and right using the VR device that the user wears, and listen to an audio that is played synchronously with the VR multimedia. In a process of enjoying the VR multimedia, the user may be completely immersed in a virtual environment of the VR multimedia as in a real environment. In addition, the video image presented by the VR multimedia and the audio that is synchronously played change as a body posture or an action of the user changes. To be specific, when the body posture or the action of the user changes, the terminal may obtain a corresponding behavioral parameter, and process the action parameter. Therefore, the video image presented by the VR multimedia and the audio that is synchronously played are adjusted in real time based on a processing result. Therefore, it can be seen that, different from conventional multimedia, the VR multimedia has features of interaction, immersion, and multi-sense integration. In an actual application, to better improve user experience of the VR multimedia, user experience quality of the VR multimedia needs to be determined.

In a related art, a method for determining experience quality of conventional multimedia is used to determine experience quality of VR multimedia. Further, on one hand, a mean opinion score (MOS) video (MOSV) is obtained through calculation based on parameters such as content complexity, a bit rate per pixel, a coding type, a resolution, a video pause rate, and a packet loss rate of the VR multimedia. On the other hand, a MOS audio (MOSA) is obtained through calculation based on parameters such as a bit rate, a coding type, and a packet loss rate of an audio. After the MOSV and the MOSA are obtained through calculation, weighting operations are performed on the MOSV and the MOSA based on different weights. In this way, a MOS of the VR multimedia is obtained, and the experience quality of the VR multimedia is determined based on the MOS that is obtained through calculation.

However, because the VR multimedia has features different from the conventional multimedia, accuracy of determining the experience quality of the VR multimedia according to the method for determining experience quality of conventional multimedia is relatively low, and therefore user experience of the VR multimedia cannot be better improved.

SUMMARY

To resolve a problem that accuracy of determining experience quality of VR multimedia in the related art is relatively low, this application provides a method and an apparatus for determining experience quality of VR multimedia. The technical solutions are as follows.

According to a first aspect, a method for determining experience quality of VR multimedia is provided, where in a process of playing VR multimedia, the method includes obtaining a first sensory parameter, a second sensory parameter, and a third sensory parameter of the VR multimedia, where the first sensory parameter, the second sensory parameter, and the third sensory parameter are obtained by performing sampling separately according to at least two same perceptual dimensions, the at least two perceptual dimensions include a visual dimension and an acoustic dimension, and the first sensory parameter, the second sensory parameter, and the third sensory parameter are respectively parameters that affect fidelity experience, enjoyment experience, and interaction experience, and determining a MOS of the VR multimedia based on the first sensory parameter, the second sensory parameter, and the third sensory parameter of the VR multimedia.

It should be noted that, in addition to the visual dimension and the acoustic dimension, the at least two perceptual dimensions may further include other dimensions, such as a feedback dimension, a tactile dimension and an olfactory dimension. In addition, the first sensory parameter, the second sensory parameter, and the third sensory parameter are all sampled based on the same perceptual dimensions. In addition, the first sensory parameter, the second sensory parameter, and the third sensory parameter all include at least one parameter, and sampling periods for sampling the first sensory parameter, the second sensory parameter, and the third sensory parameter may be the same or may be different.

In this application, the MOS of the VR multimedia is determined based on the first sensory parameter, the second sensory parameter, and the third sensory parameter of the VR multimedia, but the first sensory parameter, the second sensory parameter, and the third sensory parameter are respectively parameters that affect fidelity experience, enjoyment experience, and interaction experience, that is, features such as immersion and interaction of the VR multimedia different from conventional multimedia are considered when the MOS of the VR multimedia is determined in this application. Therefore, the MOS of the VR multimedia that is obtained through calculation is more accurate.

Optionally, determining a MOS of the VR multimedia based on the first sensory parameter, the second sensory parameter, and the third sensory parameter of the VR multimedia includes determining a fidelity experience score, an enjoyment experience score, and an interaction experience score of the VR multimedia based on the first sensory parameter, the second sensory parameter, and the third sensory parameter of the VR multimedia, and using the determined fidelity experience score, enjoyment experience score, and interaction experience score as input parameters to calculate the MOS of the VR multimedia using a preset VR multimedia MOS calculation model.

When the MOS of the VR multimedia is determined based on the first sensory parameter, the second sensory parameter, and the third sensory parameter, first, the fidelity experience score may be determined based on the first sensory parameter, the enjoyment experience score may be determined based on the second sensory parameter, the interaction experience score may be determined based on the third sensory parameter, then the determined fidelity experience score, enjoyment experience score, and interaction experience score are used as the input parameters, and the MOS of the VR multimedia is obtained through calculation using the preset VR multimedia MOS calculation model.

Optionally, determining a fidelity experience score, an enjoyment experience score, and an interaction experience score of the VR multimedia based on the first sensory parameter, the second sensory parameter, and the third sensory parameter of the VR multimedia includes, if a current time reaches a sampling time of the first sensory parameter of the VR multimedia, and a network media event or an interactive media event occurs at the current time, determining the fidelity experience score of the VR multimedia based on the first sensory parameter corresponding to the current time, where the network media event is an event that occurs due to a change of a network condition, and the interactive media event is an event that occurs due to interaction with a user, and if the event that occurs at the current time is the network media event, determining the enjoyment experience score of the VR multimedia based on the second sensory parameter corresponding to the current time, the currently determined fidelity experience score, and a MOS of the VR multimedia at an end of a previous network media event, and setting the interaction experience score of the VR multimedia to an initial value, or if the event that occurs at the current time is the interactive media event, determining the interaction experience score of the VR multimedia based on the third sensory parameter corresponding to the current time, and setting the enjoyment experience score of the VR multimedia to an initial value.

Because the sampling periods of the first sensory parameter, the second sensory parameter, and the third sensory parameter are different, occasions of determining the fidelity experience score, the enjoyment experience score, and the interaction score based on the first sensory parameter, the second sensory parameter, and the third sensory parameter are also different. In addition, when the MOS of the VR multimedia is determined, the fidelity experience score, the enjoyment experience score, and the interaction experience score of the VR multimedia may be calculated using an event that occurs in the process of playing the VR multimedia as a unit, or using a preset unit time period as a unit.

When the MOS of the VR multimedia is determined using an event as a unit, if the current time reaches the sampling time of the first sensory parameter of the VR multimedia, and a network media event occurs at the current time but no interactive media event occurs at the same time, the fidelity experience score may be determined based on the first sensory parameter obtained through sampling. Because the enjoyment experience score is related to the fidelity experience score, when the fidelity experience score is updated, the enjoyment experience score is also updated correspondingly. Therefore, after the fidelity experience score is obtained through calculation, the enjoyment experience score may be determined. Because no interactive media event occurs, the interaction experience score may not be calculated.

Optionally, determining a fidelity experience score, an enjoyment experience score, and an interaction experience score of the VR multimedia based on the first sensory parameter, the second sensory parameter, and the third sensory parameter of the VR multimedia includes if a current time reaches a sampling time of the first sensory parameter of the VR multimedia, and a network media event and an interactive media event occur at the current time, determining the fidelity experience score of the VR multimedia based on the first sensory parameter corresponding to the current time, determining the enjoyment experience score of the VR multimedia based on the second sensory parameter corresponding to the current time, the currently determined fidelity experience score, and a MOS of the VR multimedia at an end of a previous network media event, and determining the interaction experience score of the VR multimedia based on the third sensory parameter corresponding to the current time.

It should be noted that, when the MOS of the VR multimedia is determined using an event as a unit, if the current time reaches the sampling time of the first sensory parameter of the VR multimedia, and a network media event and an interactive media event occur simultaneously at the current time, the terminal further needs to calculate the interaction experience score in addition to the fidelity experience score and the enjoyment experience score.

Optionally, determining a fidelity experience score, an enjoyment experience score, and an interaction experience score of the VR multimedia based on the first sensory parameter, the second sensory parameter, and the third sensory parameter of the VR multimedia includes, if a current time does not reach a sampling time of the first sensory parameter of the VR multimedia, and a network media event occurs at the current time but no interactive media event occurs at the same time, and it is detected at the current time that the network media event is ended, determining the enjoyment experience score of the VR multimedia based on the second sensory parameter corresponding to the current time, a fidelity experience score recently determined before the current time, and a MOS of the VR multimedia at an end of a previous network media event, and setting the interaction experience score of the VR multimedia to an initial value, if the current time does not reach a sampling time of the first sensory parameter of the VR multimedia, and an interactive media event occurs at the current time but no network media event occurs at the same time, and it is detected at the current time that the interactive media event is ended, determining the interaction experience score of the VR multimedia based on the third sensory parameter corresponding to the current time, and setting the enjoyment experience score of the VR multimedia to an initial value, or if the current time does not reach a sampling time of the first sensory parameter of the VR multimedia, and a network media event and an interactive media event occur at the current time, and it is detected at the current time that the network media event and/or the interactive media event are/is ended, determining the enjoyment experience score of the VR multimedia based on the second sensory parameter corresponding to the current time, a fidelity experience score recently determined before the current time, and a MOS of the VR multimedia at an end of a previous network media event, and determining the interaction experience score of the VR multimedia based on the third sensory parameter corresponding to the current time, and correspondingly, using the determined fidelity experience score, enjoyment experience score, and interaction experience score as input parameters to calculate the MOS of the VR multimedia using a preset VR multimedia MOS calculation model includes using the fidelity experience score recently determined before the current time, and the enjoyment experience score and the interaction experience score that are determined at the current time, as the input parameters to calculate the MOS of the VR multimedia using the preset VR multimedia MOS calculation model.

It should be noted that, when the MOS of the VR multimedia is determined using an event as a unit, if the current time does not reach the sampling time of the first sensory parameter of the VR multimedia, depending on whether a network media event and an interactive media event occur at the current time and whether the current time is an end time corresponding to an event that occurs, different manners may be used to determine the enjoyment experience score and the interaction experience score, and further determine the MOS of the VR multimedia. Because the current time is not the sampling time of the first sensory parameter, the fidelity experience score is not calculated. Therefore, when the enjoyment experience score is determined, the fidelity experience score recently determined before the current time may be sampled as an input parameter.

Optionally, the second sensory parameter includes a type of a network media event and a first duration, and the first duration is a duration of the network media event, and determining the enjoyment experience score of the VR multimedia based on the second sensory parameter corresponding to the current time, the currently determined fidelity experience score, and a MOS of the VR multimedia at an end of a previous network media event includes, when the type of the network media event included in the second sensory parameter corresponding to the current time is a play event, using the first duration included in the second sensory parameter corresponding to the current time, the currently determined fidelity experience score, and the MOS of the VR multimedia at the end of the previous network media event as input parameters to calculate the enjoyment experience score of the VR multimedia using an enjoyment experience score calculation model corresponding to the play event, when the type of the network media event included in the second sensory parameter corresponding to the current time is a freeze event, using the first duration included in the second sensory parameter corresponding to the current time, the currently determined fidelity experience score, and the MOS of the VR multimedia at the end of the previous network media event as input parameters to calculate the enjoyment experience score of the VR multimedia using an enjoyment experience score calculation model corresponding to the freeze event, or when the type of the network media event included in the second sensory parameter corresponding to the current time is a media quality change event, determining a difference between the currently determined fidelity experience score and a fidelity experience score recently determined before the current time, as the enjoyment experience score of the VR multimedia.

It should be noted that, the second sensory parameter includes the type of the network media event and the corresponding first duration. Because there may be a plurality of types of network media events, for different network media events, different calculation models may be used to determine corresponding enjoyment experience scores.

Optionally, the third sensory parameter includes a type of an interactive media event and a second duration, and the second duration is a duration of the interactive media event, and determining the interaction experience score of the VR multimedia based on the third sensory parameter corresponding to the current time includes selecting, from a plurality of stored interaction experience score calculation models, an interaction experience score calculation model corresponding to the type of the interactive media event included in the third sensory parameter corresponding to the current time, and using the type of the interactive media event and the second duration included in the third sensory parameter corresponding to the current time, as input parameters to calculate the interaction experience score of the VR multimedia using the selected interaction experience score calculation model.

It should be noted that, the third sensory parameter includes the type of the interactive media event and the corresponding second duration. Because there may be a plurality of types of interactive media events, for different interactive media events, different calculation models may be used to determine corresponding interaction experience scores.

Optionally, determining a fidelity experience score, an enjoyment experience score, and an interaction experience score of the VR multimedia based on the first sensory parameter, the second sensory parameter, and the third sensory parameter of the VR multimedia includes, if a current time reaches a sampling time of the first sensory parameter of the VR multimedia, and a network media event or an interactive media event occurs at the current time, determining the fidelity experience score of the VR multimedia based on the first sensory parameter corresponding to the current time, and if the event that occurs at the current time is the network media event, determining the enjoyment experience score of the VR multimedia based on the second sensory parameter corresponding to the current time, the currently determined fidelity experience score, and a MOS of the VR multimedia at an end of a previous unit time period, and setting the interaction experience score of the VR multimedia to an initial value, or if the event that occurs at the current time is the interactive media event, determining the interaction experience score of the VR multimedia based on the third sensory parameter corresponding to the current time, and setting the enjoyment experience score of the VR multimedia to an initial value.

It should be noted that, when the MOS of the VR multimedia is determined, a unit time period may be further used as a unit. In this case, if the current time reaches the sampling time of the first sensory parameter of the VR multimedia, and a network media event occurs at the current time but no interactive media event occurs at the same time, the fidelity experience score may be determined based on the first sensory parameter obtained through sampling. Because the enjoyment experience score is related to the fidelity experience score, when the fidelity experience score is updated, the enjoyment experience score is also updated correspondingly. Therefore, after the fidelity experience score is obtained through calculation, the enjoyment experience score may be determined. In addition, the MOS of the VR multimedia at the end of the previous unit event period may be used as an input parameter for calculating the enjoyment experience score. This is equivalent to considering influence of previous play of the VR multimedia, and therefore is more comprehensive and more accurate. Because no interactive media event occurs, the interaction experience score may not be calculated.

Optionally, determining a fidelity experience score, an enjoyment experience score, and an interaction experience score of the VR multimedia based on the first sensory parameter, the second sensory parameter, and the third sensory parameter of the VR multimedia includes, if a current time reaches a sampling time of the first sensory parameter of the VR multimedia, and a network media event and an interactive media event occur at the current time, determining the fidelity experience score of the VR multimedia based on the first sensory parameter corresponding to the current time, determining the enjoyment experience score of the VR multimedia based on the second sensory parameter corresponding to the current time, the currently determined fidelity experience score, and a MOS of the VR multimedia at an end of a previous unit time period, and determining the interaction experience score of the VR multimedia based on the third sensory parameter corresponding to the current time.

It should be noted that, when the MOS of the VR multimedia is determined using a unit time period as a unit, if the current time reaches the sampling time of the first sensory parameter of the VR multimedia, and a network media event and an interactive media event occur simultaneously at the current time, the terminal further needs to calculate the interaction experience score in addition to the fidelity experience score and the enjoyment experience score.

Optionally, determining a fidelity experience score, an enjoyment experience score, and an interaction experience score of the VR multimedia based on the first sensory parameter, the second sensory parameter, and the third sensory parameter of the VR multimedia includes if a current time does not reach a sampling time of the first sensory parameter of the VR multimedia, and a network media event occurs at the current time but no interactive media event occurs at the same time, and it is detected at the current time that the network media event is ended or that a unit time period is ended, determining the enjoyment experience score of the VR multimedia based on the second sensory parameter corresponding to the current time, a fidelity experience score recently determined before the current time, and a MOS of the VR multimedia at an end of a previous unit time period, and setting the interaction experience score of the VR multimedia to an initial value, if the current time does not reach a sampling time of the first sensory parameter of the VR multimedia, and an interactive media event occurs at the current time but no network media event occurs at the same time, and it is detected at the current time that the interactive media event is ended or that the unit time period is ended, determining the interaction experience score of the VR multimedia based on the third sensory parameter corresponding to the current time, and setting the enjoyment experience score of the VR multimedia to an initial value, or if the current time does not reach a sampling time of the first sensory parameter of the VR multimedia, and a network media event and an interactive media event occur at the current time, and it is detected at the current time that the unit time period is ended, or if the current time does not reach a sampling time of the first sensory parameter of the VR multimedia, and a network media event and an interactive media event occur at the current time, and it is detected at the current time that the network media event and/or the interactive media event are/is ended and it is not detected that the unit time period is ended, determining the enjoyment experience score of the VR multimedia based on the second sensory parameter corresponding to the current time, a fidelity experience score recently determined before the current time in the current unit time period, and a MOS of the VR multimedia at an end of a previous unit time period, and determining the interaction experience score of the VR multimedia based on the third sensory parameter corresponding to the current time, and correspondingly, using the determined fidelity experience score, enjoyment experience score, and interaction experience score as input parameters to calculate the MOS of the VR multimedia using a preset VR multimedia MOS calculation model includes using the fidelity experience score recently determined before the current time in the current unit time period, and the enjoyment experience score and the interaction experience score that are determined at the current time, as the input parameters to calculate the MOS of the VR multimedia using the preset VR multimedia MOS calculation model.

When the MOS of the VR multimedia is determined using a unit time period as a unit, if the current time does not reach the sampling time of the first sensory parameter of the VR multimedia, depending on whether a network media event and an interactive media event occur at the current time, whether the current time is an end time corresponding to an event that occurs, and whether the current time is an end time of the unit time period, different manners may be used to determine the enjoyment experience score and the interaction experience score, and further determine the MOS of the VR multimedia. Because the current time is not the sampling time of the first sensory parameter, the fidelity experience score is not calculated. Therefore, when the enjoyment experience score is determined, the fidelity experience score recently determined before the current time may be sampled as an input parameter.

Optionally, the first sensory parameter includes video attribute information and a video parameter in the visual dimension, and audio attribute information and an audio parameter in the acoustic dimension, and determining the fidelity experience score of the VR multimedia based on the first sensory parameter corresponding to the current time includes selecting, from a plurality of stored visual fidelity experience score calculation models, a visual fidelity experience score calculation model corresponding to the video attribute information included in the first sensory parameter corresponding to the current time, using the video parameter included in the first sensory parameter corresponding to the current time, as an input parameter to calculate a visual fidelity experience score at the current time using the selected visual fidelity experience score calculation model, selecting, from a plurality of stored acoustic fidelity experience score calculation models, an acoustic fidelity experience score calculation model corresponding to the audio attribute information included in the first sensory parameter corresponding to the current time, using the audio parameter included in the first sensory parameter of the current time, as an input parameter to calculate an acoustic fidelity experience score at the current time using the selected acoustic fidelity experience score calculation model, and determining the fidelity experience score of the VR multimedia based on the visual fidelity experience score and the acoustic fidelity experience score at the current time.

It should be noted that, the first sensory parameter may include the visual attribute information and the video parameter in the visual dimension, and the acoustic attribute information and the acoustic parameter in the acoustic dimension. The visual fidelity experience score may be determined based on the visual attribute information and the video parameter. The acoustic fidelity experience score may be determined based on the acoustic attribute information and the acoustic parameter. Then the fidelity experience score may be obtained through calculation based on the determined visual fidelity experience score and acoustic fidelity experience score.

Optionally, the second sensory parameter includes a type of a network media event and a third duration, and the third duration is a duration of the network media event in a unit time period, and determining the enjoyment experience score of the VR multimedia based on the second sensory parameter corresponding to the current time, the currently determined fidelity experience score, and a MOS of the VR multimedia at an end of a previous unit time period includes, when the type of the network media event included in the second sensory parameter corresponding to the current time is a play event, using the third duration included in the second sensory parameter corresponding to the current time, the currently determined fidelity experience score, and the MOS of the VR multimedia at the end of the previous unit time period as input parameters to calculate the enjoyment experience score of the VR multimedia using an enjoyment experience score calculation model corresponding to the play event, when the type of the network media event included in the second sensory parameter corresponding to the current time is a freeze event, using the third duration included in the second sensory parameter corresponding to the current time, the currently determined fidelity experience score, and the MOS of the VR multimedia at the end of the previous unit time period as input parameters to calculate the enjoyment experience score of the VR multimedia using an enjoyment experience score calculation model corresponding to the freeze event, or when the type of the network media event included in the second sensory parameter corresponding to the current time is a media quality change event, determining a difference between the currently determined fidelity experience score and a fidelity experience score recently determined before the current time in a current unit time period, as the enjoyment experience score of the VR multimedia.

It should be noted that, when the MOS of the VR multimedia is determined using a unit time period as a unit, when the enjoyment experience score is determined, the corresponding enjoyment experience score may be determined based on the type of the network media event and the duration of the network media event in the unit time period that are included in the second sensory parameter.

Optionally, the third sensory parameter includes a type of an interactive media event and a fourth duration, and the fourth duration is a duration of the interactive media event in the unit time period, and determining the interaction experience score of the VR multimedia based on the third sensory parameter corresponding to the current time includes selecting, from a plurality of stored interaction experience score calculation models, an interaction experience score calculation model corresponding to the type of the interactive media event included in the third sensory parameter corresponding to the current time, and using the type of the interactive media event and the fourth duration included in the third sensory parameter corresponding to the current time, as input parameters to calculate the interaction experience score of the VR multimedia using the selected interaction experience score calculation model.

It should be noted that, when the MOS of the VR multimedia is determined using a unit time period as a unit, when the interaction experience score is determined, the corresponding interaction experience score may be determined based on the type of the interactive media event and the duration of the interactive media event in the unit time period that are included in the third sensory parameter.

Optionally, determining a MOS of the VR multimedia based on the first sensory parameter, the second sensory parameter, and the third sensory parameter of the VR multimedia includes, for each of the at least two perceptual dimensions, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia, using the fidelity experience score, the enjoyment experience score, and the interaction experience score of the VR multimedia in the perceptual dimension as input parameters to calculate an experience score of the VR multimedia in the perceptual dimension using a preset VR multimedia experience score calculation model in the perceptual dimension, and using experience scores of the VR multimedia in the at least two perceptual dimensions as input parameters to calculate an experience score of the VR multimedia using a preset VR multimedia MOS calculation model.

When the MOS of the VR multimedia is determined based on the first sensory parameter, the second sensory parameter, and the third sensory parameter, for each of the at least two perceptual dimensions, first, the fidelity experience score in the perceptual dimension may be determined based on a parameter that is obtained by performing sampling according to the perceptual dimension in the first sensory parameter, the enjoyment experience score in the perceptual dimension may be determined based on a parameter that is obtained by performing sampling according to the perceptual dimension in the second sensory parameter, and the interaction experience score in the perceptual dimension may be determined based on a parameter that is obtained by performing sampling according to the perceptual dimension in the third sensory parameter, and then the determined fidelity experience score, enjoyment experience score, and interaction experience score in the perceptual dimension are used as the input parameters, and the MOS of the VR multimedia in the perceptual dimension is obtained through calculation using the preset VR multimedia experience score calculation model in the perceptual dimension.

Optionally, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia includes, if a current time reaches a sampling time of the first sensory parameter of the VR multimedia, and a network media event or an interactive media event occurs at the current time, determining the fidelity experience score of the VR multimedia in the perceptual dimension based on a parameter that is obtained by performing sampling according to the perceptual dimension in the first sensory parameter corresponding to the current time, and if the event that occurs at the current time is the network media event, determining the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous network media event, and setting the interaction experience score of the VR multimedia in the perceptual dimension to an initial value, or if the event that occurs at the current time is the interactive media event, determining the interaction experience score of the VR multimedia in the perceptual dimension based on a parameter that is obtained by performing sampling according to the perceptual dimension in the third sensory parameter corresponding to the current time, and setting the enjoyment experience score of the VR multimedia in the perceptual dimension to an initial value.

Because the sampling periods of the first sensory parameter, the second sensory parameter, and the third sensory parameter are different, occasions of determining the fidelity experience score, the enjoyment experience score, and the interaction score in the perceptual dimension respectively based on the parameters that are obtained by performing sampling according to the perceptual dimension in the first sensory parameter, the second sensory parameter, and the third sensory parameter are also different. In addition, the fidelity experience score, the enjoyment experience score, and the interaction experience score of the VR multimedia in the perceptual dimension may be calculated using an event that occurs in the process of playing the VR multimedia as a unit, or using a preset unit time period as a unit.

When the fidelity experience score, the enjoyment experience score, and the interaction experience score of the VR multimedia in the perceptual dimension are determined using an event as a unit, if the current time reaches the sampling time of the first sensory parameter of the VR multimedia, and a network media event occurs at the current time but no interactive media event occurs at the same time, the fidelity experience score in the perceptual dimension may be determined based on the parameter that is obtained by performing sampling according to the perceptual dimension in the first sensory parameter obtained through sampling. Because the enjoyment experience score in the perceptual dimension is related to the fidelity experience score in the perceptual dimension, when the fidelity experience score in the perceptual dimension is updated, the enjoyment experience score in the perceptual dimension is also updated correspondingly. Therefore, after the fidelity experience score in the perceptual dimension is obtained through calculation, the enjoyment experience score in the perceptual dimension may be determined. Because no interactive media event occurs, the interaction experience score in the perceptual dimension may not be calculated.

Optionally, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia includes, if a current time reaches a sampling time of the first sensory parameter of the VR multimedia, and a network media event and an interactive media event occur at the current time, determining the fidelity experience score of the VR multimedia in the perceptual dimension based on a parameter that is obtained by performing sampling according to the perceptual dimension in the first sensory parameter corresponding to the current time, determining the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous network media event, and determining the interaction experience score of the VR multimedia based on a parameter that is obtained by performing sampling according to the perceptual dimension in the third sensory parameter corresponding to the current time.

It should be noted that, when the fidelity experience score, the enjoyment experience score, and the interaction experience score in the perceptual dimension are determined using an event as a unit, if the current time reaches the sampling time of the first sensory parameter of the VR multimedia, and a network media event and an interactive media event occur simultaneously at the current time, the terminal further needs to calculate the interaction experience score in the perceptual dimension, in addition to the fidelity experience score and the enjoyment experience score in the perceptual dimension.

Optionally, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia includes, if a current time does not reach a sampling time of the first sensory parameter of the VR multimedia, and a network media event occurs at the current time but no interactive media event occurs at the same time, and it is detected at the current time that the network media event is ended, determining the enjoyment experience score of the VR multimedia in the perceptual dimension based on a parameter that is obtained by performing sampling according to the perceptual dimension in the second sensory parameter corresponding to the current time, a fidelity experience score recently determined before the current time, and a MOS of the VR multimedia at an end of a previous network media event, and setting the interaction experience score of the VR multimedia in the perceptual dimension to an initial value, if the current time does not reach a sampling time of the first sensory parameter of the VR multimedia, and an interactive media event occurs at the current time but no network media event occurs at the same time, and it is detected at the current time that the interactive media event is ended, determining the interaction experience score of the VR multimedia in the perceptual dimension based on a parameter that is obtained by performing sampling according to the perceptual dimension in the third sensory parameter corresponding to the current time, and setting the enjoyment experience score of the VR multimedia in the perceptual dimension to an initial value, or if the current time does not reach a sampling time of the first sensory parameter of the VR multimedia, and a network media event and an interactive media event occur at the current time, and it is detected at the current time that the network media event and/or the interactive media event are/is ended, determining the enjoyment experience score of the VR multimedia in the perceptual dimension based on a parameter that is obtained by performing sampling according to the perceptual dimension in the second sensory parameter corresponding to the current time, a fidelity experience score in the perceptual dimension that is recently determined before the current time, and a MOS of the VR multimedia at an end of a previous network media event, and determining the interaction experience score of the VR multimedia in the perceptual dimension based on a parameter that is obtained by performing sampling according to the perceptual dimension in the third sensory parameter corresponding to the current time, and correspondingly, using the fidelity experience score, the enjoyment experience score, and the interaction experience score of the VR multimedia in the perceptual dimension as input parameters to calculate an experience score of the VR multimedia in the perceptual dimension using a preset VR multimedia experience score calculation model in the perceptual dimension includes using the fidelity experience score in the perceptual dimension that is recently determined before the current time, and the enjoyment experience score and the interaction experience score in the perceptual dimension that are determined at the current time, as the input parameters to calculate the experience score of the VR multimedia in the perceptual dimension using the preset VR multimedia experience score calculation model in the perceptual dimension.

It should be noted that, when the fidelity experience score, the enjoyment experience score, and the interaction experience score in the perceptual dimension are determined using an event as a unit, if the current time does not reach the sampling time of the first sensory parameter of the VR multimedia, depending on whether a network media event and an interactive media event occur at the current time and whether the current time is an end time corresponding to an event that occurs, different manners may be used to determine the enjoyment experience score and the interaction experience score in the perceptual dimension, and further determine the experience score of the VR multimedia in the perceptual dimension. Because the current time is not the sampling time of the first sensory parameter, the fidelity experience score in the perceptual dimension is not calculated. Therefore, when the enjoyment experience score in the perceptual dimension is determined, the fidelity experience score recently determined before the current time may be sampled as an input parameter.

Optionally, the parameter that is obtained by performing sampling according to the perceptual dimension in the second sensory parameter includes a type of a network media event that occurs in the perceptual dimension and a corresponding fifth duration, and the corresponding fifth duration is a duration of the network media event in the perceptual dimension, and determining the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous network media event includes, when the type of the network media event included in the parameter that is obtained by performing sampling according to the perceptual dimension in the second sensory parameter corresponding to the current time is a play event, using the fifth duration included in the parameter that is obtained by performing sampling according to the perceptual dimension in the second sensory parameter corresponding to the current time, the currently determined fidelity experience score in the perceptual dimension, and the MOS of the VR multimedia at the end of the previous network media event as input parameters to calculate the enjoyment experience score of the VR multimedia in the perceptual dimension using an enjoyment experience score calculation model corresponding to the play event, when the type of the network media event included in the parameter that is obtained by performing sampling according to the perceptual dimension in the second sensory parameter corresponding to the current time is a freeze event, using the fifth duration included in the parameter that is obtained by performing sampling according to the perceptual dimension in the second sensory parameter corresponding to the current time, the currently determined fidelity experience score in the perceptual dimension, and the MOS of the VR multimedia at the end of the previous network media event as input parameters to calculate the enjoyment experience score of the VR multimedia in the perceptual dimension using an enjoyment experience score calculation model corresponding to the freeze event, or when the type of the network media event included in the parameter that is obtained by performing sampling according to the perceptual dimension in the second sensory parameter corresponding to the current time is a media quality change event, determining a difference between the currently determined fidelity experience score in the perceptual dimension and a fidelity experience score in the perceptual dimension that is recently determined before the current time, as the enjoyment experience score of the VR multimedia in the perceptual dimension.

Optionally, the parameter that is obtained by performing sampling according to the perceptual dimension in the third sensory parameter includes a type of an interactive media event and a sixth duration, and the sixth duration is a duration of the interactive media event in the perceptual dimension, and determining the interaction experience score of the VR multimedia in the perceptual dimension based on a parameter that is obtained by performing sampling according to the perceptual dimension in the third sensory parameter corresponding to the current time includes selecting, from a plurality of stored interaction experience score calculation models, an interaction experience score calculation model corresponding to the type of the interactive media event included in the parameter that is obtained by performing sampling according to the perceptual dimension in the third sensory parameter corresponding to the current time, and using the type of the interactive media event and the sixth duration included in the parameter that is obtained by performing sampling according to the perceptual dimension in the third sensory parameter corresponding to the current time, as input parameters to calculate the interaction experience score of the VR multimedia in the perceptual dimension using the selected interaction experience score calculation model.

Optionally, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia includes, if a current time reaches a sampling time of the first sensory parameter of the VR multimedia, and a network media event or an interactive media event occurs at the current time, determining the fidelity experience score of the VR multimedia in the perceptual dimension based on a parameter that is obtained by performing sampling according to the perceptual dimension in the first sensory parameter corresponding to the current time, and if the event that occurs at the current time is the network media event, determining the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous unit time period, and setting the interaction experience score of the VR multimedia in the perceptual dimension to an initial value, or if the event that occurs at the current time is the interactive media event, determining the interaction experience score of the VR multimedia in the perceptual dimension based on a parameter that is obtained by performing sampling according to the perceptual dimension in the third sensory parameter corresponding to the current time, and setting the enjoyment experience score of the VR multimedia in the perceptual dimension to an initial value.

It should be noted that, the MOS of the VR multimedia in the perceptual dimension may be further determined using a unit time period as a unit. In this case, if the current time reaches the sampling time of the first sensory parameter of the VR multimedia, and a network media event occurs at the current time but no interactive media event occurs at the same time, the fidelity experience score in the perceptual dimension may be determined based on the parameter that is obtained by performing sampling according to the perceptual dimension in the first sensory parameter obtained through sampling. Because the enjoyment experience score in the perceptual dimension is related to the fidelity experience score in the perceptual dimension, when the fidelity experience score in the perceptual dimension is updated, the enjoyment experience score in the perceptual dimension is also updated correspondingly. Therefore, after the fidelity experience score in the perceptual dimension is obtained through calculation, the enjoyment experience score in the perceptual dimension may be determined. In addition, the MOS of the VR multimedia at the end of the previous unit event period may be used as an input parameter for calculating the enjoyment experience score in the perceptual dimension. This is equivalent to considering influence of previous play of the VR multimedia, and therefore is more comprehensive and more accurate. Because no interactive media event occurs, the interaction experience score in the perceptual dimension may not be calculated.

Optionally, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia includes if a current time reaches a sampling time of the first sensory parameter of the VR multimedia, and a network media event and an interactive media event occur at the current time, determining the fidelity experience score of the VR multimedia in the perceptual dimension based on a parameter that is obtained by performing sampling according to the perceptual dimension in the first sensory parameter corresponding to the current time, determining the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous unit time period, and determining the interaction experience score of the VR multimedia based on a parameter that is obtained by performing sampling according to the perceptual dimension in the third sensory parameter corresponding to the current time.

It should be noted that, when the MOS of the VR multimedia in the perceptual dimension is determined using a unit time period as a unit, if the current time reaches the sampling time of the first sensory parameter of the VR multimedia, and a network media event and an interactive media event occur simultaneously at the current time, the terminal further needs to calculate the interaction experience score in the perceptual dimension in addition to the fidelity experience score and the enjoyment experience score in the perceptual dimension.

Optionally, determining a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia includes, if a current time does not reach a sampling time of the first sensory parameter of the VR multimedia, and a network media event occurs at the current time but no interactive media event occurs at the same time, and it is detected at the current time that the network media event is ended or that a unit time period is ended, determining the enjoyment experience score of the VR multimedia in the perceptual dimension based on a parameter that is obtained by performing sampling according to the perceptual dimension in the second sensory parameter corresponding to the current time, a fidelity experience score recently determined before the current time, and a MOS of the VR multimedia at an end of a previous unit time period, and setting the interaction experience score of the VR multimedia in the perceptual dimension to an initial value, if the current time does not reach a sampling time of the first sensory parameter of the VR multimedia, and an interactive media event occurs at the current time but no network media event occurs at the same time, and it is detected at the current time that the interactive media event is ended or that the unit time period is ended, determining the interaction experience score of the VR multimedia in the perceptual dimension based on a parameter that is obtained by performing sampling according to the perceptual dimension in the third sensory parameter corresponding to the current time, and setting the enjoyment experience score of the VR multimedia in the perceptual dimension to an initial value, or if the current time does not reach a sampling time of the first sensory parameter of the VR multimedia, and a network media event and an interactive media event occur at the current time, and it is detected at the current time that the unit time period is ended, or if the current time does not reach a sampling time of the first sensory parameter of the VR multimedia, and a network media event and an interactive media event occur at the current time, and it is detected at the current time that the network media event and/or the interactive media event are/is ended and it is not detected that the unit time period is ended, determining the enjoyment experience score of the VR multimedia in the perceptual dimension based on a parameter that is obtained by performing sampling according to the perceptual dimension in the second sensory parameter corresponding to the current time, a fidelity experience score in the perceptual dimension that is recently determined before the current time in the current unit time period, and a MOS of the VR multimedia at an end of a previous unit time period, and determining the interaction experience score of the VR multimedia in the perceptual dimension based on a parameter that is obtained by performing sampling according to the perceptual dimension in the third sensory parameter corresponding to the current time, and correspondingly, using the fidelity experience score, the enjoyment experience score, and the interaction experience score of the VR multimedia in the perceptual dimension as input parameters to calculate an experience score of the VR multimedia in the perceptual dimension using a preset VR multimedia experience score calculation model in the perceptual dimension includes using the fidelity experience score in the perceptual dimension that is recently determined before the current time in the current unit time period, and the enjoyment experience score and the interaction experience score in the perceptual dimension that are determined at the current time, as the input parameters to calculate the experience score of the VR multimedia in the perceptual dimension using the preset VR multimedia experience score calculation model in the perceptual dimension.

When the MOS of the VR multimedia in the perceptual dimension is determined using a unit time period as a unit, if the current time does not reach the sampling time of the first sensory parameter of the VR multimedia, depending on whether a network media event and an interactive media event occur at the current time, whether the current time is an end time corresponding to an event that occurs, and whether the current time is an end time of the unit time period, different manners may be used to determine the enjoyment experience score and the interaction experience score in the perceptual dimension, and further determine the MOS of the VR multimedia. Because the current time is not the sampling time of the first sensory parameter, the fidelity experience score in the perceptual dimension is not calculated. Therefore, when the enjoyment experience score in the perceptual dimension is determined, the fidelity experience score recently determined before the current time may be sampled as an input parameter.

Optionally, the parameter that is obtained by performing sampling according to the perceptual dimension in the second sensory parameter includes a type of a network media event and a seventh duration, and the seventh duration is a duration of the network media event in the perceptual dimension in a unit time period, and determining the enjoyment experience score of the VR multimedia based on a parameter that is obtained by performing sampling according to the perceptual dimension in the second sensory parameter corresponding to the current time, the currently determined fidelity experience score in the perceptual dimension, and a MOS of the VR multimedia at an end of a previous unit time period includes, when the type of the network media event included in the parameter that is obtained by performing sampling according to the perceptual dimension in the second sensory parameter corresponding to the current time is a play event, using the seventh duration included in the parameter that is obtained by performing sampling according to the perceptual dimension in the second sensory parameter corresponding to the current time, the currently determined fidelity experience score in the perceptual dimension, and the MOS of the VR multimedia at the end of the previous unit time period as input parameters to calculate the enjoyment experience score of the VR multimedia in the perceptual dimension using an enjoyment experience score calculation model corresponding to the play event, when the type of the network media event included in the parameter that is obtained by performing sampling according to the perceptual dimension in the second sensory parameter corresponding to the current time is a freeze event, using the seventh duration included in the parameter that is obtained by performing sampling according to the perceptual dimension in the second sensory parameter corresponding to the current time, the currently determined fidelity experience score in the perceptual dimension, and the MOS of the VR multimedia at the end of the previous unit time period as input parameters to calculate the enjoyment experience score of the VR multimedia in the perceptual dimension using an enjoyment experience score calculation model corresponding to the freeze event, or when the type of the network media event included in the parameter that is obtained by performing sampling according to the perceptual dimension in the second sensory parameter corresponding to the current time is a media quality change event, determining a difference between the currently determined fidelity experience score in the perceptual dimension and a fidelity experience score in the perceptual dimension that is recently determined before the current time in a current unit time period, as the enjoyment experience score of the VR multimedia in the perceptual dimension.

Optionally, the parameter that is obtained by performing sampling according to the perceptual dimension in the third sensory parameter includes a type of an interactive media event and an eighth duration, and the eighth duration is a duration of the interactive media event in the perceptual dimension in a unit time period, and determining the interaction experience score of the VR multimedia based on a parameter that is obtained by performing sampling according to the perceptual dimension in the third sensory parameter corresponding to the current time includes selecting, from a plurality of stored interaction experience score calculation models, an interaction experience score calculation model corresponding to the type of the interactive media event included in the parameter that is obtained by performing sampling according to the perceptual dimension in the third sensory parameter corresponding to the current time, and using the type of the interactive media event and the eighth duration included in the parameter that is obtained by performing sampling according to the perceptual dimension in the third sensory parameter corresponding to the current time, as input parameters to calculate the interaction experience score of the VR multimedia in the perceptual dimension using the selected interaction experience score calculation model.

Optionally, the video attribute information in the visual dimension in the first sensory parameter includes at least one of a projection format, a stereo degree, and a degree of freedom, the video parameter in the visual dimension in the first sensory parameter includes at least one of a full view resolution and a field of view, and the audio attribute information in the acoustic dimension in the first sensory parameter includes an audio stereo degree.

It should be noted that, the projection format, the stereo degree, the degree of freedom, and the audio stereo degree are distinctive attribute information of the VR multimedia different from the conventional multimedia, and the full view resolution and the field of view are also distinctive parameters of the VR multimedia. Calculating the fidelity experience score based on the parameters better complies with the features of the VR multimedia, and the MOS of the VR multimedia that is determined based on this is also more accurate.

Optionally, the second sensory parameter includes a type of a network media event and a corresponding duration, and the corresponding duration is a duration of the network media event.

It should be noted that, when the MOS of the VR multimedia is determined using an event as a unit, the duration included in the second sensory parameter may be the duration of the network media event. When the MOS of the VR multimedia is determined using a unit time period as a unit, the duration included in the second sensory parameter may be the duration of the network media event in the unit time period.

Optionally, the type of the network media event included in the second sensory parameter includes a play event, a freeze event, or a media quality change event.

The network media event is an event caused by a change of a network condition. Therefore, the type of the network media event may include a play event, a freeze event, or a media quality change event, but is not limited thereto.

Optionally, the third sensory parameter includes a type of an interactive media event and a corresponding duration, and the corresponding duration is a duration of the interactive media event.

Optionally, the type of the interactive media event included in the third sensory parameter includes an initial loading event, an interactive loading event, or a media hysteresis event, the initial loading event is a loading event that occurs when the VR multimedia is initially played, the interactive loading event is a loading event that occurs due to interaction between the VR multimedia and a user, and the media hysteresis event is a hysteresis event that occurs between a media update and an action due to a user action.

It should be noted that, when the MOS of the VR multimedia is determined using an event as a unit, the duration included in the third sensory parameter may be the duration of the interactive media event. When the MOS of the VR multimedia is determined using a unit time period as a unit, the duration included in the third sensory parameter may be the duration of the interactive media event in the unit time period.

Optionally, the at least two perceptual dimensions further include a feedback dimension, and the feedback dimension is a synchronization and association relationship between the visual dimension and another dimension than the visual dimension in the at least two perceptual dimensions, where a parameter that is obtained by performing sampling according to the feedback dimension in the first sensory parameter includes at least one of a time synchronization degree, an azimuth synchronization degree, and a force feedback indicator, the time synchronization degree is a time synchronization degree between the visual dimension and the acoustic dimension, the azimuth synchronization degree is an azimuth synchronization degree between the visual dimension and the acoustic dimension, and the force feedback indicator is used to indicate whether there is a force feedback matching the visual dimension, a parameter that is obtained by performing sampling according to the feedback dimension in the second sensory parameter includes at least one of a first synchronization degree change indicator, a second synchronization degree change indicator, and a third synchronization degree change indicator, the first synchronization degree change indicator is used to indicate whether the time synchronization degree changes, the second synchronization degree change indicator is used to indicate whether the azimuth synchronization degree changes, and the third synchronization degree change indicator is used to indicate whether a time synchronization degree between the visual dimension and the force feedback changes, and a parameter that is obtained by performing sampling according to the feedback dimension in the third sensory parameter includes a hysteresis indicator, and the hysteresis indicator is used to indicate whether a hysteresis event occurs between the force feedback and an action.

It should be noted that, the at least two perceptual dimensions may further include the feedback dimension in addition to the visual dimension and the acoustic dimension, and the feedback dimension is the synchronization and association relationship between the visual dimension and another dimension than the visual dimension in the at least two perceptual dimensions.

Optionally, after determining a MOS of the VR multimedia, the method further includes determining a mean value of all MOSs of the VR multimedia that are obtained through calculation within a preset test duration, where the preset test duration is a duration of determining experience quality of the VR multimedia.

Generally, when the MOS of the VR multimedia is determined, a test is usually performed within the preset test duration. A plurality of events may occur or a plurality of unit time periods are included within the preset test duration. Therefore, a plurality of MOSs of the VR multimedia may be obtained. In this case, a mean value of all the MOSs of the VR multimedia may be obtained through calculation, and the mean value is used as a MOS statistical value of the VR multimedia within the preset test duration.

Optionally, after determining a MOS of the VR multimedia, the method further includes determining a mean square error of all the MOSs of the VR multimedia that are obtained through calculation within the preset test duration, where the mean square error is used to indicate stability of all the MOSs of the VR multimedia.

It should be noted that, after the mean value of the plurality of MOSs of the VR multimedia is obtained through calculation, the mean square error of the plurality of the MOSs of the VR multimedia may be calculated, where the mean square error is used to evaluate stability of the experience quality of the VR multimedia within the preset test duration.

According to a second aspect, an apparatus for determining experience quality of VR multimedia is provided, where the apparatus for determining experience quality of VR multimedia has functions for implementing actions of the method for determining experience quality of VR multimedia in the first aspect. The apparatus for determining experience quality of VR multimedia includes at least one module, and the at least one module is configured to implement the method for determining experience quality of VR multimedia according to the first aspect.

According to a third aspect, an apparatus for determining experience quality of VR multimedia is provided, where a structure of the apparatus for determining experience quality of VR multimedia includes a processor and a memory, and the memory is configured to store a program supporting the foregoing apparatus in performing the method for determining experience quality of VR multimedia according to the first aspect, and data used for implementing the method for determining experience quality of VR multimedia according to the first aspect. The processor is configured to execute the program stored in the memory. An operation apparatus of the storage device may further include a communications bus, and the communications bus is configured to establish a connection between the processor and the memory.

According to a fourth aspect, a computer-readable storage medium is provided, where the computer-readable storage medium stores an instruction, and when the instruction runs on a computer, the computer performs the method for determining experience quality of VR multimedia according to the first aspect.

According to a fifth aspect, a computer program product including an instruction is provided, where when the computer program product runs on a computer, the computer performs the method for determining experience quality of VR multimedia according to the first aspect.

Technical effects achieved in the second aspect, the third aspect, the fourth aspect, and the fifth aspect are similar to those achieved by corresponding technical means in the first aspect. Details are not described again herein.

The technical solutions provided by this application have the following beneficial effects. In a process of determining the experience quality of the VR multimedia, quality evaluation is performed on the fidelity experience, the enjoyment experience, and the interaction experience based on the first sensory parameter, the second sensory parameter, and the third sensory parameter, but immersion, multi-sense integration, and interaction with the user are exactly main features that distinguish the VR multimedia from the conventional multimedia. Therefore, determining the experience quality of the VR multimedia in the embodiments of the present disclosure better complies with an actual situation of the VR multimedia, and the determined experience quality of the VR multimedia is also more accurate.

BRIEF DESCRIPTION OF DRAWINGS

FIG. 6B is a flowchart of a method for determining a MOS of VR multimedia using a unit time period as a unit according to an embodiment of the present disclosure;

FIG. 6C is a flowchart of a method for determining a MOS of VR multimedia using a unit time period as a unit according to an embodiment of the present disclosure;

FIG. 8B is a flowchart of a method for determining an experience score of VR multimedia in a perceptual dimension using an event as a unit according to an embodiment of the present disclosure;

FIG. 8C is a flowchart of a method for determining an experience score of VR multimedia in a perceptual dimension using an event as a unit according to an embodiment of the present disclosure;

FIG. 9B is a flowchart of a method for determining an experience score of VR multimedia in a perceptual dimension using a unit time period as a unit according to an embodiment of the present disclosure;

FIG. 9C is a flowchart of a method for determining an experience score of VR multimedia in a perceptual dimension using a unit time period as a unit according to an embodiment of the present disclosure;

DESCRIPTION OF EMBODIMENTS

Figure 1:
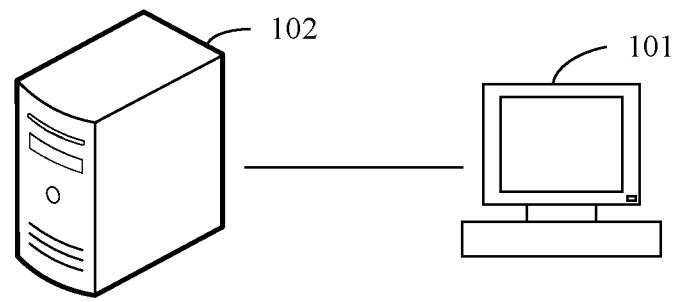
FIG. 1 is an architectural diagram of a system in a method for determining experience quality of VR multimedia according to an embodiment of the present disclosure.

To make the objectives, technical solutions, and advantages of this application clearer, the following further describes the implementations of this application in detail with reference to the accompanying drawings.

For ease of understanding, terms used in embodiments of the present disclosure are first explained before the embodiments of the present disclosure are explained and described in detail.

Fidelity experience: The fidelity experience is mainly used to indicate a degree of reproduction of a real environment by a virtual environment of VR multimedia. A higher degree of reproduction indicates stronger immersive experience of a user. Therefore, the fidelity experience may also reflect the immersive experience of the user.

Enjoyment experience: The enjoyment experience is mainly used to indicate influence of network transmission quality on play quality of the VR multimedia in a process of playing the VR multimedia. When network transmission quality is relatively good, the VR multimedia can be normally played. In this case, user experience of the virtual environment of the VR multimedia is not interrupted. When network transmission quality is relatively poor, the VR multimedia may be frozen or video and audio quality becomes poor. In this case, user experience of the virtual environment of the VR multimedia may be interrupted or experience becomes poor.

However, when the user experience becomes poor, the user may be unwilling to continue to experience the VR multimedia. Therefore, the enjoyment experience may also reflect a possibility that the user is willing to continue to experience the VR multimedia in the process of playing the VR multimedia.

Interaction experience: The interaction experience is mainly used to indicate real-time quality and consistency of interaction performed between the user and the virtual environment of the VR multimedia. A video image presented by the VR multimedia and an audio that is synchronously played may change as a body posture or an action of the user or the like changes. In this process, due to factors such as network transmission quality, a latency may exist between the change of the body posture or the action of the user or the like and the change of the video image and audio of the VR multimedia. A higher latency indicates more unnatural interaction between the user and the VR multimedia. Therefore, the interaction experience may also reflect a natural degree of the interaction between the user and the VR multimedia.

In addition, when the body posture or the action of the user or the like changes, the change of the video image and audio of the VR multimedia should be consistent with the change of the body posture or the action of the user or the like. For example, if the user turns his/her head left, the video image and audio of the VR multimedia should also change correspondingly according to a direction to which the user turns. If the change of the VR multimedia is inconsistent with the changes of the body posture and the action of the user, relatively poor interaction experience is caused.

As can be seen from the descriptions about the fidelity experience, the enjoyment experience, and the interaction experience, the fidelity experience may reflect user experience in an ideal situation when there is no influence from factors such as network transmission quality. However, the enjoyment experience and the interaction experience reflect an impairment of user experience caused by influence such as network transmission quality.

First sensory parameter: The first sensory parameter is a parameter that affects the fidelity experience and is obtained by performing sampling according to at least two perceptual dimensions. The at least two perceptual dimensions include a visual dimension and an acoustic dimension, and certainly may further include other dimensions, for example, may further include a feedback dimension, a tactile dimension, a motion dimension, an olfactory dimension, a gustatory dimension, and the like. The feedback dimension is a dimension that can reflect a synchronization and association relationship between the visual dimension and another dimension than the visual dimension in the at least two perceptual dimensions.

In the visual dimension, the first sensory parameter may include a plurality of pieces of video attribute information and a plurality of video parameters. The plurality of pieces of video attribute information may include a series of information reflecting video attributes, such as a video projection format, a video coding type, a stereo degree, and a degree of freedom. The plurality of video parameters may include parameters such as a video bit rate, a full view resolution, time complexity, space complexity, and a field of view. In addition, sampling periods for sampling the plurality of pieces of video attribute information and the plurality of video parameters may be different. For example, for the degree of freedom in the video attribute information, because the degree of freedom of the VR multimedia generally does not change, the degree of freedom needs to be sampled only once in a process of determining experience quality of the VR multimedia.

The stereo degree is used to indicate that the VR multimedia is a monocular video or a binocular stereo video. When the VR multimedia is a monocular video, the stereo degree obtained through sampling is 0. When the VR multimedia is a binocular stereo video, the stereo degree obtained through sampling is 1. The degree of freedom is a degree of freedom that the video of the VR multimedia can present. Generally, the degree of freedom of the video of the VR multimedia may be three degrees of freedom, six degrees of freedom, or the like. The time complexity is used to indicate a difference between two pixel values in a same position in consecutive frames or consecutive time periods in the process of playing the VR multimedia. The space complexity is used to indicate a standard difference between pixel values in each filtered frame of the VR multimedia. The time complexity and the space complexity jointly constitute content complexity. When sampling is performed, a time complexity factor corresponding to the VR multimedia is obtained by performing sampling on the time complexity, and a space complexity factor corresponding to the VR multimedia is obtained by performing sampling on the space complexity. The field of view is jointly determined by the VR multimedia and a terminal such as a head-mounted display, and is used to indicate an angle of view from which the user watches the video. A larger field of view indicates a wider view. Generally, the field of view may be decomposed into a horizontal field of view and a vertical field of view, and a range of the field of view is 60 degrees to 210 degrees.

In the acoustic dimension, the first sensory parameter may include a plurality of pieces of audio attribute information and at least one audio parameter. The plurality of pieces of audio attribute information may include an audio sampling rate, an audio stereo degree, and an audio coding format. The at least one audio parameter may include an audio bit rate.

The audio stereo degree is used to indicate that an audio of the VR multimedia is a stereo sound or a spatial sound. When the audio of the VR multimedia is a stereo sound, the audio stereo degree obtained through sampling is 0. When the audio of the VR multimedia is a spatial sound, the audio stereo degree obtained through sampling is 1.

Second sensory parameter: The second sensory parameter is a parameter that can affect the enjoyment experience and is obtained by performing sampling according to the at least two perceptual dimensions. In this application, the second sensory parameter mainly includes a type of a network media event and a corresponding duration. Common types of network media events that affect the enjoyment experience are a play event, a freeze event, and a media quality change event.

The freeze event indicates that play of the VR multimedia is paused because network transmission quality is relatively poor. The media quality change event is a change of video quality and audio quality of the VR multimedia due to network transmission quality. The media quality change event may be an event such as an increase or a decrease of a resolution, an increase or a decrease of a mean bit rate, an increase or a decrease of a frame rate, or an increase or a decrease of a sampling rate, and a media quality change event related to the user datagram protocol (UDP), where the quality change event related to UDP may be a frame impairment, frame skipping, artifacts, or the like.

Third sensory parameter: The third sensory parameter is a parameter that can affect the interaction experience and is obtained by performing sampling according to the at least two perceptual dimensions. In this application, the third sensory parameter mainly includes a type of an interactive media event and a corresponding duration. Common types of interactive media events that affect the interaction experience are an initial loading event, an interactive loading event, and a media hysteresis event.

The initial loading event is a loading event that occurs when the VR multimedia is initially played. The interactive loading event is a loading event that occurs due to interaction with the user, that is, a loading event in scene switching of the VR multimedia due to a user operation. The media hysteresis event is a hysteresis event that occurs between a media update and an action due to a user action, that is, a hysteresis event that occurs between the media update and the action due to an action such as a change of a location or a body posture or turning of the head of the user.

After the terms used in the embodiments of the present disclosure are explained and described, the following describes a system architecture used in the embodiments of the present disclosure.

FIG. 1 is an architectural diagram of a system in a method for determining experience quality of VR multimedia according to an embodiment of the present disclosure. As shown in FIG. 1, the system includes a terminal 101 and a server 102. The terminal 101 and the server 102 may be connected using a wired network or a wireless network. Using the wired network or wireless network, the terminal 101 may send a VR multimedia obtaining request to the server 102, and the server 102 may obtain, based on the received VR multimedia obtaining request, VR multimedia and related information required for playing the VR multimedia, and send the VR multimedia and the related information to the terminal 101. The VR multimedia may be a 360-degree panoramic VR video.

A VR multimedia player may run on the terminal 101. The VR multimedia player may be an application that independently runs on the terminal 101, or may be an application embedded on a page of a browser. Using the VR multimedia player, the terminal 101 may play the VR multimedia obtained from the server 102. When a user watches the VR multimedia, and performs an operation based on a virtual environment presented by the VR multimedia, the terminal 101 may receive an interactive action of the user, and make a response based on the interactive action. When determining experience quality of the VR multimedia in a process of playing the VR multimedia, the terminal 101 may sample, based on different sampling periods, a plurality of parameters in the process of playing the VR multimedia, perform calculation based on the parameters obtained through sampling to obtain a MOS of the VR multimedia, and output the MOS of the VR multimedia.

It should be noted that, the terminal 101 may be a head-mounted display device (HMD), a mobile terminal that may change a view position using a gyroscope, or a VR terminal such as a conventional smart television (TV) terminal that may change a view position using a remote control. The server 102 is a device that may provide VR multimedia. The server 102 may be a single device, or may be a device cluster providing a VR multimedia service.

In addition, general-purpose VR multimedia media transfer protocols such as the Real-Time Transport Protocol (RTP), the Real-Time Streaming Protocol (RTSP), the HyperText Transfer Protocol (HTTP), the Real-Time Messaging Protocol (RTMP), the Dynamic Adaptive Streaming over HTTP (DASH) media protocol, and the HTTP Live Streaming (HLS) media protocol are supported for communication between the terminal 101 and the server 102 using the wired network or wireless network.

Figure 2:
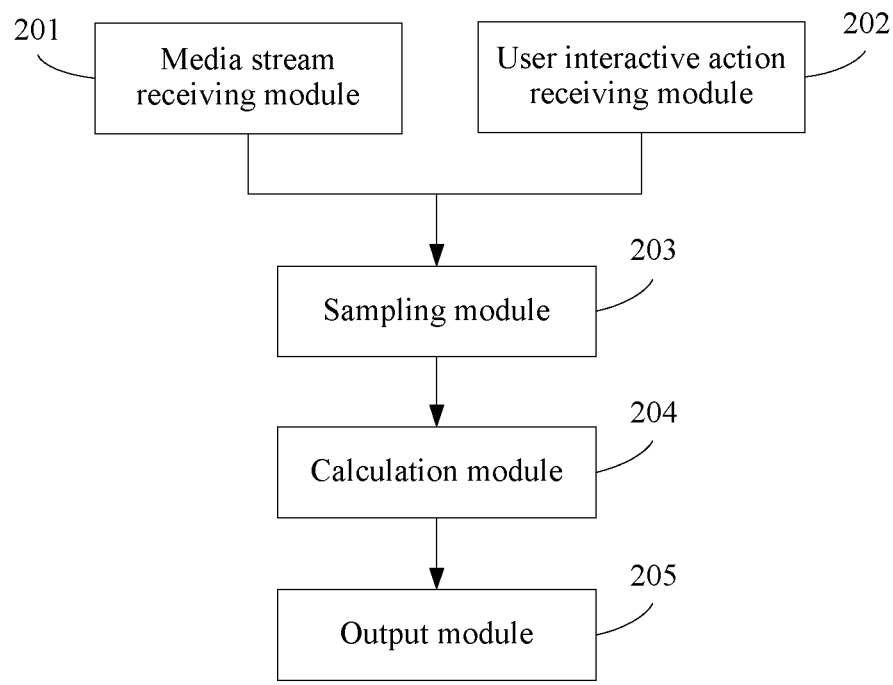
FIG. 2 is a schematic structural diagram of a terminal according to an embodiment of the present disclosure.

As can be learned based on the descriptions about the terminal 101 in the system architecture shown in FIG. 1, the terminal 101 may receive the VR multimedia and the interactive action of the user, and sample the related parameters in the process of playing the VR multimedia to calculate the MOS of the VR multimedia. Therefore, as shown in FIG. 2, an embodiment of the present disclosure provides a schematic structural diagram of a terminal. Functions of the terminal 101 in the system architecture in FIG. 1 may be implemented using the terminal shown in FIG. 2. As shown in FIG. 2, the terminal includes a media stream receiving module 201, a user interactive action receiving module 202, a sampling module 203, a calculation module 204, and an output module 205. The media stream receiving module 201 is configured to receive VR multimedia sent by a server. The user interactive action receiving module 202 is configured to receive a corresponding parameter when an action such as a location or a body posture of a user changes. The sampling module 203 is configured to sample, based on different sampling periods, a plurality of parameters in a process of playing the received VR multimedia. The calculation module 204 determines a MOS of the VR multimedia based on the parameters that are obtained through sampling.

The output module 205 is configured to output and display the determined MOS of the VR multimedia. The calculation module 204 may include a plurality of submodules. For example, the plurality of submodules may be a fidelity experience score calculation module, an enjoyment experience score calculation module, and an interaction experience score calculation module.

Figure 3:
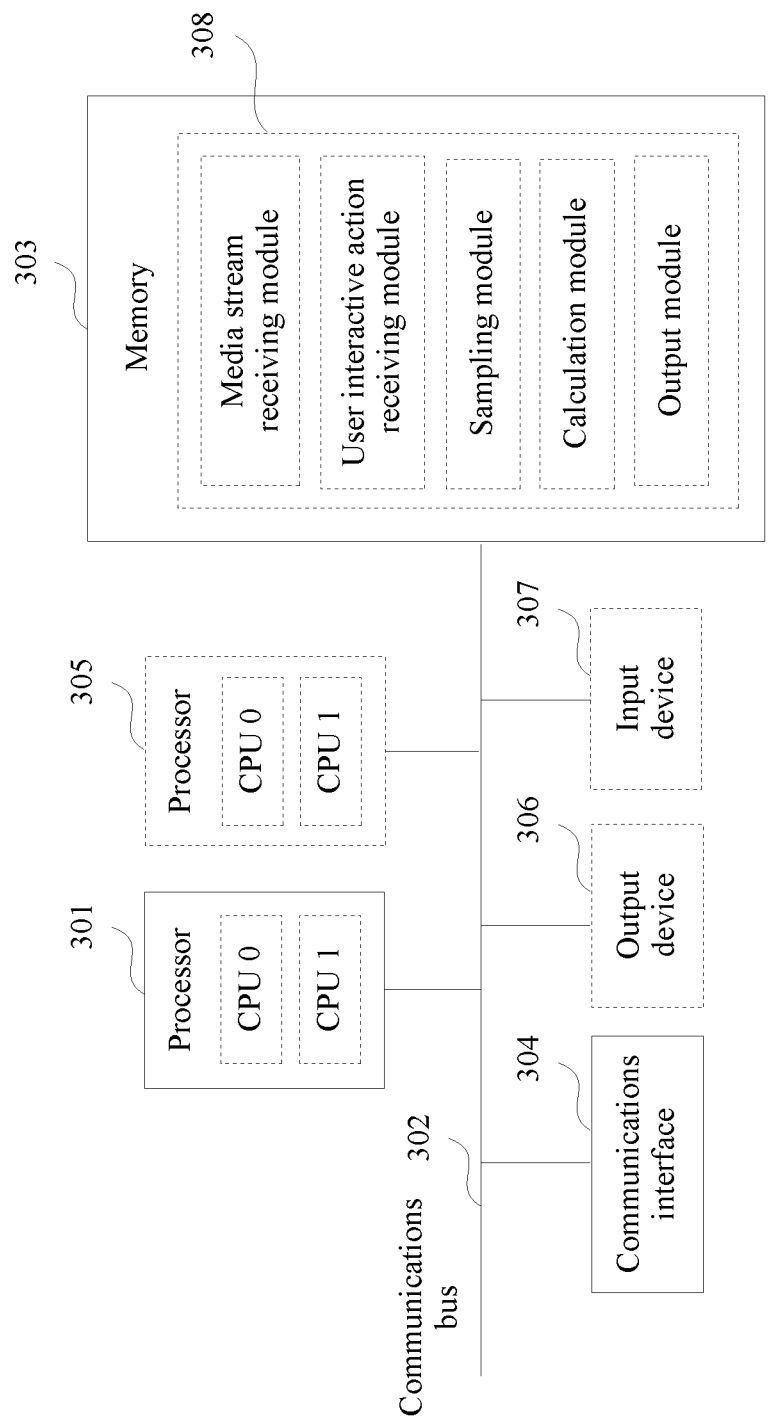
FIG. 3 is a schematic structural diagram of a terminal device according to an embodiment of the present disclosure.

FIG. 3 is a schematic structural diagram of a terminal device according to an embodiment of the present disclosure. The terminal in the system architecture in FIG. 1 and the terminal in FIG. 2 may be both implemented using the terminal device shown in FIG. 3. Referring to FIG. 3, the terminal device includes at least one processor 301, a communications bus 302, a memory 303, and at least one communications interface 304.

The processor 301 may be a general-purpose central processing unit (CPU), a microprocessor, an application-specific integrated circuit (ASIC), or one or more integrated circuits for controlling program execution in the solution of this application.

The communications bus 302 may include a path transmitting information between the foregoing components.

The memory 303 may be a read-only memory (ROM) or another type of static storage device capable of storing static information and instructions, or a random access memory (RAM) or another type of dynamic storage device capable of storing information and instructions, or may be an electrically erasable programmable ROM (EEPROM), a compact disc ROM (CD-ROM), or other compact disc storage or optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer. This is not limited. The memory 303 may exist independently, and is connected to the processor 301 by the communications bus 302. The memory 303 may also be integrated with the processor 301.

The communications interface 304 is a type of apparatus using any transceiver, and is configured to communicate with another device or a communications network, for example, an Ethernet, a radio access network (RAN), or a wireless local area network (WLAN).

In a specific implementation, in an embodiment, the processor 301 may include one or more CPUs, for example, a CPU 0 and a CPU 1 shown in FIG. 3.

In a specific implementation, in an embodiment, the terminal device may include a plurality of processors, for example, the processor 301 and a processor 305 shown in FIG. 3. Each of the processors may be a single-core (single-CPU) processor, or may be a multi-core (multi-CPU) processor. The processor herein may be one or more devices, circuits, and/or processing cores used for processing data (for example, a computer program instruction).

In a specific implementation, in an embodiment, the terminal device may further include an output device 306 and an input device 307. The output device 306 communicates with the processor 301, and may display information in a plurality of manners. For example, the output device 306 may be a liquid crystal display (LCD), a light emitting diode (LED) display device, a cathode ray tube (CRT) display device, or a projector. The input device 307 communicates with the processor 301, and may receive an input of a user in a plurality of manners. For example, the input device 307 may be a mouse, a keyboard, a touchscreen device, or a sensing device.

The terminal device may be a general-purpose terminal device or a dedicated terminal device. In a specific implementation, the terminal device may be a desktop computer, a portable computer, a network server, a palmtop computer such as personal digital assistant (PDA), a mobile phone, a tablet computer, a wireless terminal device, a communications device, or an embedded device. In this embodiment of the present disclosure, the type of the terminal device is not limited.

The memory 303 is configured to store program code used to execute the solution of this application, where the program code is executed under control of the processor 301. The processor 301 is configured to execute program code 308 stored in the memory 303. The program code 308 may include one or more software modules (for example, a media stream receiving module, a user interactive action receiving module, a sampling module, a calculation module, and an output module). The terminals shown in FIG. 1 and FIG. 2 may determine experience quality of VR multimedia using the processor 301 and one or more software modules in the program code 308 in the memory 303.

Based on the foregoing descriptions, after the terms and system architecture used in the embodiments of the present disclosure are explained and described, the following describes in detail specific implementation processes of the embodiments of the present disclosure.

In the embodiments of the present disclosure, a terminal may obtain a first sensory parameter, a second sensory parameter, and a third sensory parameter of VR multimedia in a process of playing the VR multimedia. Then the terminal may determine a MOS of the VR multimedia using two different methods based on the obtained first sensory parameter, second sensory parameter, and third sensory parameter. In a first method, the terminal may first determine a fidelity experience score, an enjoyment experience score, and an interaction experience score based on the obtained parameters, and further determine the MOS of the VR multimedia. In a second method, the terminal may first calculate an experience score corresponding to each of at least two perceptual dimensions, and further determine the MOS of the VR multimedia based on at least two experience scores corresponding to the at least two perceptual dimensions. The following explains and describes the two methods in detail with reference to accompanying drawings.

Figure 4:
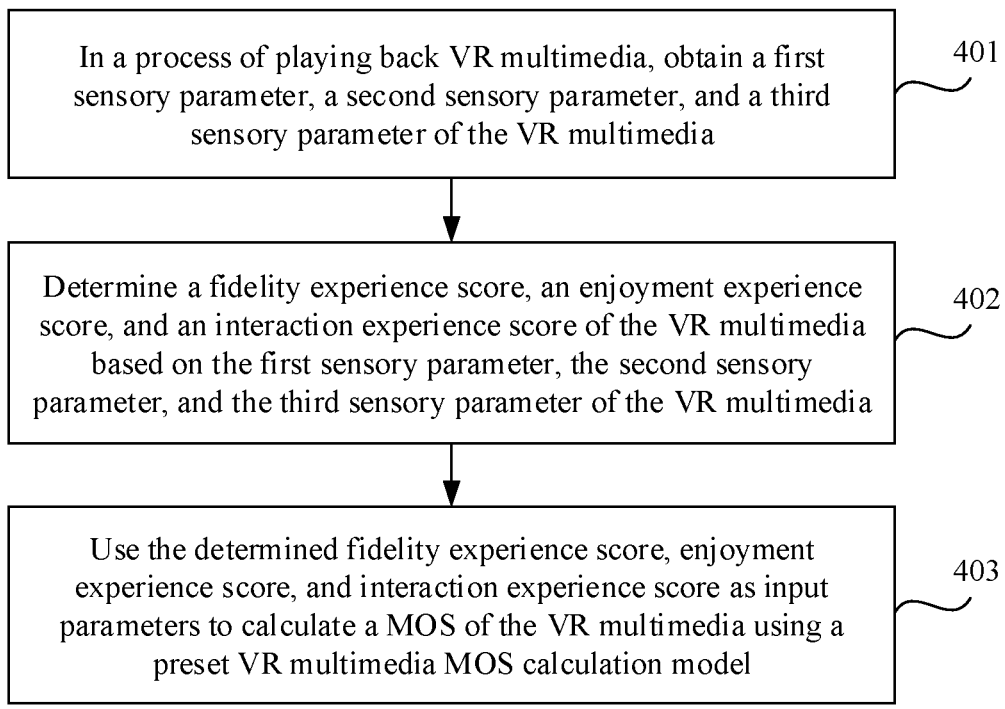
FIG. 4 is a flowchart of a method for determining experience quality of VR multimedia according to an embodiment of the present disclosure.

In the embodiments of the present disclosure, the first method for determining a MOS of VR multimedia is first explained and described with reference to FIG. 4 to FIG. 6C. FIG. 4 is a flowchart of a method for determining experience quality of VR multimedia according to an embodiment of the present disclosure. As shown in FIG. 4, the method includes the following steps.

Step 401: In a process of playing VR multimedia, obtain a first sensory parameter, a second sensory parameter, and a third sensory parameter of the VR multimedia.

In the process of playing the VR multimedia, a terminal may obtain the first sensory parameter, the second sensory parameter, and the third sensory parameter by performing sampling on the VR multimedia. Sampling periods for sampling the first sensory parameter, the second sensory parameter, and the third sensory parameter by the terminal may be the same or may be different.

For example, the terminal may sample the first sensory parameter once using a group of pictures (GoP) as a unit, or may sample the first sensory parameter once using a segment as a unit, or certainly may further sample the first sensory parameter using a preset sampling period. For another example, the terminal may sample the third sensory parameter once when detecting a change of a location of a user, or may sample the third sensory parameter once based on a preset sampling period or using a GoP as a unit. That is, when the terminal samples the first sensory parameter, a sampling time of the second sensory parameter or the third sensory parameter may not arrive.

Step 402: Determine a fidelity experience score, an enjoyment experience score, and an interaction experience score of the VR multimedia based on the first sensory parameter, the second sensory parameter, and the third sensory parameter of the VR multimedia.

It should be noted that, using an event that occurs in the process of playing the VR multimedia as a unit, the terminal may trigger calculation and output a fidelity experience score, an enjoyment experience score, and an interaction score once at an end of the event that occurs, to subsequently obtain, through joint calculation based on the fidelity experience score, the enjoyment experience score, and the interaction experience score, a MOS of the VR multimedia corresponding to the event. The event may be a network media event that affects the enjoyment experience score, or may be an interactive media event that affects the interaction experience score.

In addition, using a preset unit time period as a unit, the terminal may also trigger calculation and output a fidelity experience score, an enjoyment experience score, and an interaction experience score once at an end of a unit time period in the process of playing the VR multimedia, to subsequently obtain, through joint calculation based on the fidelity experience score, the enjoyment experience score, and the interaction experience score, a MOS of the VR multimedia corresponding to the unit time period.

It should also be noted that, when a sampling time of the first sensory parameter arrives, because the first sensory parameter obtained through sampling may change in comparison with a first sensory parameter at a previous sampling time, the terminal needs to calculate a fidelity experience score based on the first sensory parameter obtained through sampling. However, because an enjoyment experience score is determined based on the fidelity experience score, after the fidelity experience score is obtained through calculation, the enjoyment experience score further needs to be determined based on the fidelity experience score. That is, when the sampling time of the first sensory parameter arrives, a calculation time of the fidelity experience score also arrives. However, when the calculation time of the fidelity experience score arrives, calculation may be triggered and an enjoyment experience score and/or an interaction experience score may be output once, and a MOS of the VR multimedia is further calculated once.

As can be learned from the foregoing descriptions, when sampling periods of sensory parameters are different, occasions of determining the fidelity experience score, the enjoyment experience score, and the interaction experience score by the terminal based on the first sensory parameter, the second sensory parameter, and the third sensory parameter are also different. In addition, the terminal may also calculate the fidelity experience score, the enjoyment experience score, and the interaction experience score of the VR multimedia using an event that occurs in the process of playing the VR multimedia as a unit, or using a preset unit time period as a unit. Therefore, there are a plurality of implementations of calculating the fidelity experience score, the enjoyment experience score, and the interaction experience score of the VR multimedia. The implementations are discussed in the following embodiments of this application.

Step 403: Use the determined fidelity experience score, enjoyment experience score, and interaction experience score as input parameters to calculate a MOS of the VR multimedia using a preset VR multimedia MOS calculation model.

Based on the descriptions in step 402, when calculation of the fidelity experience score, the enjoyment experience score, and the interaction experience score is triggered using an event as a unit, because the event may be an event that affects the enjoyment experience score or may be an event that affects the interaction experience score, and an end time of the event may not be the sampling time of the first sensory parameter, a manner of calculating the MOS of the VR multimedia based on the determined fidelity experience score, enjoyment experience score, and interaction experience score may also vary.

Likewise, when calculation of the fidelity experience score, the enjoyment experience score, and the interaction experience score is triggered using a unit time period as a unit, there are also a plurality of manners of calculating the MOS of the VR multimedia based on the determined fidelity experience score, enjoyment experience score, and interaction experience score.

It should also be noted that, when calculation of the enjoyment experience score and the interaction experience score is triggered at the calculation time of the fidelity experience score, because an event that affects the interaction experience score may occur or may not occur at the calculation time, the manner of calculating the MOS of the VR multimedia based on the determined fidelity experience score, enjoyment experience score, and interaction experience score may also vary.

Therefore, there are also a plurality of implementations of using the determined fidelity experience score, enjoyment experience score, and interaction experience score as the input parameters to calculate the MOS of the VR multimedia using the preset VR multimedia MOS calculation model. The implementations are discussed in the following embodiments of this application with reference to the plurality of implementations of the fidelity experience score, the enjoyment experience score, and the interaction experience score of the VR multimedia.

In this embodiment of the present disclosure, the terminal performs quality evaluation on fidelity experience, enjoyment experience, and interaction experience based on the first sensory parameter, the second sensory parameter, and the third sensory parameter, but immersion, multi-sense integration, and interaction with the user are exactly main features that distinguish the VR multimedia from the conventional multimedia. Therefore, determining experience quality of the VR multimedia in this embodiment of the present disclosure better complies with an actual situation of the VR multimedia, and the determined experience quality of the VR multimedia is also more accurate.

A network media event is an event that occurs due to influence of a network condition. A normal play event that occurs when a network condition is relatively good is a network media event. A freeze event and a media quality change event that are generated due to a relatively poor network condition are also network media events. However, an interactive media event is different from this, and the interactive media event occurs only when there is interaction between the user and the terminal. In the process of playing the VR multimedia, when a network media event occurs, no interactive media event may exist because there is no interaction between the user and the terminal. Alternatively, when an interactive media event caused by interaction between the user and the terminal occurs, because no network media event caused by a change of a network condition may exist, no network media event occurs. Based on the foregoing descriptions, with reference to the descriptions in steps 402 and 403, and with reference to FIG. 5A to FIG. 5C, the following describes an implementation process of determining a fidelity experience score, an enjoyment experience score, and an interaction experience score of VR multimedia using an event as a unit when a current time corresponds to different cases, and further determining a MOS of the VR multimedia.

Figure 5A:
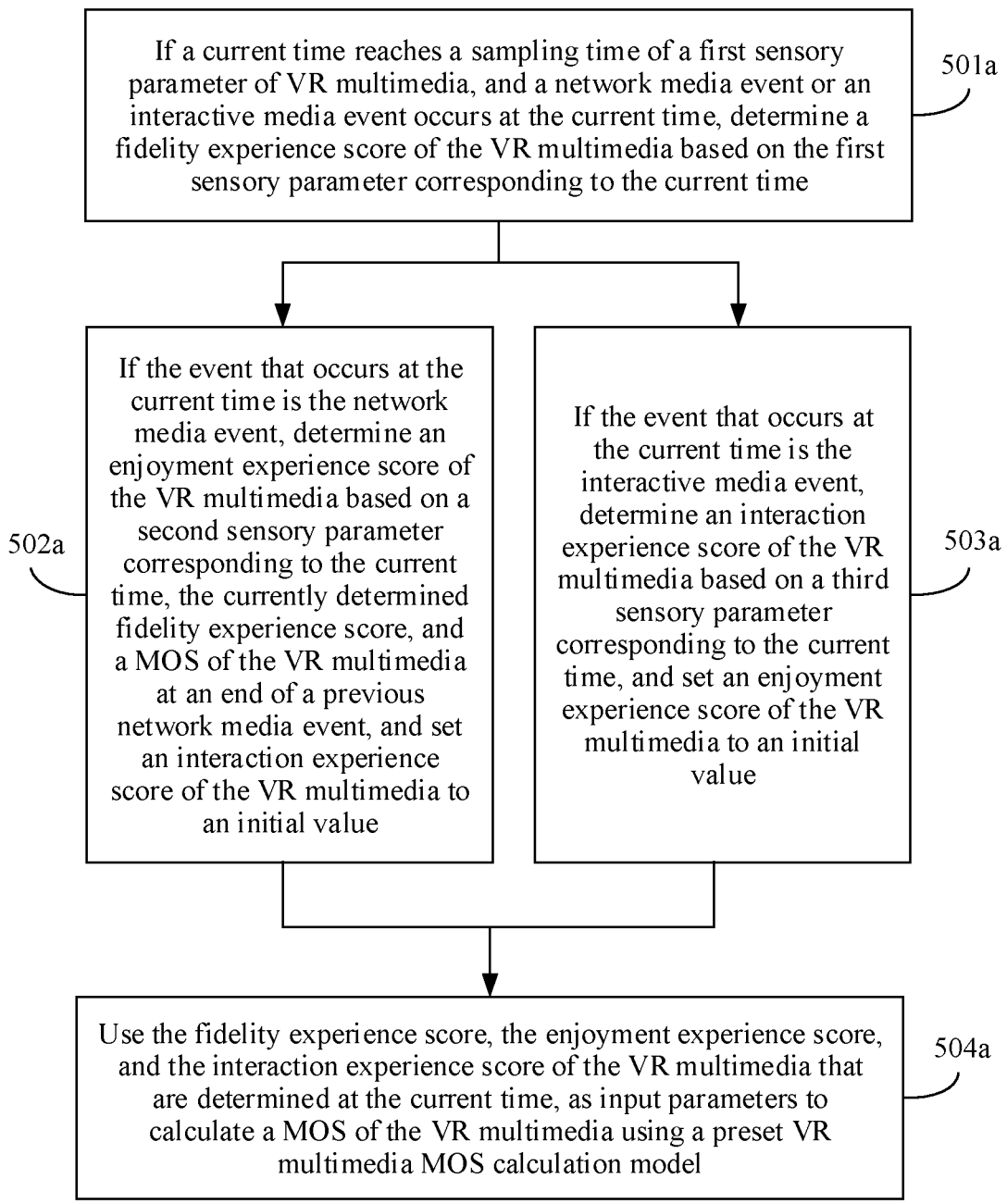
FIG. 5A is a flowchart of a method for determining a MOS of VR multimedia using an event as a unit according to an embodiment of the present disclosure.

FIG. 5A is a flowchart of a method for determining a MOS of VR multimedia using an event as a unit according to an embodiment of the present disclosure. As shown in FIG. 5A, the method includes the following steps.

Step 501a: If a current time reaches a sampling time of a first sensory parameter of VR multimedia, and a network media event or an interactive media event occurs at the current time, determine a fidelity experience score of the VR multimedia based on the first sensory parameter corresponding to the current time.

When a MOS of the VR multimedia is determined using an event as a unit, if the current time reaches the sampling time of the first sensory parameter of the VR multimedia, and the network media event or the interactive media event occurs at the current time, because the first sensory parameter may have changed, a terminal may calculate the fidelity experience score at the current time based on the first sensory parameter.

When the fidelity experience score at the current time is calculated based on the first sensory parameter, the terminal may calculate fidelity experience scores in at least two perceptual dimensions respectively based on parameters that are obtained by performing sampling according to the at least two perceptual dimensions in the first sensory parameter, and then determine the fidelity experience score of the VR multimedia based on the fidelity experience scores in the at least two perceptual dimensions. The at least two perceptual dimensions may include a visual dimension and an acoustic dimension, and certainly may further include a feedback dimension. When the at least two perceptual dimensions are the visual dimension and the acoustic dimension, the terminal may calculate a visual fidelity experience score and an acoustic fidelity experience score respectively in the following manners (1) and (2), and finally calculate the fidelity experience score of the VR multimedia at the current time in a manner (3) based on the visual fidelity experience score and the acoustic fidelity experience score that are obtained through calculation.

(1) Manner of Calculating the Visual Fidelity Experience Score:

The terminal may first select, from a plurality of stored visual fidelity experience score calculation models based on a plurality of pieces of video attribute information in the visual dimension in the first sensory parameter obtained through sampling, a visual fidelity experience score calculation model corresponding to the plurality of pieces of video attribute information, and then use a plurality of video parameters in the first sensory parameter obtained through sampling at the current time, as input parameters to calculate the visual fidelity experience score at the current time using the selected visual fidelity experience score calculation model. The plurality of pieces of video attribute information include a projection format, a video coding format, a stereo degree, and a degree of freedom. The plurality of video parameters include a video bit rate, a full view resolution, time complexity, space complexity, and a field of view.

Further, the plurality of stored visual fidelity experience score calculation models may be uniformly represented by a formula 5a-1:

$$sFidelity_{visual}=f_i(bitrate\_v, resolution\_v, fps\_v, TI, SI, FOV_h, FOV_v)$$

$$i \in \{projection\_v, codec\_v, stereo\_v, DoF\_v\}, \quad (5a\text{-}1)$$

where $f_i(\ )$ is a function in different forms, bitrate_v is a video bit rate resolution_v, is a full view resolution, fps_v is a video frame rate, TI is time complexity, SI is space complexity, $FOV_h$ is a horizontal field of view of the terminal, and $FOV_v$ is a vertical field of view of the terminal. i is a vector formed by a plurality of pieces of video attribute information, projection_v is a projection format, codec_v is a coding format, stereo_v is a stereo degree, and DoF_v is a degree of freedom.

It should be noted that, the projection format projection_v may be an equirectangular projection (ERP) format, or may be a projection format such as cube projection, the coding format codec_v may be a coding format such as advanced video coding (AVC) or high efficiency video coding (HEVC), the stereo degree stereo_v may be a monocular video or a binocular stereo video, and the degree of freedom DoF_v may be three degrees of freedom or six degrees of freedom. Because the plurality of pieces of video attribute information may have different values, a plurality of different vectors i may be formed based on the plurality of pieces of video attribute information, and different $f_i(\ )$ may be selected based on different vectors to calculate the visual fidelity experience score.

Further, $f_i(\ )$ may be indicated in the following function form:

$$sFidelity_{visual}=f_i(\ )=v_1*MOS_v+v_2*FOV_h+v_3, \quad (5a\text{-}2)$$

where $v_1$, $v_2$, and $v_3$ may be set to different corresponding values based on different vectors i, that is, different vectors i correspond to $v_1$, $v_2$, and $v_3$ with different values, and $MOS_v$ is an intermediate variable representing video quality of the VR multimedia.

When content complexity formed by the time complexity and the space complexity is not considered, $MOS_v$ may be calculated using a formula 5a-3:

$$MOS_v = 1 + v_4 * \left(1 - \frac{1}{\left(\frac{BPD}{v_5}\right)^{v_6}}\right), \quad (5a\text{-}3)$$

where $v_4$, $v_5$, and $v_6$ may be set to different corresponding values based on different vectors i, that is, different vectors i correspond to $v_4$, $v_5$, and $v_6$ with different values. BPD is an intermediate variable, and is used to indicate a quantity of encoded bits in each degree of the field of view in a horizontal direction, and the BPD may be obtained through calculation using a formula 5a-4:

$$BPD = BPP * \frac{resolution\_v\_h}{360}, \quad (5a\text{-}4)$$

BPP is a quantity of encoded bits per pixel, resolution_v_h is a full view resolution in the horizontal direction and obtained by decomposing the full view resolution resolution_v, and BPP may be calculated using a formula 5a-5:

$$BPP = \frac{BPF}{resolution\_v\_h * resolution\_v\_v}, \quad (5a\text{-}5)$$

BPF is an intermediate variable, and is used to indicate a quantity of encoded bits per frame in a video picture, resolution_v_v is a full view resolution in a vertical direction and obtained by decomposing the full view resolution resolution_v, and the intermediate variable BPF may be calculated using a formula 5a-6:

$$BPF = \frac{bitrate\_v}{fps\_v}, \quad (5a\text{-}6)$$

When video content complexity of the VR multimedia is considered, may be calculated using a formula 5a-7:

$$MOS_v = 1 + v'_4 * \left(1 - \frac{1}{\left(\frac{BPD}{VCC * v'_5}\right)^{v'_6}}\right), \quad (5a\text{-}7)$$

For calculation of BPD, refer to the manner of calculating BPD when the content complexity is not considered. VCC is the video content complexity of the VR multimedia, jointly determined by the time complexity and the space complexity. VCC may be calculated using a formula 5a-8:

$$VCC=\ln(SI*TI), \quad (5a\text{-}8)$$

(2) Manner of Calculating the Acoustic Fidelity Experience Score:

The terminal needs to calculate not only the visual fidelity experience score but also the acoustic fidelity experience score. The terminal may select, from a plurality of stored acoustic fidelity experience score calculation models based on a plurality of pieces of audio attribute information in the first sensory parameter obtained through sampling, an acoustic fidelity experience score calculation model corresponding to the plurality of pieces of audio attribute information at the current time, and use at least one audio parameter included in the first sensory parameter at the current time as an input parameter to calculate the acoustic fidelity experience score at the current time using the selected acoustic fidelity experience score calculation model. The plurality of pieces of audio attribute information includes an audio sampling rate, a spatial sound, and an audio coding format. The at least one audio parameter includes an audio bit rate.

Further, the plurality of stored acoustic fidelity experience score calculation models may be uniformly represented by a formula 5a-9:

$$sFidelity_{acoustic}=f_j(bitrate\_a)$$

$$j \in \{freq\_a, stereo\_a, codec\_a\}, \quad (5a\text{-}9)$$

where $f_j(\ )$ is a function in different forms, and bitrate_a is an audio bit rate. j is a vector formed by a plurality of pieces of audio attribute information, freq_a is an audio sampling rate, codec_a is an audio coding format, and stereo_a is an audio stereo degree.

It should be noted that, a value range of the audio sampling rate freq_a may be 23 kilohertz (kHz) to 48 kHz, the audio coding format codec_a may be a coding format such as MP3 or MPEG-H, and the audio stereo degree stereo_a may be a stereo sound or may be a spatial sound. Because the plurality of pieces of audio attribute information may have different values, a plurality of different vectors j may be formed based on the plurality of pieces of audio attribute information, and different $f_j(\ )$ may be selected based on different vectors j to calculate the acoustic fidelity experience score.

Further, $f_j(\ )$ may be indicated in the following function form:

$$sFidelity_{acoustic} = f_j(\ ) = v_7 * MOS_a + v_8, \quad (5a\text{-}10)$$

where $v_7$ and $v_8$ may be set to different corresponding values based on different vectors j, that is, different vectors $v_7$ correspond to $v_7$ and $v_8$ with different values, $MOS_a$ is an intermediate variable representing audio quality of the VR multimedia, and $MOS_a$ may be calculated using a formula 5a-11:

$$MOS_a = 1 + v_9 - \frac{v_9}{1 + \left(\frac{\text{bitrate\_a}}{v_{10}}\right)^{v_{11}}}, \quad (5a\text{-}11)$$

where $v_9$, $v_{10}$, and $v_{11}$ may be set to different corresponding values based on different vectors j, that is, different vectors j correspond to $v_9$, $v_{10}$, and $v_{11}$ with different values.

(3) Determine the Fidelity Experience Score of the VR Multimedia Based on the Visual Fidelity Experience Score and the Acoustic Fidelity Experience Score at the Current Time:

After determining the visual fidelity experience score and the acoustic fidelity experience score of the VR multimedia using the foregoing method in (1) and (2), the terminal may use the determined visual fidelity experience score and acoustic fidelity experience score as input parameters, and perform calculation using the calculation model shown in a formula 5a-12, to obtain the fidelity experience score of the VR multimedia.

$$\begin{aligned}
sFidelity = \ & v_{12}sFidelity_{visual} + v_{13}sFidelity_{acoustic} + v_{14}sFidelity_{optional} + \\
& v_{15}sFidelity_{visual} * sFidelity_{acoustic} * sFidelity_{optional} + \\
& v_{16}sFidelity_{visual} * sFidelity_{acoustic} + \\
& v_{17}sFidelity_{visual} * sFidelity_{optional} + \\
& v_{18}sFidelity_{acoustic} * sFidelity_{optional} + v_{19},
\end{aligned} \quad (5a\text{-}12)$$

Because the at least two perceptual dimensions are the visual dimension and the acoustic dimension in this embodiment, that is, no other dimension exists, fidelity experience scores $sFidelity_{optional}$ in other dimensions in the formula 5a-12 are 0, but the visual fidelity experience score $sFidelity_{visual}$ and the acoustic fidelity experience score $sFidelity_{acoustic}$ are the visual fidelity experience score and the acoustic fidelity experience score that are obtained through calculation in (1) and (2). In addition, $v_{12}$ to $v_{19}$ in the formula are all preset parameters.

After determining the fidelity experience score, because the network media event or the interactive media event occurs at the current time, the terminal may calculate a corresponding experience score based on the event that occurs at the current time. If the event that occurs at the current time is the network media event, step 502a is performed, or if the event that occurs at the current time is the interactive media event, step 503a is performed.

Step 502a: If the event that occurs at the current time is the network media event, determine an enjoyment experience score of the VR multimedia based on a second sensory parameter corresponding to the current time, the currently determined fidelity experience score, and a MOS of the VR multimedia at an end of a previous network media event, and set an interaction experience score of the VR multimedia to an initial value.

Because the enjoyment experience score is based on the fidelity experience score, if the fidelity experience score changes, the enjoyment experience score also changes. Therefore, in this case, the terminal may calculate the enjoyment experience score based on the currently determined fidelity experience score, the second sensory parameter corresponding to the current time, and the MOS of the VR multimedia at the end of the previous network media event. However, for the interaction experience score, because no interactive media event occurs at the current time, the terminal may not calculate the interaction experience score, but set the interaction experience score to the initial value. The initial value may be 0 or may be another value.

It should be noted that, although the network media event occurs at the current time, the current time may not be a sampling time of the second sensory parameter. Therefore, when the enjoyment experience score is calculated based on the currently determined fidelity experience score, the second sensory parameter corresponding to the current time, and the MOS of the VR multimedia at the end of the previous network media event, a type of a network media event in the second sensory parameter corresponding to the current time may be a type of a network media event in a second sensory parameter recently obtained through sampling, but a first duration included in the second sensory parameter may be updated correspondingly based on the current time.

Further, when the terminal determines the enjoyment experience score at the current time based on the currently determined fidelity experience score and the second sensory parameter, calculation manners also vary correspondingly depending on different network media events that occur at the current time and affect enjoyment experience. Further, because typical types of network media events may include a play event, a freeze event, and a media quality change event, specific calculation manners corresponding to the foregoing three types of events are mainly described in this embodiment.

In addition, in this application, the fidelity experience score is actually an ideal score determined based on the VR multimedia, but the enjoyment experience score reflects a variation of an impairment of the ideal score that is caused by a related event due to a change of a network condition, that is, a MOS variation is calculated for the enjoyment experience score.

It should also be noted that, because when the play event, the freeze event, and the media quality change event in the network media events occur, both the visual dimension and the acoustic dimension are affected to improve operation efficiency, in this embodiment, when the enjoyment experience score is determined, an enjoyment experience score in the visual dimension and an enjoyment score in the acoustic dimension may not be calculated separately any longer, instead, an enjoyment experience score in a combination of the visual dimension and the acoustic dimension is calculated. Certainly, the terminal may also separately calculate the visual enjoyment experience score corresponding to the visual dimension and the acoustic enjoyment experience score corresponding to the acoustic dimension, and then determine the enjoyment experience score of the VR multimedia based on the enjoyment experience score in the visual dimension and the enjoyment experience score in the acoustic dimension that are obtained through calculation.

(1) When the type of the network media event included in the second sensory parameter corresponding to the current time is the play event, use the first duration included in the second sensory parameter corresponding to the current time, the currently determined fidelity experience score, and the MOS of the VR multimedia at the end of the previous network media event as input parameters to calculate the enjoyment experience score of the VR multimedia using an enjoyment experience score calculation model corresponding to the play event.

The first duration is a duration of the network media event. If the network media event that occurs at the current time is the play event, the terminal may obtain and use a duration of the play event up to the current time as the first duration. In addition, if the current time is not the sampling time of the first sensory parameter, the terminal may obtain and use a fidelity experience score recently determined before the current time, as the fidelity experience score at the current time, or if the current time is the sampling time of the first sensory parameter, the fidelity experience score obtained through calculation at the current time is the currently determined fidelity experience score. In addition, when the MOS of the VR multimedia is calculated using an event as a unit, the terminal may further obtain the MOS of the VR multimedia at the end of the previous network media event. Based on the obtained first duration, fidelity experience score, and MOS of the VR multimedia in the previous network media event, the terminal may calculate a MOS variation corresponding to the play event at the current time using a formula 5a-13, that is, an enjoyment experience score corresponding to the play event at the current time:

$$\Delta MOS_{pp}^n = \min(v_{20}*(\text{sFidelity}^n - VR\text{-}MOS^{n-1})^{v21}*\ln(t_n+1), (\text{sFidelity}^n - VR\text{-}MOS^{n-1})) \quad (5a\text{-}13)$$

where $\Delta MOS_{pp}^n$ is a corresponding MOS variation when an $n^{th}$ event is the play event, sFidelity$^n$ is the currently determined fidelity experience score, $VR\text{-}MOS^{n-1}$ is the MOS of the VR multimedia at the end of the previous network media event, and $t_n$ is the first duration.

(2) When the type of the network media event included in the second sensory parameter corresponding to the current time is the freeze event, use the first duration included in the second sensory parameter corresponding to the current time, the currently determined fidelity experience score, and the MOS of the VR multimedia at the end of the previous network media event as input parameters to calculate the enjoyment experience score of the VR multimedia using an enjoyment experience score calculation model corresponding to the freeze event.

When the network media event that occurs at the current time is the freeze event, the terminal may calculate, based on the first duration of the freeze event, the currently determined fidelity experience score, and the MOS of the VR multimedia at the end of the previous network media event, an enjoyment experience score corresponding to the freeze event at the current time using the following calculation model:

$$\Delta MOS_{pr}^n = \min(v_{22}*(VR\text{-}MOS^{n-1})^{v23}*(\exp(v_{24}*t_n) - \exp(-v_{25}*t_n)), VR\text{-}MOS^{n-1} - 1), \quad (5a\text{-}14)$$

where $\Delta MOS_{pr}^n$ is a corresponding MOS variation when an $n^{th}$ event is the freeze event, sFidelity$^n$ is the currently determined fidelity experience score, $VR\text{-}MOS^{n-1}$ is the MOS of the VR multimedia at the end of the previous network media event, and $t_n$ is the first duration.

(3) When the type of the network media event included in the second sensory parameter corresponding to the current time is the media quality change event, determine a difference between the currently determined fidelity experience score and the fidelity experience score recently determined before the current time, as the enjoyment experience score of the VR multimedia.

Because the media quality change event usually occurs at a moment, and generally occurs at a moment of switching between segments of the VR multimedia, the duration is not considered when the media quality change event is determined, but a difference between the currently determined fidelity experience score and the fidelity experience score recently determined before the current time is determined as an enjoyment experience score of the VR multimedia corresponding to the media quality change event.

In addition, the media quality change event may be a media quality improvement event, or may be a media quality deterioration event. If the media quality change event is the media quality improvement event, that is, the currently determined fidelity experience score is greater than the fidelity experience score recently determined before the current time, the enjoyment experience score obtained through calculation is a positive number. If the media quality change event is the media quality deterioration event, that is, the currently determined fidelity experience score is less than the fidelity experience score recently determined before the current time, the enjoyment experience score obtained through calculation is a negative number.

For different network media events, corresponding manners of calculating enjoyment experience scores are described separately in this embodiment. On this basis, it should also be noted that, play and calculation are performed simultaneously in a process of playing the VR multimedia in this application. Therefore, when the MOS of the VR multimedia is calculated using an event as a unit, the terminal cannot predict at which time a network media event is ended. Therefore, the terminal may set a network media event counter in an entire process of playing the VR multimedia. At an initial time of starting to play the VR multimedia, the network media event counter is initialized to 0. Because the initial time of starting to play the VR multimedia is an initial loading time, an initial loading event may be set to an event 0, but a first normal play event after the initial loading event is set to an event 1. Afterward, every time a network media event occurs, n in an event n in the network media event counter is updated to n+1. For each event n, the terminal may set a first duration of the event n to 0 when the event n starts. When a MOS variation of the event n needs to be calculated at the current time, the first duration is updated based on the current time, and the MOS variation corresponding to the event n is calculated based on the first duration. If the current time is an end time of the event n, but the terminal does not know that the current time is the end time of the event n, the terminal determines, based on a type of a network media event at a time next to the current time, that the current time is the end time of the event n. In addition, correspondingly, when detecting a change of the type of the network media event at the next time, the terminal also updates the event n to the event n+1, and correspondingly sets a first duration of the event n+1 to an initial value.

For example, assume that the VR multimedia includes three segments, where a duration of each segment is $t_1$ seconds, and an initial loading event occurs at the initial time of starting to play the VR multimedia, and the initial loading event lasts for $t_2$ seconds, then a normal play time arrives. However, a freeze event occurs at a $t_3{}^{th}$ second of a first segment during play, and the freeze event lasts for $t_4$ seconds, and then a media quality change event occurs during switching from a second segment to a third segment. As can be learned from the process of playing the VR multimedia, the event 0 is an initial loading event and lasts for $t_2$ seconds, the event 1 is a play event and lasts for $t_3$ seconds, the event 2 is a freeze event and lasts for $t_4$ seconds, and the event 3 is a play event, and a duration of the event 3 includes $t_1-t_3$ not played completely because the freeze event occurs at the $t_3{}^{th}$ second when the first segment is played, and further includes $t_1$ of an entire duration of the second segment, and therefore, the duration of the event 3 is $t_1-t_3+t_1$ seconds. When the MOS of the VR multimedia is calculated using an event as a unit, in the process of playing the VR multimedia, for each event, an enjoyment experience score may be obtained through calculation based on the corresponding duration using the foregoing calculation model corresponding to the network media event.

Step 503a: If the event that occurs at the current time is the interactive media event, determine an interaction experience score of the VR multimedia based on a third sensory parameter corresponding to the current time, and set an enjoyment experience score of the VR multimedia to an initial value.

If the event that occurs at the current time is the interactive media event, because the fidelity experience score is updated, calculation of the MOS of the VR multimedia is triggered at the current time. Therefore, the terminal needs to determine the interaction experience score at the current time. In addition, because no network media event occurs at the current time, the terminal may set the enjoyment experience score to the initial value.

In addition, although the interactive media event occurs at the current time, the current time may not be a sampling time of the interactive media event. When the interaction experience score is determined based on the third sensory parameter, a type of an interactive media event in the third sensory parameter corresponding to the current time may be a type of an interactive media event in a third sensory parameter recently obtained through sampling, but a second duration included in the third sensory parameter may be updated correspondingly based on the current time.

It should be noted that, in this application, the interaction experience score mainly reflects a variation of an impairment of the ideal score that is caused by a related event due to interaction with a user, that is, a MOS variation is calculated for the interaction experience score. In addition, because interaction experience is mainly generated due to interaction with the user, the interaction experience score is not related to the fidelity experience score, that is, the fidelity experience score may not need to be considered when the interaction experience score is calculated, but calculation needs to be performed based only on the second duration. The second duration is a duration of the interactive media event. In addition, typical events that affect the interaction experience score mainly include an initial loading event, an interactive loading event, or a media hysteresis event. Therefore, for the foregoing several events, corresponding manners of calculating interaction experience scores are separately described in this embodiment.

(1) The initial loading event is media buffering that occurs at the initial time of starting to play the VR multimedia. When the type of the interactive media event included in the third sensory parameter corresponding to the current time is the initial loading event, the terminal may calculate an interaction experience score corresponding to the initial loading event using a calculation model 5a-15:

$$\Delta MOS_{il}{}^n = v_{26} * \ln(v_{27} * t_{init}), \tag{5a-15}$$

where $\Delta MOS_{il}{}^n$ is a MOS variation caused by the initial loading event, that is, the interaction experience score corresponding to the initial loading event at the current time, and $t_{init}$ is a second duration corresponding to the initial loading event.

(2) The interactive loading event is loading in scene switching due to a user operation. When the type of the interactive media event included in the third sensory parameter corresponding to the current time is the interactive loading event, the terminal may calculate an interaction experience score corresponding to the interactive loading event using a calculation model 5a-16:

$$\Delta MOS_{ol}{}^n = v_{28} * \ln(v_{29} * t_{loading}), \tag{5a-16}$$

where $\Delta MOS_{ol}{}^n$ is a MOS variation caused by the interactive loading event, that is, the interaction experience score corresponding to the interactive loading event at the current time, and $t_{loading}$ is a second duration corresponding to the interactive loading event.

(3) The media hysteresis event is a hysteresis event that occurs between a media update and an action due to a user action, where the user action may be an action such as a change of a location or a body posture or turning of a head of the user. When the type of the interactive media event included in the third sensory parameter corresponding to the current time is the media hysteresis event, the terminal may calculate an interaction experience score corresponding to the media hysteresis event using a calculation model 5a-17:

$$\Delta MOS_{dm}{}^n = \max(4*(v_{30}*\ln(v_{31}*(MOS_m + v_{32})) + v_{33}), 0), \tag{5a-17}$$

where $\Delta MOS_{dm}{}^n$ is a MOS variation caused by the media hysteresis event, that is, the interaction experience score corresponding to the media hysteresis event at the current time, and $MOS_m$ is an intermediate variable and may be obtained through calculation using a formula 5a-18:

$$MOS_m = \begin{cases} 4.2, & t_d < 20 \\ v_{34} * \exp(v_{35} * t_d) + v_{36}, & t_d \geq 20 \end{cases}, \tag{5a-18}$$

where $t_d$ is a second duration corresponding to the media hysteresis event.

Using the foregoing methods described in (1) to (3), interaction experience scores corresponding to different interactive media events may be determined respectively. In addition, it should also be noted that, play and calculation are performed simultaneously in the process of playing the VR multimedia in this application. Therefore, when the MOS of the VR multimedia is calculated using an event as a unit, the terminal cannot predict in advance at which time the interactive media event is ended. Therefore, the terminal may set an interactive media event counter in the entire process of playing the VR multimedia. Further, for manners of setting the interactive media event counter and updating the event counter, refer to the description about the network media event counter in the foregoing step 502a. Details are not described again in this embodiment.

Step 504a: Use the fidelity experience score, the enjoyment experience score, and the interaction experience score of the VR multimedia that are determined at the current time, as input parameters to calculate a MOS of the VR multimedia using a preset VR multimedia MOS calculation model.

After determining the fidelity experience score, the enjoyment experience score, and the interaction experience score, the terminal may use the fidelity experience score, the enjoyment experience score, and the interaction experience score as the input parameters to calculate the MOS of the VR multimedia using the preset VR multimedia MOS calculation model.

It should be noted that, the preset VR multimedia MOS calculation model may be a linear calculation model, or may be a non-linear calculation model. Further, the linear calculation model is shown in a formula 5a-19, and the non-linear calculation model is shown in a formula 5a-20.

$$f(sFidelity, sEnjoyment, sInteraction) = sFidelity + g(sEnjoyment, sInteraction), \quad (5a\text{-}19)$$

$$f(sFidelity, sEnjoyment, sInteraction) = sFidelity * g(sEnjoyment, sInteraction), \quad (5a\text{-}20)$$

where f(sFidelity,sEnjoyment,sInteraction) is the MOS of the VR multimedia, sFidelity is the fidelity experience score of the VR multimedia, sEnjoyment is the enjoyment experience score of the VR multimedia, and sInteraction is the interaction experience score of the VR multimedia.

The function g(sEnjoyment,sInteraction) may be a linear function or may be a non-linear function. When the function g(sEnjoyment,sInteraction) is the linear function, the function may be indicated by a formula 5a-21:

$$g(sEnjoyment, sInteraction) = \alpha \times sEnjoyment + \beta \times sInteraction, \quad (5a\text{-}21)$$

When the function g(sEnjoyment,sInteraction) is the non-linear function, the function may be indicated by a formula 5a-22:

$$g(sEnjoyment, sInteraction) = (\alpha \times sEnjoyment) \times (\beta \times sInteraction), \quad (5a\text{-}22)$$

where $\alpha$ and $\beta$ are preset parameters.

In this embodiment of the present disclosure, when the fidelity experience score is determined, influence of distinctive parameters of the VR multimedia such as the field of view, the projection format, the stereo degree, the degree of freedom, and the spatial sound on fidelity experience is considered. Therefore, the fidelity experience score determined based on this is also more accurate. In addition, determining of the enjoyment experience score is not only related to a nature of an event in a current event period, but also related to a MOS of the VR multimedia corresponding to a previous event. This is equivalent to considering influence of the previous event that occurs in the process of playing the VR multimedia. Therefore, the determined enjoyment experience score is more comprehensive and more accurate.

Figure 5B:
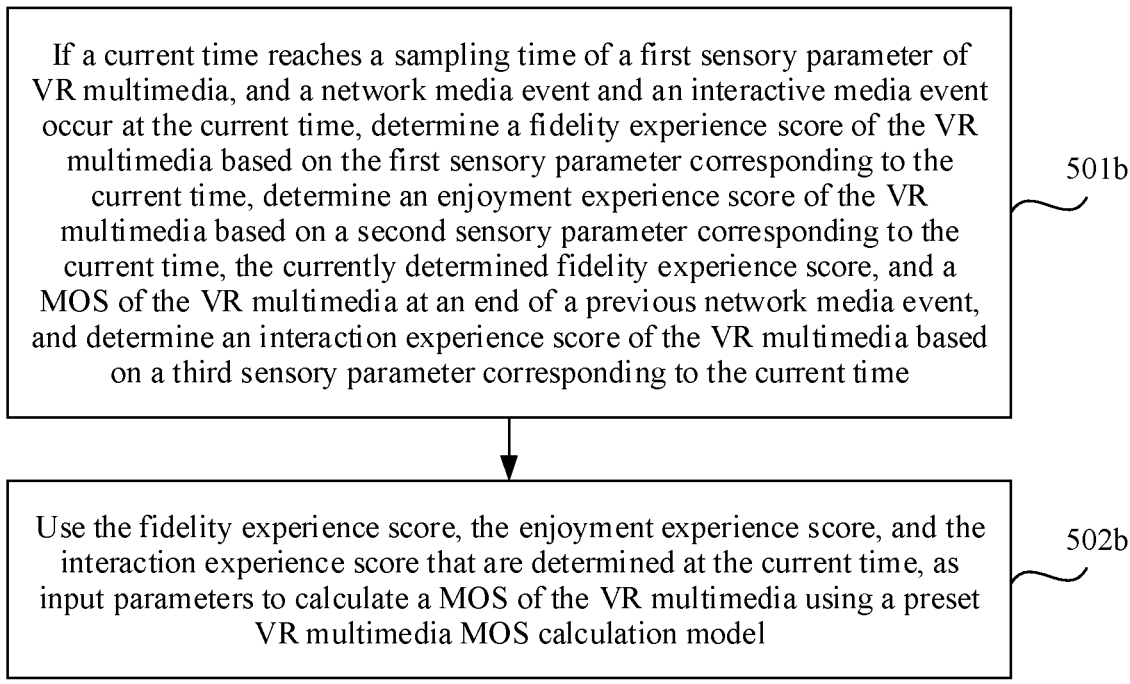
FIG. 5B is a flowchart of a method for determining a MOS of VR multimedia using an event as a unit according to an embodiment of the present disclosure.

A method for determining a MOS of VR multimedia using an event as a unit when a current time is a sampling time of a first sensory parameter of the VR multimedia and a network media event or an interactive media event occurs at the current time is described in FIG. 5A. With reference to FIG. 5B, the following describes a method for determining a MOS of VR multimedia using an event as a unit when a current time is a sampling time of a first sensory parameter of the VR multimedia and a network media event and an interactive media event occur simultaneously at the current time.

FIG. 5B is a flowchart of another method for determining a MOS of VR multimedia using an event as a unit according to an embodiment of the present disclosure. As shown in FIG. 5B, the method includes the following steps.

Step 501b: If a current time reaches a sampling time of a first sensory parameter of VR multimedia, and a network media event and an interactive media event occur at the current time, determine a fidelity experience score of the VR multimedia based on the first sensory parameter corresponding to the current time, determine an enjoyment experience score of the VR multimedia based on a second sensory parameter corresponding to the current time, the currently determined fidelity experience score, and a MOS of the VR multimedia at an end of a previous network media event, and determine an interaction experience score of the VR multimedia based on a third sensory parameter corresponding to the current time.

Based on the foregoing descriptions, if the current time reaches the sampling time of the first sensory parameter of the VR multimedia, and the network media event and the interactive media event occur simultaneously at the current time, a terminal further needs to calculate the interaction experience score in addition to the fidelity experience score and the enjoyment experience score.

For a manner of calculating the fidelity experience score by the terminal, refer to the description about step 501a of calculating the fidelity experience score. For a manner of determining the enjoyment experience score by the terminal, refer to the description about step 502a of calculating the enjoyment experience score. In addition, for a manner of determining the interaction experience score by the terminal, refer to the description about step 503a of calculating the interaction experience score. Details are not described again in this embodiment of the present disclosure.

Step 502b: Use the fidelity experience score, the enjoyment experience score, and the interaction experience score that are determined at the current time, as input parameters to calculate a MOS of the VR multimedia using a preset VR multimedia MOS calculation model.

For a specific implementation of using the fidelity experience score, the enjoyment experience score, and the interaction experience score that are determined at the current time, as the input parameters to calculate the MOS of the VR multimedia using the preset VR multimedia MOS calculation model, refer to step 504a. Details are not described again in this embodiment of the present disclosure.

In this embodiment of the present disclosure, when the fidelity experience score is determined, influence of distinctive parameters of the VR multimedia such as a field of view, a projection format, a stereo degree, a degree of freedom, and a spatial sound on fidelity experience is considered. Therefore, the fidelity experience score determined based on this is also more accurate. In addition, determining of the enjoyment experience score is not only related to a nature of an event in a current event period, but also related to a MOS of the VR multimedia corresponding to a previous event. This is equivalent to considering influence of the previous event that occurs in a process of playing the VR multimedia. Therefore, the determined enjoyment experience score is more comprehensive and more accurate. In addition, because the interactive media event occurs at the current time, the terminal may calculate the interaction experience score, to determine the MOS of the VR multimedia corresponding to the current time, that is, the terminal also updates the interaction experience score correspondingly. Therefore, accuracy of the MOS of the VR multimedia is improved.

Figure 5C:
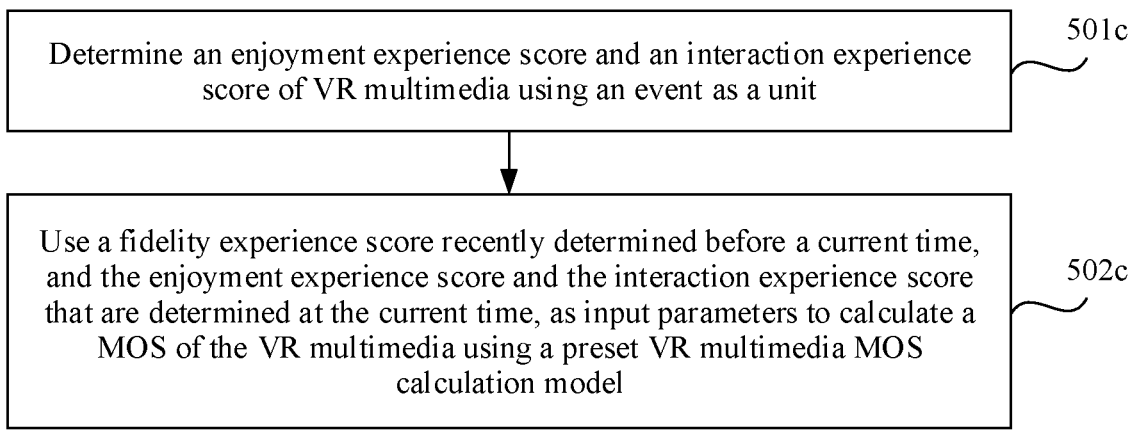
FIG. 5C is a flowchart of a method for determining a MOS of VR multimedia using an event as a unit according to an embodiment of the present disclosure.

Implementation processes of determining a MOS of VR multimedia when a current time is a sampling time of a first sensory parameter and a network media event and/or an interactive media event occur/occurs at the current time are separately described above with reference to FIG. 5A and FIG. 5B. In addition to the foregoing two cases, the terminal may further trigger calculation and output a fidelity experience score, an enjoyment experience score, and an interaction score at an end of an event that occurs, and further obtain a MOS of the VR multimedia corresponding to the event through joint calculation based on the fidelity experience score, the enjoyment experience score, and the interaction experience score. Details are shown in FIG. 5C.

Step 501c: Determine an enjoyment experience score and an interaction experience score of VR multimedia using an event as a unit.

If a current time does not reach a sampling time of a first sensory parameter of the VR multimedia, a terminal may determine the enjoyment experience score and the interaction experience score of the VR multimedia in three cases depending on whether a network media event and an interactive media event occur at the current time and whether an event that occurs is ended.

First case: If a network media event occurs at the current time but no interactive media event occurs at the same time, and it is detected at the current time that the network media event is ended, determine the enjoyment experience score of the VR multimedia based on a second sensory parameter corresponding to the current time, a fidelity experience score recently determined before the current time, and a MOS of the VR multimedia at an end of a previous network media event, and set the interaction experience score of the VR multimedia to an initial value.

Because calculation of the enjoyment experience score of the VR multimedia further needs to depend on a fidelity experience score at the current time, but the current time is not a calculation time of the fidelity experience score, that is, no fidelity experience score is obtained through calculation at the current time, in this case, the terminal may obtain and use the fidelity experience score recently determined before the current time, as an input parameter for calculating the enjoyment experience score. In addition, the terminal may further obtain the MOS of the VR multimedia at the end of the previous network media event, and obtain the enjoyment experience score of the VR multimedia through calculation with reference to the obtained fidelity experience score and the second sensory parameter obtained through sampling.

Because no interactive media event occurs at the current time, the terminal may set the interaction experience score to the initial value.

Second case: If an interactive media event occurs at the current time but no network media event occurs at the same time, and it is detected at the current time that the interactive media event is ended, determine the interaction experience score of the VR multimedia based on a third sensory parameter corresponding to the current time, and set the enjoyment experience score of the VR multimedia to an initial value.

If the current time is an end time of the interactive media event, calculation of the interaction experience score of the VR multimedia is triggered, and further, calculation of a MOS of the VR multimedia is triggered.

For calculation of the interaction experience score of the VR multimedia, refer to the manner of calculating the interaction experience score in step 503a. Because no network media event occurs, the enjoyment experience score of the VR multimedia may be set to the initial value.

Third case: If a network media event and an interactive media event occur at the current time, and it is detected at the current time that the network media event and/or the interactive media event are/is ended, determine the enjoyment experience score of the VR multimedia based on a second sensory parameter corresponding to the current time, a fidelity experience score recently determined before the current time, and a MOS of the VR multimedia at an end of a previous network media event, and determine the interaction experience score of the VR multimedia based on a third sensory parameter corresponding to the current time.

If the network media event and the interactive media event occur simultaneously at the current time, as long as one of the events that occur is ended, calculation of the enjoyment experience score and the interaction experience score of the VR multimedia is triggered, and further, calculation of a MOS of the VR multimedia is triggered.

For calculation of the enjoyment experience score of the VR multimedia, refer to calculation of the enjoyment experience score in step 502a. For calculation of the interaction experience score of the VR multimedia, refer to the method for determining the interaction experience score in step 503a.

Step 502c: Use a fidelity experience score recently determined before a current time, and the enjoyment experience score and the interaction experience score that are determined at the current time, as input parameters to calculate a MOS of the VR multimedia using a preset VR multimedia MOS calculation model.

Because no fidelity experience score is calculated at the current time, the terminal may use the fidelity experience score recently determined before the current time, and the enjoyment experience score and the interaction experience score that are determined at the current time, as the input parameters for calculating the MOS of the VR multimedia. For a method for calculating the MOS of the VR multimedia using the preset VR multimedia MOS calculation model based on the input parameters, refer to the corresponding method in step 504a.

In this embodiment of the present disclosure, because the current time does not reach the sampling time of the first sensory parameter, the fidelity experience score does not change. Therefore, the terminal can directly obtain fidelity experience, and a quantity of operations is reduced. In addition, determining of the enjoyment experience score is not only related to a nature of an event in a current event period, but also related to a MOS of the VR multimedia corresponding to a previous event. This is equivalent to considering influence of the previous event that occurs in a process of playing the VR multimedia. Therefore, the determined enjoyment experience score is more comprehensive and more accurate. In addition, because the interactive media event occurs at the current time, the terminal may calculate the interaction experience score, to determine the MOS of the VR multimedia corresponding to the current time, that is, the terminal also updates the interaction experience score correspondingly. Therefore, accuracy of the MOS of the VR multimedia is improved.

Figure 6A:
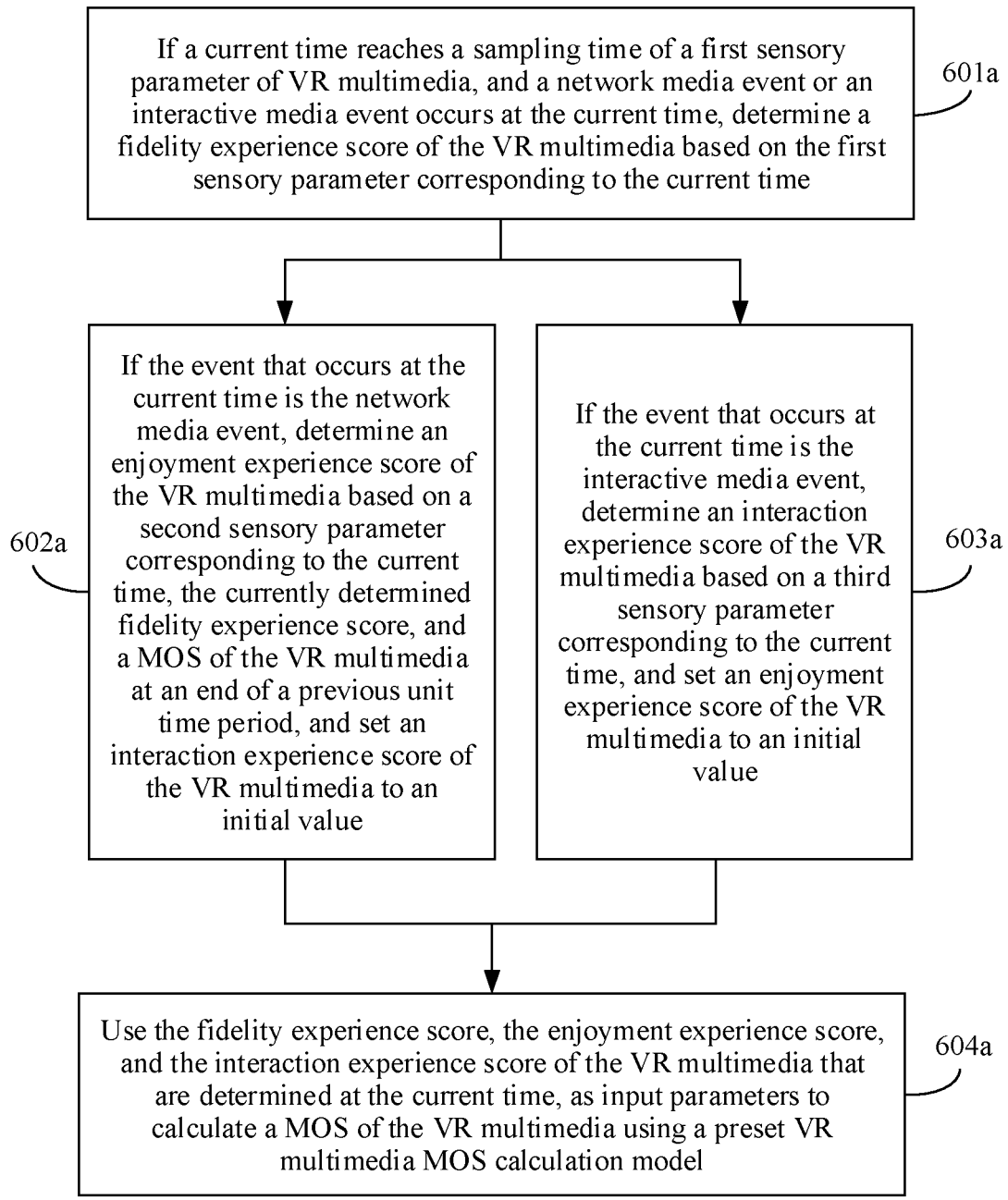
FIG. 6A is a flowchart of a method for determining a MOS of VR multimedia using a unit time period as a unit according to an embodiment of the present disclosure.

Three methods for determining a MOS of VR multimedia using an event as a unit are described above with reference to FIG. 5A to FIG. 5C. Likewise, three manners of determining a MOS of VR multimedia using a unit time period as a unit also exist when a current time corresponds to different cases. With reference to FIG. 6A to FIG. 6C, the following describes the three methods for determining the MOS of the VR multimedia using a unit time period as a unit.

FIG. 6A is a method for determining a MOS of VR multimedia using a unit time period as a unit according to an embodiment of the present disclosure. As shown in FIG. 6A, the method includes the following steps.

Step 601a: If a current time reaches a sampling time of a first sensory parameter of VR multimedia, and a network media event or an interactive media event occurs at the current time, determine a fidelity experience score of the VR multimedia based on the first sensory parameter corresponding to the current time.

When a MOS of the VR multimedia is determined using a unit time period as a unit, if the current time reaches the sampling time of the first sensory parameter of the VR multimedia, a terminal may calculate the corresponding fidelity experience score based on the first sensory parameter obtained through sampling. For a manner of calculating the fidelity experience score by the terminal based on the first sensory parameter obtained through sampling, refer to the manner of calculating the fidelity experience score in step 501a.

After the terminal obtains the fidelity experience score through calculation, because the network media event or the interactive media event occurs at the current time, the terminal may calculate a corresponding experience score based on the event that occurs at the current time. If the event that occurs at the current time is the network media event, step 602a is performed, or if the event that occurs at the current time is the interactive media event, step 603a is performed.

Step 602a: If the event that occurs at the current time is the network media event, determine an enjoyment experience score of the VR multimedia based on a second sensory parameter corresponding to the current time, the currently determined fidelity experience score, and a MOS of the VR multimedia at an end of a previous unit time period, and set an interaction experience score of the VR multimedia to an initial value.

If the event that occurs at the current time is the network media event, after the fidelity experience score is determined, because the MOS of the VR multimedia is determined using a unit time period as a unit in this embodiment, the terminal may obtain and use the MOS of the VR multimedia at the end of the previous unit time period as an input parameter for calculating the enjoyment experience score at the current time. In addition, the terminal further needs to calculate the enjoyment experience score of the VR multimedia with reference to the second sensory parameter corresponding to the current time and the currently determined fidelity experience score.

It should be noted that, for a specific manner of calculating the fidelity experience score by the terminal, reference may be made to the manner of calculating the fidelity experience score that is described in step 501a.

In addition, in the manner of calculating the enjoyment experience score by the terminal, only the MOS of the VR multimedia at the end of the previous network media event that is input in the foregoing step 502a needs to be changed to the MOS of the VR multimedia at the end of the previous unit time period, and reference may be made for corresponding remaining parts. Details are not described again in this embodiment of the present disclosure.

Step 603a: If the event that occurs at the current time is the interactive media event, determine an interaction experience score of the VR multimedia based on a third sensory parameter corresponding to the current time, and set an enjoyment experience score of the VR multimedia to an initial value.

For a manner of determining the interaction experience score of the VR multimedia based on the third sensory parameter corresponding to the current time, refer to the manner of calculating the interaction experience score in step 503a. In addition, because no network media event occurs at the current time, the enjoyment experience score may be set to the initial value.

Step 604a: Use the fidelity experience score, the enjoyment experience score, and the interaction experience score of the VR multimedia that are determined at the current time, as input parameters to calculate a MOS of the VR multimedia using a preset VR multimedia MOS calculation model.

For a method for using the fidelity experience score, the enjoyment experience score, and the interaction experience score of the VR multimedia that are determined at the current time, as the input parameters to calculate the MOS of the VR multimedia by the terminal using the preset VR multimedia MOS calculation model, refer to step 504a.

In this embodiment of the present disclosure, when the fidelity experience score is determined, influence of distinctive parameters of the VR multimedia such as a field of view, a projection format, a stereo degree, a degree of freedom, and a spatial sound on fidelity experience is considered. Therefore, the fidelity experience score determined based on this is also more accurate. In addition, determining of the enjoyment experience score is not only related to whether an event occurs in the current unit time period, but also related to the MOS of the VR multimedia corresponding to the previous unit time period. This is equivalent to considering influence of a previous event that occurs in a process of playing the VR multimedia. Therefore, the determined enjoyment experience score is more comprehensive and more accurate.

A method for determining a MOS of VR multimedia using a unit time period as a unit when a current time is a sampling time of a first sensory parameter of the VR multimedia and a network media event or an interactive media event occurs at the current time is described in FIG. 6A. With reference to FIG. 6B, the following describes a method for determining a MOS of VR multimedia using a unit time period as a unit when a current time is a sampling time of a first sensory parameter of the VR multimedia and a network media event and an interactive media event occur simultaneously at the current time.

FIG. 6B is a flowchart of another method for determining a MOS of VR multimedia using a unit time period as a unit according to an embodiment of the present disclosure. As shown in FIG. 6B, the method includes the following steps.

Step 601b: If a current time reaches a sampling time of a first sensory parameter of VR multimedia, and a network media event and an interactive media event occur at the current time, determine a fidelity experience score of the VR multimedia based on the first sensory parameter corresponding to the current time, determine an enjoyment experience score of the VR multimedia based on a second sensory parameter corresponding to the current time, the currently determined fidelity experience score, and a MOS of the VR multimedia at an end of a previous unit time period, and determine an interaction experience score of the VR multimedia based on a third sensory parameter corresponding to the current time.

If the current time reaches the sampling time of the first sensory parameter of the VR multimedia, and the network media event and the interactive media event occur simultaneously at the current time, the terminal further needs to calculate the interaction experience score in addition to the fidelity experience score and the enjoyment experience score.

For a method for calculating the enjoyment experience score by the terminal, refer to the descriptions in step 602a. In addition, although the interactive media event occurs at the current time, the current time may not be a sampling time of the interactive media event. When the interaction experience score is determined based on the third sensory parameter, a type of an interactive media event in the third sensory parameter corresponding to the current time may be a type of an interactive media event in a third sensory parameter recently obtained through sampling, but a duration included in the third sensory parameter may be updated correspondingly based on the current time.

For specific manners of calculating the fidelity experience score and the interaction experience score by the terminal, respectively refer to the manner of calculating the fidelity experience score that is described in step 501a and the manner of calculating the interaction experience score in step 503a. Details are not described again in this embodiment of the present disclosure.

In addition, in the specific manner of calculating the enjoyment experience score by the terminal, only the MOS of the VR multimedia at the end of the previous network media event that is input for calculating the enjoyment experience score as described in the foregoing step 502a needs to be changed to the MOS of the VR multimedia at the end of the previous unit time period, and reference may be made for corresponding remaining parts. Details are not described again in this embodiment of the present disclosure.

Step 602b: Use the fidelity experience score, the enjoyment experience score, and the interaction experience score that are determined at the current time, as input parameters to calculate a MOS of the VR multimedia using a preset VR multimedia MOS calculation model.

For a specific implementation of using the fidelity experience score, the enjoyment experience score, and the interaction experience score that are determined at the current time, as the input parameters to calculate the MOS of the VR multimedia using the preset VR multimedia MOS calculation model, refer to step 504a. Details are not described again in this embodiment of the present disclosure.

In this embodiment of the present disclosure, when the fidelity experience score is determined, influence of distinctive parameters of the VR multimedia such as a field of view, a projection format, a stereo degree, a degree of freedom, and a spatial sound on fidelity experience is considered. Therefore, the fidelity experience score determined based on this is also more accurate. In addition, determining of the enjoyment experience score is not only related to whether an event occurs in the current unit time period, but also related to the MOS of the VR multimedia corresponding to the previous unit time period. This is equivalent to considering influence of a previous event that occurs in a process of playing the VR multimedia. Therefore, the determined enjoyment experience score is more comprehensive and more accurate. In addition, because the interactive media event occurs at the current time, the terminal may calculate the interaction experience score to determine the MOS of the VR multimedia corresponding to the current time, that is, the terminal also updates the interaction experience score correspondingly. Therefore, accuracy of the MOS of the VR multimedia is improved.

Implementation processes of determining a MOS of VR multimedia when a current time is a sampling time of a first sensory parameter and a network media event and/or an interactive media event occur/occurs at the current time are separately described above with reference to FIG. 6A and FIG. 6B. In addition to the foregoing two cases, the terminal may further trigger calculation and output a fidelity experience score, an enjoyment experience score, and an interaction score at an end of a unit time period or an end of an event that occurs, and further obtain a MOS of the VR multimedia corresponding to the event through joint calculation based on the fidelity experience score, the enjoyment experience score, and the interaction experience score. Details are shown in FIG. 6C.

Step 601c: Determine an enjoyment experience score and an interaction experience score of VR multimedia using a unit time period as a unit.

If a current time does not reach a sampling time of a first sensory parameter of the VR multimedia, a terminal may determine the enjoyment experience score and the interaction experience score of the VR multimedia in the following several cases depending on whether a network media event and an interactive media event occur at the current time, whether an event that currently occurs is ended, and whether a unit time period is ended.

First case: If a network media event occurs at the current time but no interactive media event occurs at the same time, and it is detected at the current time that the network media event is ended or that a unit time period is ended, determine the enjoyment experience score of the VR multimedia based on a second sensory parameter corresponding to the current time, a fidelity experience score recently determined before the current time, and a MOS of the VR multimedia at an end of a previous unit time period, and set the interaction experience score of the VR multimedia to an initial value.

(1) If only the network media event occurs at the current time, and the network media event is not ended, but the current time is an end time of the unit time period, the terminal may calculate the enjoyment experience score of the VR multimedia based on the second sensory parameter of the current time. Because calculation of the enjoyment experience score of the VR multimedia further needs to depend on a fidelity experience score at the current time, but the current time is not a calculation time of the fidelity experience score, that is, no fidelity experience score is obtained through calculation at the current time, in this case, the terminal may obtain and use the fidelity experience score recently determined before the current time in the current unit time period, as an input parameter. In addition, the terminal may further obtain the MOS of the VR multimedia at the end of the previous unit time period, and obtain the enjoyment experience score of the VR multimedia through calculation with reference to the obtained fidelity experience score and the second sensory parameter obtained through sampling.

Because no interactive media event occurs at the current time, the terminal may set the interaction experience score to the initial value.

(2) If only the network media event occurs at the current time, and the current time is an end time of the network media event, but the current time is not an end time of the unit time period, the terminal may also determine the enjoyment experience score and the interaction experience score according to the manner of determining the enjoyment experience score and the interaction experience score in (1).

Second case: If an interactive media event occurs at the current time but no network media event occurs at the same time, and it is detected at the current time that the interactive media event is ended or that a unit time period is ended, determine the interaction experience score of the VR multimedia based on a third sensory parameter corresponding to the current time, and set the enjoyment experience score of the VR multimedia to an initial value.

Third case: If a network media event and an interactive media event occur at the current time, and it is detected at the current time that a unit time period is ended, or if a network media event and an interactive media event occur at the current time, and it is detected at the current time that the network media event and/or the interactive media event are/is ended and it is not detected that a unit time period is ended, determine the enjoyment experience score of the VR multimedia based on a second sensory parameter corresponding to the current time, a fidelity experience score recently determined before the current time in the current unit time period, and a MOS of the VR multimedia at an end of a previous unit time period, and determine the interaction experience score of the VR multimedia based on a third sensory parameter corresponding to the current time.

If the interactive media event and the network media event occur simultaneously at the current time, and the current time is an end time of the unit time period, but it is not detected that the network media event and/or the interactive media event are/is ended, calculation of the enjoyment experience score and the interaction experience score of the VR multimedia is triggered, and further, calculation of a MOS of the VR multimedia is triggered.

If the network media event and the interactive media event occur simultaneously at the current time, and it is detected at the current time that at least one of the network media event and the interactive media event is ended, but it is not detected that the unit time period is ended, calculation of the enjoyment experience score and the interaction experience score of the VR multimedia is also triggered, and further, calculation of a MOS of the VR multimedia is triggered.

For calculation of the enjoyment experience score of the VR multimedia, refer to the description about calculation of the enjoyment experience score in step 601*b*. For calculation of the interaction experience score of the VR multimedia, refer to the method for determining the interaction experience score in step 503*a*.

Step 602*c*: Use a fidelity experience score recently determined before a current time, and the enjoyment experience score and the interaction experience score that are determined at the current time, as input parameters to calculate a MOS of the VR multimedia using a preset VR multimedia MOS calculation model.

Because no fidelity experience score is calculated at the current time, the terminal may use the fidelity experience score recently determined before the current time in the current unit time period, and the enjoyment experience score and the interaction experience score that are determined at the current time, as the input parameters for calculating the MOS of the VR multimedia. For a method for calculating the MOS of the VR multimedia using the preset VR multimedia MOS calculation model based on the input parameters, refer to the corresponding method in step 504*a*.

In this embodiment of the present disclosure, because the current time does not reach the sampling time of the first sensory parameter, the fidelity experience score does not change. Therefore, the terminal can directly obtain fidelity experience, and a quantity of operations is reduced. In addition, determining of the enjoyment experience score is not only related to whether an event occurs in the current unit time period, but also related to the MOS of the VR multimedia corresponding to the previous unit time period.

This is equivalent to considering influence of a previous event that occurs in a process of playing the VR multimedia. Therefore, the determined enjoyment experience score is more comprehensive and more accurate. In addition, because the interactive media event occurs at the current time, the terminal may calculate the interaction experience score to determine and obtain the MOS of the VR multimedia corresponding to the current time, that is, the terminal also updates the interaction experience score correspondingly. Therefore, accuracy of the MOS of the VR multimedia is improved.

Figure 7:
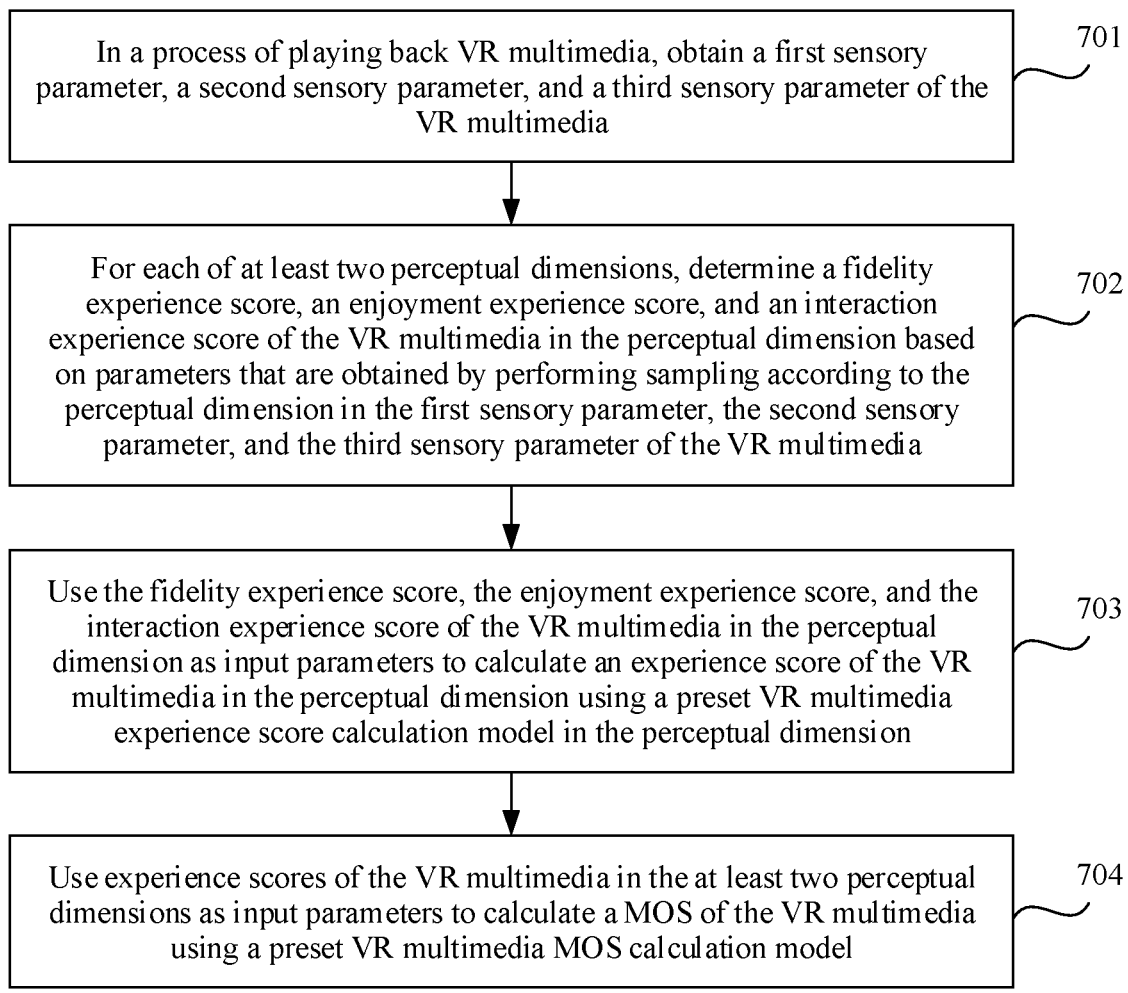
FIG. 7 is a flowchart of another method for determining experience quality of VR multimedia according to an embodiment of the present disclosure.

In this embodiment of the present disclosure, the first method for determining a MOS of VR multimedia is explained and described with reference to FIG. 4 to FIG. 6C in the foregoing embodiments. That is, an implementation process of determining a fidelity experience score, an enjoyment experience score, and an interaction experience score by a terminal based on obtained parameters, and further determining a MOS of the VR multimedia is described. In the following embodiments, the second method for determining a MOS of VR multimedia is explained and described with reference to FIG. 7 to FIG. 9C. FIG. 7 is another method for determining experience quality of VR multimedia according to an embodiment of the present disclosure. As shown in FIG. 7, the method includes the following steps.

Step 701: In a process of playing VR multimedia, obtain a first sensory parameter, a second sensory parameter, and a third sensory parameter of the VR multimedia.

In the process of playing the VR multimedia, a terminal may obtain the first sensory parameter, the second sensory parameter, and the third sensory parameter by performing sampling on the VR multimedia. Sampling periods for sampling the first sensory parameter, the second sensory parameter, and the third sensory parameter by the terminal may be different.

For example, the terminal may sample the first sensory parameter once using a GoP as a unit, or may sample the first sensory parameter once using a segment as a unit, or certainly may further sample the first sensory parameter using a preset sampling period. For another example, the terminal may sample the third sensory parameter once when detecting a change of a location of a user, or may sample the third sensory parameter once based on a preset sampling period or using a GoP as a unit. That is, when the terminal samples the first sensory parameter, a sampling time of the second sensory parameter or the third sensory parameter may not arrive.

Step 702: For each of at least two perceptual dimensions, determine a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia.

In the process of playing the VR multimedia, the first sensory parameter, the second sensory parameter, and the third sensory parameter of the VR multimedia are obtained by performing sampling according to the at least two perceptual dimensions, that is, the first sensory parameter, the second sensory parameter, and the third sensory parameter all include parameters corresponding to a visual dimension and parameters corresponding to an acoustic dimension. Therefore, for each of the at least two perceptual dimensions, the terminal may determine the fidelity experience score, the enjoyment experience score, and the interaction experience score of the VR multimedia in the perceptual dimension based on the parameters that are obtained by performing sampling according to the perceptual dimension in the first sensory parameter, the second sensory parameter, and the third sensory parameter.

For example, the first sensory parameter, the second sensory parameter, and the third sensory parameter all include the parameters corresponding to the visual dimension and the parameters corresponding to the acoustic dimension, and the terminal may calculate a visual fidelity experience score, a visual enjoyment experience score, and a visual interaction experience score respectively based on the parameters corresponding to the visual dimension in the first sensory parameter, the second sensory parameter, and the third sensory parameter. In addition, the terminal may calculate an acoustic fidelity experience score, an acoustic enjoyment experience score, and an acoustic interaction experience score respectively based on the parameters corresponding to the acoustic dimension in the first sensory parameter, the second sensory parameter, and the third sensory parameter. Certainly, if the first sensory parameter, the second sensory parameter, and the third sensory parameter further include parameters corresponding to another dimension, such as a feedback dimension, the terminal may further calculate a feedback fidelity experience score, a feedback enjoyment experience score, and a feedback interaction experience score respectively based on the parameters corresponding to the feedback dimension in the first sensory parameter, the second sensory parameter, and the third sensory parameter.

It should be noted that, for descriptions about a method for performing sampling on the first sensory parameter, the second sensory parameter, and the third sensory parameter of the VR multimedia by the terminal, refer to the descriptions in step 401. Details are not described again in this embodiment.

In addition, as described in step 401, because sampling periods of sensory parameters are different, occasions of determining the fidelity experience score, the enjoyment experience score, and the interaction score by the terminal based on the first sensory parameter, the second sensory parameter, and the third sensory parameter are also different. Likewise, in this embodiment, due to different sampling periods of sensory parameters, occasions of calculating the fidelity experience score, the enjoyment experience score, and the interaction experience score corresponding to each perceptual dimension by the terminal are also different.

Further, for each of the at least two perceptual dimensions, using an event that occurs in the process of playing the VR multimedia as a unit, the terminal may trigger calculation and output a fidelity experience score, an enjoyment experience score, and an interaction score once at an end of the event that occurs, to subsequently obtain, through joint calculation based on the fidelity experience score, the enjoyment experience score, and the interaction experience score in the perceptual dimension, an experience score of the VR multimedia corresponding to the event in the perceptual dimension.

In addition, using a preset unit time period as a unit, the terminal may also trigger calculation and output a fidelity experience score, an enjoyment experience score, and an interaction score in the perceptual dimension once at an end of a unit time period in the process of playing the VR multimedia, to subsequently obtain, through joint calculation based on the fidelity experience score, the enjoyment experience score, and the interaction experience score in the perceptual dimension, an experience score of the VR multimedia in the perceptual dimension corresponding to the unit time period.

It should also be noted that, when a sampling time of the first sensory parameter arrives, because the first sensory parameter obtained through sampling may change in comparison with a first sensory parameter at a previous sampling time, the terminal needs to calculate a fidelity experience score based on the first sensory parameter obtained through sampling. However, because an enjoyment experience score is determined based on the fidelity experience score, after the fidelity experience score in the perceptual dimension is obtained through calculation, the enjoyment experience score in the perceptual dimension further needs to be determined based on the fidelity experience score in the perceptual dimension. That is, when the sampling time of the first sensory parameter arrives, a calculation time of the fidelity experience score in the perceptual dimension also arrives. However, when the calculation time of the fidelity experience score in the perceptual dimension arrives, calculation may be triggered and an enjoyment experience score and an interaction experience score in the perceptual dimension may be output once, and an experience score of the VR multimedia in the perceptual dimension is further calculated once.

As can be learned from the foregoing descriptions, when sampling periods of sensory parameters are different, for each of the at least two perceptual dimensions, occasions of determining the fidelity experience score, the enjoyment experience score, and the interaction score in the perceptual dimension by the terminal based on the first sensory parameter, the second sensory parameter, and the third sensory parameter are also different. In addition, the terminal may also calculate the fidelity experience score, the enjoyment experience score, and the interaction experience score of the VR multimedia in the perceptual dimension using an event that occurs in the process of playing the VR multimedia as a unit, or using a preset unit time period as a unit. Therefore, there is a plurality of implementations of calculating the fidelity experience score, the enjoyment experience score, and the interaction experience score of the VR multimedia in the perceptual dimension. The implementations are discussed in the following embodiments of this application.

Step 703: Use the fidelity experience score, the enjoyment experience score, and the interaction experience score of the VR multimedia in the perceptual dimension as input parameters to calculate an experience score of the VR multimedia in the perceptual dimension using a preset VR multimedia experience score calculation model in the perceptual dimension.

Based on the descriptions in step 701, for each of the at least two perceptual dimensions, when calculation of the fidelity experience score, the enjoyment experience score, and the interaction experience score in the perceptual dimension is triggered using an event as a unit, because the event may be an event that affects the enjoyment experience score or may be an event that affects the interaction experience score, and an end time of the event may not be the sampling time of the first sensory parameter, a manner of calculating the experience score of the VR multimedia in the perceptual dimension based on the determined fidelity experience score, enjoyment experience score, and interaction experience score in the perceptual dimension may also vary.

Likewise, when calculation of the fidelity experience score, the enjoyment experience score, and the interaction experience score in the perceptual dimension is triggered using a unit time period as a unit, there are also a plurality of manners of calculating the experience score of the VR multimedia in the perceptual dimension based on the determined fidelity experience score, enjoyment experience score, and interaction experience score in the perceptual dimension.

It should also be noted that, when calculation of the enjoyment experience score and the interaction experience score is triggered at the calculation time of the fidelity experience score in the perceptual dimension, because an event that affects the interaction experience score may occur or may not occur at the calculation time, the manner of calculating the experience score of the VR multimedia in the perceptual dimension based on the determined fidelity experience score, enjoyment experience score, and interaction experience score in the perceptual dimension may also vary. Therefore, there are also a plurality of implementations of using the determined fidelity experience score, enjoyment experience score, and interaction experience score in the perceptual dimension as the input parameters to calculate the experience score of the VR multimedia in the perceptual dimension using the preset VR multimedia experience score calculation model in the perceptual dimension. In the following embodiments of this application, the implementations are discussed with reference to a plurality of implementations of the fidelity experience score, the enjoyment experience score, and the interaction experience score of the VR multimedia in the perceptual dimension.

Step 704: Use experience scores of the VR multimedia in the at least two perceptual dimensions as input parameters to calculate a MOS of the VR multimedia using a preset VR multimedia MOS calculation model.

After determining at least two experience scores corresponding to the at least two perceptual dimensions, the terminal may use the experience scores in the at least two perceptual dimensions as input parameters to calculate the MOS of the VR multimedia using a calculation model in a formula 7-1:

$$f(MOS_{visual}, MOS_{acoustic}, MOS_{optional}) = \sum_{i=visual,acoustic,optional} \varphi_i \times MOS_i, \quad (7\text{-}1)$$

$MOS_i$ may be a linear model or may be a non-linear model. A formula 7-2 is a linear model of $MOS_i$ shown in this embodiment of the present disclosure, and a formula 7-3 is a non-linear model of $MOS_i$ shown in this embodiment of the present disclosure:

$$MOS_i = sFidelity_i + g_i(sEnjoyment_i, sInteraction_i), \quad (7\text{-}2)$$

$$MOS_i = sFidelity_i \times g_i(sEnjoyment_i, sInteraction_i) \quad (7\text{-}3)$$

where i=visual,ascoutic,optional, that is, i may be the visual dimension, the acoustic dimension, or another dimension, $sFidelity_i$ is the fidelity experience score of the VR multimedia in the perceptual dimension, $sEnjoyment_i$ is the enjoyment experience score of the VR multimedia in the perceptual dimension, and $sInteraction_i$ is the interaction experience score of the VR multimedia in the perceptual dimension.

It should also be noted that, the function $g_i(sEnjoyment, sInteraction)$ may be a linear function or may be a non-linear function. When the function $g_i(sEnjoyment, sInteraction)$ is the linear function, the function may be indicated by a formula 7-4:

$$g_i(sEnjoyment, sInteraction) = \alpha_i \times sEnjoyment_i + \beta_i \times sInteraction_i, \quad (7\text{-}4)$$

When the function g(sEnjoyment,sInteraction) is the non-linear function, the function may be indicated by a formula 7-5:

$$g_i(sEnjoyment, sInteraction) = (\alpha_i \times sEnjoyment) \times (\beta_i \times sInteraction_i) \quad (7\text{-}5)$$

where $\alpha_i$ and $\beta_i$ are preset parameters, and the preset parameters also vary depending on different perceptual dimensions.

In this embodiment of the present disclosure, the terminal determines the fidelity experience score, the enjoyment experience score, and the interaction experience score of the VR multimedia in each of the at least two perceptual dimensions based on the first sensory parameter, the second sensory parameter, and the third sensory parameter obtained through sampling, and then the terminal determines the experience score of the VR multimedia in each perceptual dimension based on the determined fidelity experience score, enjoyment experience score, and interaction experience score, and further determines the MOS of the VR multimedia. Because interaction experience quality evaluation is added to a process of determining experience quality of the VR multimedia in this embodiment of the present disclosure, but interaction with the user is exactly a main feature that distinguishes the VR multimedia from conventional media, determining experience quality of the VR multimedia in this embodiment of the present disclosure better complies with an actual situation of the VR multimedia, and the determined experience quality of the VR multimedia is also more accurate.

A network media event is an event that occurs due to influence of a network condition. A normal play event that occurs when a network condition is relatively good is a network media event. A freeze event and a media quality change event that are generated due to a relatively poor network condition are also network media events. However, an interactive media event is different from this, and the interactive media event occurs only when there is interaction between the user and the terminal. In the process of playing the VR multimedia, when a network media event occurs, no interactive media event may exist because there is no interaction between the user and the terminal. Alternatively, when an interactive media event caused by interaction between the user and the terminal occurs, because no network media event caused by a change of a network condition may exist, no network media event occurs. Based on the foregoing descriptions, with reference to the descriptions in steps 701 and 702, and with reference to FIG. 8A to FIG. 8C, the following describes an implementation process of determining a fidelity experience score, an enjoyment experience score, and an interaction experience score of VR multimedia in a perceptual dimension using an event as a unit when a current time corresponds to different cases, and further determining an experience score of the VR multimedia in the perceptual dimension.

Figure 8A:
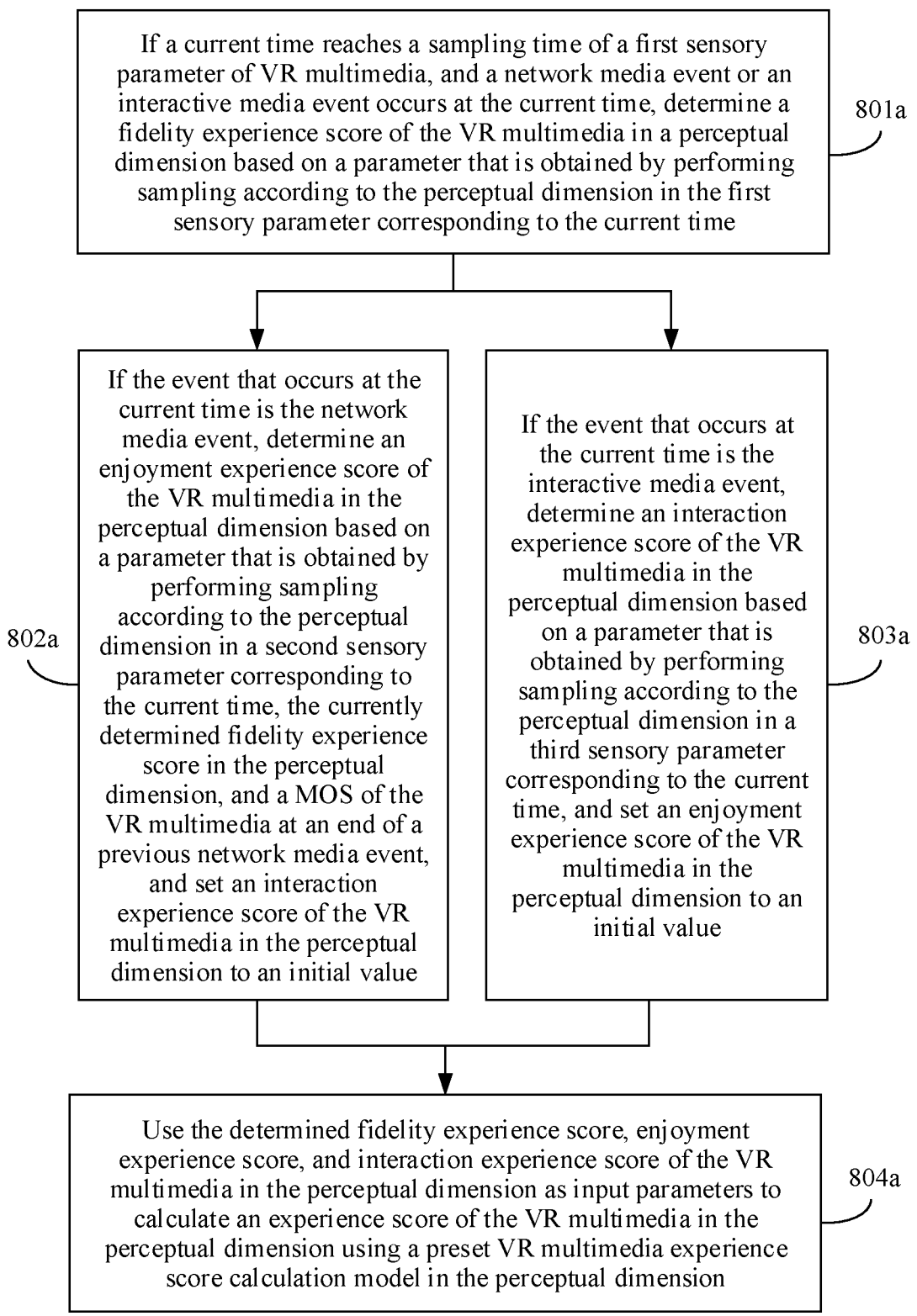
FIG. 8A is a flowchart of a method for determining an experience score of VR multimedia in a perceptual dimension using an event as a unit according to an embodiment of the present disclosure.

FIG. 8A is a flowchart of a method for determining an experience score of VR multimedia in a perceptual dimension using an event as a unit according to an embodiment of the present disclosure. As shown in FIG. 8A, the method includes the following steps.

Step 801a: If a current time reaches a sampling time of a first sensory parameter of VR multimedia, and a network media event or an interactive media event occurs at the current time, determine a fidelity experience score of the VR multimedia in a perceptual dimension based on a parameter that is obtained by performing sampling according to the perceptual dimension in the first sensory parameter corresponding to the current time.

When an experience score of the VR multimedia in the perceptual dimension is determined using an event as a unit, for each of at least two perceptual dimensions, if the current time is the sampling time of the first sensory parameter of the VR multimedia, because the first sensory parameter may have changed, a terminal may calculate the fidelity experience score in the perceptual dimension at the current time based on the first sensory parameter.

The terminal may determine the fidelity experience score in the perceptual dimension based on the parameter that is obtained by performing sampling according to the perceptual dimension in the first sensory parameter corresponding to the current time, by referring to the corresponding manner of calculating the fidelity experience score that is described in step 501*a*.

After determining the fidelity experience score in the perceptual dimension, because the network media event or the interactive media event occurs at the current time, the terminal may calculate a corresponding experience score based on the event that occurs at the current time. If the event that occurs at the current time is the network media event, step 802*a* is performed, or if the event that occurs at the current time is the interactive media event, step 803*a* is performed.

Step 802*a*: If the event that occurs at the current time is the network media event, determine an enjoyment experience score of the VR multimedia in the perceptual dimension based on a parameter that is obtained by performing sampling according to the perceptual dimension in a second sensory parameter corresponding to the current time, the currently determined fidelity experience score in the perceptual dimension, and a MOS of the VR multimedia at an end of a previous network media event, and set an interaction experience score of the VR multimedia in the perceptual dimension to an initial value.

Because the enjoyment experience score in the perceptual dimension is based on the fidelity experience score in the perceptual dimension, if the fidelity experience score in the perceptual dimension changes, the enjoyment experience score in the perceptual dimension also changes. Therefore, in this case, the terminal may calculate the enjoyment experience score in the perceptual dimension based on the currently determined fidelity experience score in the perceptual dimension, the parameter that is obtained by performing sampling according to the perceptual dimension in the second sensory parameter corresponding to the current time, and an experience score of the VR multimedia in the perceptual dimension at the end of the previous network media event. However, for the interaction experience score in the perceptual dimension, because no interactive media event occurs at the current time, the terminal may not calculate the interaction experience score in the perceptual dimension, but set the interaction experience score in the perceptual dimension to the initial value.

It should be noted that, although the network media event occurs at the current time, the current time may not be a sampling time of the second sensory parameter. Therefore, when the enjoyment experience score in the perceptual dimension is calculated based on the currently determined fidelity experience score in the perceptual dimension, the parameter that is obtained by performing according to the perceptual dimension in the second sensory parameter corresponding to the current time, and the MOS of the VR multimedia at the end of the previous network media event, a type of a network media event obtained by performing sampling according to the perceptual dimension in the second sensory parameter corresponding to the current time may be a type of a network media event obtained by performing sampling according to the perceptual dimension in a second sensory parameter recently obtained through sampling, but a duration included in the second sensory parameter may be updated correspondingly based on the current time.

In addition, for manners of calculating enjoyment experience scores corresponding to different network media events in the perceptual dimension, refer to the manner of calculating the enjoyment experience score in the foregoing step 502*a*. Details are not described again in this embodiment of the present disclosure.

Step 803*a*: If the event that occurs at the current time is the interactive media event, determine an interaction experience score of the VR multimedia in the perceptual dimension based on a parameter that is obtained by performing sampling according to the perceptual dimension in a third sensory parameter corresponding to the current time, and set an enjoyment experience score of the VR multimedia in the perceptual dimension to an initial value.

If the event that occurs at the current time is the interactive media event, because the fidelity experience score in the perceptual dimension is updated, calculation of a MOS of the VR multimedia in the perceptual dimension is triggered at the current time. Therefore, the terminal needs to determine the interaction experience score in the perceptual dimension at the current time. In addition, because no network media event occurs at the current time, the terminal may set the enjoyment experience score in the perceptual dimension to the initial value. The initial value may be 0 or may be another numeric value.

In addition, although the interactive media event occurs at the current time, the current time may not be a sampling time of the interactive media event. When the interaction experience score in the perceptual dimension is determined based on the parameter that is obtained by performing sampling according to the perceptual dimension in the third sensory parameter, a type of an interactive media event included in the parameter that is obtained by performing sampling according to the perceptual dimension in the third sensory parameter corresponding to the current time may be a type of an interactive media event included in a parameter that is obtained by performing sampling according to the perceptual dimension in a third sensory parameter recently obtained through sampling, but a duration included in the third sensory parameter may be updated correspondingly based on the current time.

In addition, for a specific manner of calculating the interaction experience score in the perceptual dimension based on the type of the interactive media event and the duration included in the parameter that is obtained by performing sampling according to the perceptual dimension in the third sensory parameter, refer to the method for calculating the interaction experience score in step 503*a*. Details are not described again in this embodiment of the present disclosure.

Step 804*a*: Use the determined fidelity experience score, enjoyment experience score, and interaction experience score of the VR multimedia in the perceptual dimension as input parameters to calculate an experience score of the VR multimedia in the perceptual dimension using a preset VR multimedia experience score calculation model in the perceptual dimension.

For each of the at least two perceptual dimensions, for a specific implementation of using the fidelity experience score, the enjoyment experience score, and the interaction experience score in the perceptual dimension that are determined at the current time, as the input parameters to calculate the experience score of the VR multimedia in the perceptual dimension using the preset VR multimedia experience score calculation model in the perceptual dimension, refer to step 703. Details are not described again in this embodiment of the present disclosure.

In this embodiment of the present disclosure, when determining the fidelity experience score in the perceptual dimension, the terminal considers influence of distinctive parameters of the VR multimedia such as a field of view, a projection format, a stereo degree, a degree of freedom, and a spatial sound on fidelity experience. Therefore, the fidelity experience score in the perceptual dimension that is determined based on this is also more accurate. In addition, determining of the enjoyment experience score in the perceptual dimension is not only related to a nature of an event in a current event period, but also related to a MOS of the VR multimedia corresponding to a previous event. This is equivalent to considering influence of the previous event that occurs in a process of playing the VR multimedia. Therefore, the determined enjoyment experience score in the perceptual dimension is more comprehensive and more accurate.

A method for determining an experience score of VR multimedia in a perceptual dimension using an event as a unit when a current time is a sampling time of a first sensory parameter of the VR multimedia and a network media event or an interactive media event occurs at the current time is described in FIG. 8A. With reference to FIG. 8B, the following describes a method for determining an experience score of VR multimedia in a perceptual dimension using an event as a unit when a current time is a sampling time of a first sensory parameter of the VR multimedia and a network media event and an interactive media event occur simultaneously at the current time.

FIG. 8B is a flowchart of another method for determining an experience score of VR multimedia in a perceptual dimension using an event as a unit according to an embodiment of the present disclosure. As shown in FIG. 8B, the method includes the following steps.

Step 801b: If a current time reaches a sampling time of a first sensory parameter of VR multimedia, and a network media event and an interactive media event occur at the current time, determine a fidelity experience score of the VR multimedia in a perceptual dimension based on a parameter that is obtained by performing sampling according to the perceptual dimension in the first sensory parameter corresponding to the current time, determine an enjoyment experience score of the VR multimedia in the perceptual dimension based on a parameter that is obtained by performing sampling according to the perceptual dimension in a second sensory parameter corresponding to the current time, the currently determined fidelity experience score in the perceptual dimension, and a MOS of the VR multimedia at an end of a previous network media event, and determine an interaction experience score of the VR multimedia based on a parameter that is obtained by performing sampling according to the perceptual dimension in a third sensory parameter corresponding to the current time.

If the current time reaches the sampling time of the first sensory parameter of the VR multimedia, and the network media event and the interactive media event occur simultaneously at the current time, for each of at least two perceptual dimensions, a terminal further needs to calculate the interaction experience score in the perceptual dimension in addition to the fidelity experience score and the enjoyment experience score in the perceptual dimension.

For selection of the second sensory parameter required for calculating the enjoyment experience score in the perceptual dimension by the terminal, refer to the descriptions in step 801a. For a specific calculation manner, refer to the corresponding method for calculating the enjoyment experience score in step 502a.

In addition, although the interactive media event occurs at the current time, the current time may not be a sampling time of the interactive media event. When the interaction experience score is determined based on the parameter that is obtained by performing sampling according to the perceptual dimension in the third sensory parameter, a type of an interactive media event in the third sensory parameter corresponding to the current time may be a type of an interactive media event in a third sensory parameter recently obtained through sampling, but a duration included in the third sensory parameter may be updated correspondingly based on the current time. For specific manners of calculating interaction experience scores corresponding to different interactive media events in the perceptual dimension, refer to the specific manner of calculating the interaction experience score in the foregoing step 503a.

Step 802b: Use the fidelity experience score, the enjoyment experience score, and the interaction experience score in the perceptual dimension that are determined at the current time, as input parameters to calculate an experience score of the VR multimedia in the perceptual dimension using a preset VR multimedia experience score calculation model in the perceptual dimension.

For each of the at least two perceptual dimensions, for a specific implementation of using the fidelity experience score, the enjoyment experience score, and the interaction experience score in the perceptual dimension that are determined at the current time, as the input parameters to calculate the experience score of the VR multimedia in the perceptual dimension using the preset VR multimedia experience score calculation model in the perceptual dimension, refer to step 703. Details are not described again in this embodiment of the present disclosure.

In this embodiment of the present disclosure, when the fidelity experience score in the perceptual dimension is determined, influence of distinctive parameters of the VR multimedia such as a field of view, a projection format, a stereo degree, a degree of freedom, and a spatial sound on fidelity experience is considered. Therefore, the fidelity experience score in the perceptual dimension that is determined based on this is also more accurate. In addition, determining of the enjoyment experience score in the perceptual dimension is not only related to a nature of an event in a current event period, but also related to a MOS of the VR multimedia corresponding to a previous event. This is equivalent to considering influence of the previous event that occurs in a process of playing the VR multimedia. Therefore, the determined enjoyment experience score in the perceptual dimension is more comprehensive and more accurate. In addition, because the interactive media event occurs at the current time, the terminal may calculate the interaction experience score in the perceptual dimension, to determine the experience score of the VR multimedia in the perceptual dimension corresponding to the current time, that is, the terminal also updates the interaction experience score in the perceptual dimension correspondingly. Therefore, accuracy of the experience score of the VR multimedia in the perceptual dimension is improved.

For each of at least two perceptual dimensions, implementation processes of determining an experience score of VR multimedia in the perceptual dimension when a current time is a sampling time of a first sensory parameter and a network media event and/or an interactive media event occur/occurs at the current time are separately described above with reference to FIG. 8A and FIG. 8B. In addition to the foregoing two cases, the terminal may further trigger calculation and output a fidelity experience score, an enjoyment experience score, and an interaction score in the perceptual dimension at an end of an event that occurs, and further obtain an experience score of the VR multimedia corresponding to the event in the perceptual dimension through joint calculation based on the fidelity experience score, the enjoyment experience score, and the interaction experience score in the perceptual dimension. Details are shown in FIG. 8C.

Step 801c: Determine an enjoyment experience score and an interaction experience score in a perceptual dimension using an event as a unit.

If a current time does not reach a sampling time of a first sensory parameter of VR multimedia, a terminal may determine the enjoyment experience score and the interaction experience score of the VR multimedia in the perceptual dimension in three cases depending on whether a network media event and an interactive media event occur at the current time and whether an event that occurs is ended.

First case: If a network media event occurs at the current time but no interactive media event occurs at the same time, and it is detected at the current time that the network media event is ended, determine the enjoyment experience score of the VR multimedia in the perceptual dimension based on a parameter that is obtained by performing sampling according to the perceptual dimension in a second sensory parameter corresponding to the current time, a fidelity experience score in the perceptual dimension that is recently determined before the current time, and a MOS of the VR multimedia at an end of a previous network media event, and set the interaction experience score of the VR multimedia in the perceptual dimension to an initial value.

Because calculation of the enjoyment experience score of the VR multimedia in the perceptual dimension further needs to depend on a fidelity experience score in the perceptual dimension at the current time, but the current time is not a calculation time of the fidelity experience score, that is, no fidelity experience score in the perceptual dimension is obtained through calculation at the current time, in this case, the terminal may obtain and use the fidelity experience score in the perceptual dimension that is recently determined before the current time, as an input parameter for calculating the enjoyment experience score in the perceptual dimension. In addition, the terminal may further obtain the MOS of the VR multimedia at the end of the previous network media event, and obtain the enjoyment experience score of the VR multimedia through calculation with reference to the obtained fidelity experience score in the perceptual dimension and the second sensory parameter obtained through sampling.

Because no interactive media event occurs at the current time, the terminal may set the interactive experience score in the perceptual dimension to the initial value.

Second case: If an interactive media event occurs at the current time but no network media event occurs at the same time, and it is detected at the current time that the interactive media event is ended, determine the interaction experience score of the VR multimedia in the perceptual dimension based on a parameter that is obtained by performing sampling according to the perceptual dimension in a third sensory parameter corresponding to the current time, and set the enjoyment experience score of the VR multimedia in the perceptual dimension to an initial value.

If the current time is an end time of the interactive media event, calculation of the interaction experience score of the VR multimedia in the perceptual dimension is triggered, and further, calculation of an experience score of the VR multimedia in the perceptual dimension is triggered.

For calculation of the interaction experience score of the VR multimedia in the perceptual dimension, refer to the manner of calculating the interaction experience score in step 503a. Because no network media event occurs, the enjoyment experience score of the VR multimedia in the perceptual dimension may be set to the initial value. The initial value may be 0 or may be another value.

Third case: If a network media event and an interactive media event occur at the current time, and it is detected at the current time that the network media event and/or the interactive media event are/is ended, determine the enjoyment experience score of the VR multimedia in the perceptual dimension based on a parameter that is obtained by performing sampling according to the perceptual dimension in a second sensory parameter corresponding to the current time, a fidelity experience score in the perceptual dimension that is recently determined before the current time, and a MOS of the VR multimedia at an end of a previous network media event, and determine the interaction experience score of the VR multimedia in the perceptual dimension based on a parameter that is obtained by performing sampling according to the perceptual dimension in a third sensory parameter corresponding to the current time.

If the network media event and the interactive media event occur simultaneously at the current time, as long as one of the events that occur is ended, calculation of the enjoyment experience score and the interaction experience score of the VR multimedia in the perceptual dimension is triggered, and further, calculation of an experience score of the VR multimedia in the perceptual dimension is triggered.

For a specific method for calculating the enjoyment experience score of the VR multimedia in the perceptual dimension, refer to calculation of the enjoyment experience score in step 502a. For determining the interaction experience score of the VR multimedia in the perceptual dimension, refer to the method for determining the interaction experience score in the perceptual dimension in step 801b.

Step 802c: Use a fidelity experience score in the perceptual dimension that is recently determined before a current time, and the enjoyment experience score and the interaction experience score in the perceptual dimension that are determined at the current time, as input parameters to calculate an experience score of VR multimedia in the perceptual dimension using a preset VR multimedia experience score calculation model in the perceptual dimension.

Because no fidelity experience score is calculated at the current time, the terminal may use the fidelity experience score in the perceptual dimension that is recently determined before the current time, and the enjoyment experience score in the perceptual dimension and the interaction experience score in the perceptual dimension that are determined at the current time, as the input parameters for calculating the experience score of the VR multimedia in the perceptual dimension. For a method for calculating the experience score of the VR multimedia in the perceptual dimension using the preset VR multimedia experience score calculation model in the perceptual dimension based on the input parameters, refer to the corresponding method in step 703.

In this embodiment of the present disclosure, because the current time does not reach the sampling time of the first sensory parameter, the fidelity experience score in the perceptual dimension does not change. Therefore, the terminal can directly obtain the fidelity experience score in the perceptual dimension that is recently determined before the current time, and a quantity of operations is reduced. In addition, determining of the enjoyment experience score in the perceptual dimension is not only related to a nature of an event in a current event period, but also related to a MOS of the VR multimedia corresponding to a previous event. This is equivalent to considering influence of the previous event that occurs in a process of playing the VR multimedia. Therefore, the determined enjoyment experience score in the perceptual dimension is more comprehensive and more accurate. In addition, because the interactive media event occurs at the current time, the terminal may calculate the interaction experience score in the perceptual dimension, to determine the experience score of the VR multimedia in the perceptual dimension corresponding to the current time, that is, the terminal also updates the interaction experience score in the perceptual dimension correspondingly. Therefore, accuracy of the experience score of the VR multimedia in the perceptual dimension is improved.

Figure 9A:
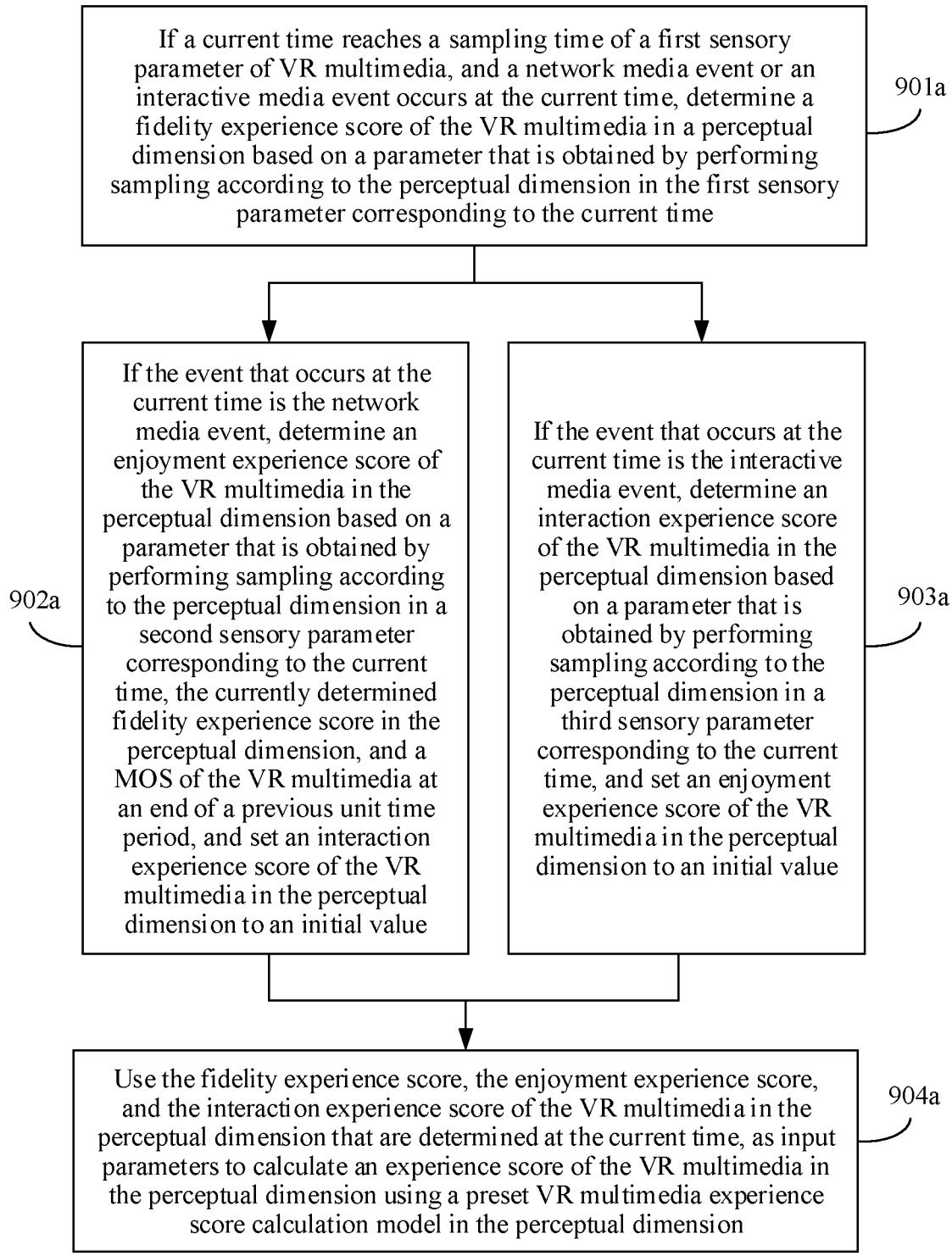
FIG. 9A is a flowchart of a method for determining an experience score of VR multimedia in a perceptual dimension using a unit time period as a unit according to an embodiment of the present disclosure.

Three methods for determining an experience score of VR multimedia in a perceptual dimension using an event as a unit, and further determining a MOS of the VR multimedia are described above with reference to FIG. 8A to FIG. 8C. Likewise, three manners of determining an experience score of VR multimedia in a perceptual dimension using a unit time period as a unit also exist when a current time corresponds to different cases. With reference to FIG. 9A to FIG. 9C, the following describes the three methods for determining the experience score of the VR multimedia in the perceptual dimension using a unit time period as a unit.

FIG. 9A is a method for determining an experience score of VR multimedia in a perceptual dimension using a unit time period as a unit according to an embodiment of the present disclosure. As shown in FIG. 9A, the method includes the following steps.

Step 901a: If a current time reaches a sampling time of a first sensory parameter of VR multimedia, and a network media event or an interactive media event occurs at the current time, determine a fidelity experience score of the VR multimedia in a perceptual dimension based on a parameter that is obtained by performing sampling according to the perceptual dimension in the first sensory parameter corresponding to the current time.

For each of at least two perceptual dimensions, when an experience score of the VR multimedia in the perceptual dimension is determined using a unit time period as a unit, if the current time reaches the sampling time of the first sensory parameter of the VR multimedia, a terminal may calculate the corresponding fidelity experience score in the perceptual dimension based on the parameter that is obtained by performing sampling according to the perceptual dimension in the first sensory parameter obtained through sampling. For a manner of calculating the fidelity experience score based on the parameter that is obtained by performing sampling according to the perceptual dimension in the first sensory parameter, refer to the manner of calculating the fidelity experience score in the corresponding perceptual dimension in step 501a.

After the terminal obtains the fidelity experience score in the perceptual dimension through calculation, because the network media event or the interactive media event occurs at the current time, the terminal may calculate a corresponding experience score based on the event that occurs at the current time. If the event that occurs at the current time is the network media event, step 902a is performed, or if the event that occurs at the current time is the interactive media event, step 903a is performed.

Step 902a: If the event that occurs at the current time is the network media event, determine an enjoyment experience score of the VR multimedia in the perceptual dimension based on a parameter that is obtained by performing sampling according to the perceptual dimension in a second sensory parameter corresponding to the current time, the currently determined fidelity experience score in the perceptual dimension, and a MOS of the VR multimedia at an end of a previous unit time period, and set an interaction experience score of the VR multimedia in the perceptual dimension to an initial value.

Because an experience score of the VR multimedia in the perceptual dimension is determined using a unit time period as a unit in this embodiment, the terminal may obtain and use the MOS of the VR multimedia at the end of the previous unit time period as an input parameter for calculating the enjoyment experience score in the perceptual dimension at the current time. In addition, the terminal further needs to calculate the enjoyment experience score of the VR multimedia in the perceptual dimension with reference to the parameter that is obtained by performing sampling according to the perceptual dimension in the second sensory parameter corresponding to the current time and the currently determined fidelity experience score in the perceptual dimension. For selection of the second sensory parameter required for calculating the enjoyment experience score in the perceptual dimension by the terminal, refer to the descriptions in step 802a.

Step 903a: If the event that occurs at the current time is the interactive media event, determine an interaction experience score of the VR multimedia in the perceptual dimension based on a parameter that is obtained by performing sampling according to the perceptual dimension in a third sensory parameter corresponding to the current time, and set an enjoyment experience score of the VR multimedia in the perceptual dimension to an initial value.

For a manner of determining the interaction experience score of the VR multimedia in the perceptual dimension based on the parameter that is obtained by performing sampling according to the perceptual dimension in the third sensory parameter corresponding to the current time, refer to the manner of calculating the interaction experience score in step 503a. In addition, because no network media event occurs at the current time, the enjoyment experience score in the perceptual dimension may be set to the initial value. The initial value may be 0 or may be another value.

Step 904a: Use the fidelity experience score, the enjoyment experience score, and the interaction experience score of the VR multimedia in the perceptual dimension that are determined at the current time, as input parameters to calculate an experience score of the VR multimedia in the perceptual dimension using a preset VR multimedia experience score calculation model in the perceptual dimension.

For a method for using the fidelity experience score, the enjoyment experience score, and the interaction experience score of the VR multimedia in the perceptual dimension that are determined at the current time, as the input parameters to calculate the experience score of the VR multimedia in the perceptual dimension by the terminal using the preset VR multimedia experience score calculation model in the perceptual dimension, refer to step 703.

In this embodiment of the present disclosure, when the fidelity experience score in the perceptual dimension is determined, influence of distinctive parameters of the VR multimedia such as a field of view, a projection format, a stereo degree, a degree of freedom, and a spatial sound on fidelity experience is considered. Therefore, the fidelity experience score in the perceptual dimension that is determined based on this is also more accurate. In addition, determining of the enjoyment experience score in the perceptual dimension is not only related to whether an event occurs in the current unit time period, but also related to the MOS of the VR multimedia corresponding to the previous unit time period. This is equivalent to considering influence of a previous event that occurs in a process of playing the VR multimedia. Therefore, the determined enjoyment experience score in the perceptual dimension is more comprehensive and more accurate.

For each of at least two perceptual dimensions, a method for determining an experience score of VR multimedia in the perceptual dimension using a unit time period as a unit when a current time is a sampling time of a first sensory parameter of the VR multimedia and a network media event or an interactive media event occurs at the current time is described in FIG. 9A. With reference to FIG. 9B, the following describes a method for determining an experience score of VR multimedia in the perceptual dimension using a unit time period as a unit when a current time is a sampling time of a first sensory parameter of the VR multimedia and a network media event and an interactive media event occur simultaneously at the current time.

Step 901*b*: If a current time reaches a sampling time of a first sensory parameter of VR multimedia, and a network media event and an interactive media event occur at the current time, determine a fidelity experience score of the VR multimedia in a perceptual dimension based on a parameter that is obtained by performing sampling according to the perceptual dimension in the first sensory parameter corresponding to the current time, determine an enjoyment experience score of the VR multimedia in the perceptual dimension based on a parameter that is obtained by performing sampling according to the perceptual dimension in a second sensory parameter corresponding to the current time, the currently determined fidelity experience score in the perceptual dimension, and a MOS of the VR multimedia at an end of a previous unit time period, and determine an interaction experience score of the VR multimedia based on a parameter that is obtained by performing sampling according to the perceptual dimension in a third sensory parameter corresponding to the current time.

If the current time reaches the sampling time of the first sensory parameter of the VR multimedia, and the network media event and the interactive media event occur simultaneously at the current time, the terminal further needs to calculate the interaction experience score in the perceptual dimension in addition to the fidelity experience score and the enjoyment experience score in the perceptual dimension.

For a method for calculating the enjoyment experience score in the perceptual dimension by the terminal, refer to the descriptions in step 902*a*. In addition, although the interactive media event occurs at the current time, the current time may not be a sampling time of the interactive media event. When the interaction experience score in the perceptual dimension is determined based on the third sensory parameter, a type of an interactive media event obtained by performing sampling according to the perceptual dimension in the third sensory parameter corresponding to the current time may be a type of an interactive media event obtained by performing sampling according to the perceptual dimension in a third sensory parameter recently obtained through sampling, but a duration included in the third sensory parameter may be updated correspondingly based on the current time.

For specific manners of calculating the fidelity experience score and the interaction experience score by the terminal, respectively refer to the manner of calculating the fidelity experience score that is described in step 501*a* and the manner of calculating the interaction experience score in step 503*a*. Details are not described again in this embodiment of the present disclosure.

In addition, in the specific manner of calculating the enjoyment experience score by the terminal, only the MOS of the VR multimedia at the end of the previous network media event that is input for calculating the enjoyment experience score as described in the foregoing step 502*a* needs to be changed to the MOS of the VR multimedia at the end of the previous unit time period, only the fidelity experience score in the foregoing step 502*a* needs to be changed to the fidelity experience score in the perceptual dimension, and reference may be made for corresponding remaining parts. Details are not described again in this embodiment of the present disclosure.

Step 902*b*: Use the fidelity experience score, the enjoyment experience score, and the interaction experience score in the perceptual dimension that are determined at the current time, as input parameters to calculate an experience score of the VR multimedia in the perceptual dimension using a preset VR multimedia experience score calculation model in the perceptual dimension.

For a specific implementation of using the fidelity experience score, the enjoyment experience score, and the interaction experience score in the perceptual dimension that are determined at the current time, as the input parameters to calculate the experience score of the VR multimedia in the perceptual dimension using the preset VR multimedia experience score calculation model in the perceptual dimension, refer to step 703. Details are not described again in this embodiment of the present disclosure.

In this embodiment of the present disclosure, when the fidelity experience score in the perceptual dimension is determined, influence of distinctive parameters of the VR multimedia such as a field of view, a projection format, a stereo degree, a degree of freedom, and a spatial sound on fidelity experience is considered. Therefore, the fidelity experience score in the perceptual dimension that is determined based on this is also more accurate. In addition, determining of the enjoyment experience score in the perceptual dimension is not only related to whether an event occurs in the current unit time period, but also related to the MOS of the VR multimedia corresponding to the previous unit time period. This is equivalent to considering influence of a previous event that occurs in a process of playing the VR multimedia. Therefore, the determined enjoyment experience score in the perceptual dimension is more comprehensive and more accurate. In addition, because the interactive media event occurs at the current time, the terminal may calculate the interaction experience score in the perceptual dimension, to determine the experience score of the VR multimedia in the perceptual dimension corresponding to the current time, that is, the terminal also updates the interaction experience score in the perceptual dimension correspondingly. Therefore, accuracy of the experience score of the VR multimedia in the perceptual dimension is improved.

For each of at least two perceptual dimensions, implementation processes of determining an experience score of VR multimedia in the perceptual dimension when a current time is a sampling time of a first sensory parameter and a network media event and/or an interactive media event occur/occurs at the current time are separately described above with reference to FIG. 9A and FIG. 9B. In addition to the foregoing two cases, the terminal may further trigger calculation and output a fidelity experience score, an enjoyment experience score, and an interaction score in the perceptual dimension at an end of a unit time period or at an end of an event that occurs, and further obtain an experience score of the VR multimedia corresponding to the event in the perceptual dimension through joint calculation based on the fidelity experience score, the enjoyment experience score, and the interaction experience score in the perceptual dimension. Details are shown in FIG. 9C.

Step 901c: Determine an enjoyment experience score and an interaction experience score of VR multimedia in a perceptual dimension using a unit time period as a unit.

If a current time does not reach a sampling time of a first sensory parameter of the VR multimedia, a terminal may determine the enjoyment experience score and the interaction experience score of the VR multimedia in the perceptual dimension in the following several cases depending on whether a network media event and an interactive media event occur at the current time, whether an event that occurs at the current time is ended, and whether the current time is an end time of a unit time period.

First case: If a network media event occurs at the current time but no interactive media event occurs at the same time, and it is detected at the current time that the network media event is ended or that a unit time period is ended, determine the enjoyment experience score of the VR multimedia in the perceptual dimension based on a parameter that is obtained by performing sampling according to the perceptual dimension in a second sensory parameter corresponding to the current time, a fidelity experience score in the perceptual dimension that is recently determined before the current time in the current unit time period, and a MOS of the VR multimedia at an end of a previous unit time period, and set the interaction experience score of the VR multimedia in the perceptual dimension to an initial value.

(1) If only the network media event occurs at the current time, and the network media event is not ended, but the current time is an end time of the unit time period, the terminal may calculate the enjoyment experience score of the VR multimedia in the perceptual dimension based on the parameter that is obtained by performing sampling according to the perceptual dimension in the second sensory parameter of the current time. Because calculation of the enjoyment experience score of the VR multimedia in the perceptual dimension further needs to depend on a fidelity experience score in the perceptual dimension at the current time, but the current time is not a calculation time of the fidelity experience score, that is, no fidelity experience score in the perceptual dimension is obtained through calculation at the current time, in this case, the terminal may obtain and use the fidelity experience score in the perceptual dimension that is recently determined before the current time in the current unit time period, as an input parameter for calculating the enjoyment experience score in the perceptual dimension. In addition, the terminal may further obtain the MOS of the VR multimedia at the end of the previous unit time period, and obtain the enjoyment experience score of the VR multimedia in the perceptual dimension through calculation with reference to the obtained fidelity experience score in the perceptual dimension and the parameter that is obtained by performing sampling according to the perceptual dimension in the second sensory parameter obtained through sampling.

Because no interactive media event occurs at the current time, the terminal may set the interactive experience score in the perceptual dimension to the initial value.

(2) If only the network media event occurs at the current time, and the current time is an end time of the network media event, but the current time is not an end time of the unit time period, the terminal may also determine the enjoyment experience score and the interaction experience score according to the manner of determining the enjoyment experience score and the interaction experience score in (1).

Second case: If an interactive media event occurs at the current time but no network media event occurs at the same time, and it is detected at the current time that the interactive media event is ended or that a unit time period is ended, determine the interaction experience score of the VR multimedia in the perceptual dimension based on a parameter that is obtained by performing sampling according to the perceptual dimension in a third sensory parameter corresponding to the current time, and set the enjoyment experience score of the VR multimedia in the perceptual dimension to an initial value.

Third case: If an interactive media event and a network media event occur at the current time, and it is detected at the current time that a unit time period is ended, or if a network media event and an interactive media event occur at the current time, and it is detected at the current time that the network media event and/or the interactive media event are/is ended and it is not detected that a unit time period is ended, determine the enjoyment experience score of the VR multimedia in the perceptual dimension based on a parameter that is obtained by performing sampling according to the perceptual dimension in a second sensory parameter corresponding to the current time, a fidelity experience score in the perceptual dimension that is recently determined before the current time in the current unit time period, and a MOS of the VR multimedia at an end of a previous unit time period, and determine the interaction experience score of the VR multimedia in the perceptual dimension based on a parameter that is obtained by performing sampling according to the perceptual dimension in a third sensory parameter corresponding to the current time.

If the interactive media event and the network media event occur simultaneously at the current time, and the current time is an end time of the unit time period, but it is not detected that the network media event and/or the interactive media event are/is ended, calculation of the enjoyment experience score and the interaction experience score of the VR multimedia in the perceptual dimension is triggered, and further, calculation of an experience score of the VR multimedia in the perceptual dimension is triggered.

If the network media event and the interactive media event occur simultaneously at the current time, and it is detected at the current time that at least one of the network media event and the interactive media event is ended, but it is not detected that the unit time period is ended, calculation of the enjoyment experience score and the interaction experience score of the VR multimedia in the perceptual dimension is also triggered, and further, calculation of an experience score of the VR multimedia in the perceptual dimension is triggered.

For determining the enjoyment experience score of the VR multimedia in the perceptual dimension, refer to determining the enjoyment experience score in the perceptual dimension in the first case. For determining the interaction experience score of the VR multimedia in the perceptual dimension, refer to the method for determining the interaction experience score in the perceptual dimension in step 901*b*.

Step 902*c*: Use a fidelity experience score in the perceptual dimension that is recently determined before a current time in the current unit time period, and the enjoyment experience score and the interaction experience score in the perceptual dimension that are determined at the current time, as input parameters to calculate an experience score of the VR multimedia in the perceptual dimension using a preset VR multimedia experience score calculation model in the perceptual dimension.

Because no fidelity experience score is calculated at the current time, the terminal may use the fidelity experience score in the perceptual dimension that is recently determined before the current time in the current unit time period, and the enjoyment experience score and the interaction experience score that are determined at the current time, as the input parameters for calculating the experience score of the VR multimedia in the perceptual dimension. For a method for calculating the experience score of the VR multimedia in the perceptual dimension using the preset VR multimedia experience score calculation model in the perceptual dimension based on the input parameters, refer to the corresponding method in step 703.

In this embodiment of the present disclosure, because the current time does not reach the sampling time of the first sensory parameter, the fidelity experience score in the perceptual dimension does not change. Therefore, the terminal can directly obtain the fidelity experience score in the perceptual dimension that is recently determined before the current time, and a quantity of operations is reduced. In addition, determining of the enjoyment experience score in the perceptual dimension is not only related to whether an event occurs in the current unit time period, but also related to the MOS of the VR multimedia corresponding to the previous unit time period. This is equivalent to considering influence of a previous event that occurs in a process of playing the VR multimedia. Therefore, the determined enjoyment experience score in the perceptual dimension is more comprehensive and more accurate. In addition, because the interactive media event occurs at the current time, the terminal may calculate the interaction experience score in the perceptual dimension, to determine the experience score of the VR multimedia in the perceptual dimension corresponding to the current time, that is, the terminal also updates the interaction experience score in the perceptual dimension correspondingly. Therefore, accuracy of the experience score of the VR multimedia in the perceptual dimension is improved.

The terminal determines a MOS of the VR multimedia using the method in the foregoing embodiment. To determine experience quality of the VR multimedia, the terminal usually needs to test experience quality of the VR multimedia within a play duration. To be specific, in an entire VR multimedia test process, the VR multimedia may include a plurality of events or a plurality of unit time periods, and in a process of determining the experience quality of the VR multimedia, the terminal may determine a plurality of MOSs of the VR multimedia according to the method in the foregoing embodiment. After the terminal determines and the plurality of MOSs of the VR multimedia according to the method in the foregoing embodiment, the terminal may further determine a MOS statistical value of the VR multimedia within the preset test duration using a method in the following step.

Further, the terminal may determine a mean value of all the MOSs of the VR multimedia that are obtained through calculation within the preset test duration, where the preset test duration is a duration of determining the experience quality of the VR multimedia. Then the terminal may determine the mean value obtained through calculation as the MOS statistical value of the VR multimedia within the preset test duration. Further, to evaluate stability of the experience quality of the VR multimedia within the preset test duration, the terminal may further determine a mean square error of the MOSs of the VR multimedia based on the plurality of MOSs of the VR multimedia and the MOS statistical value of the VR multimedia within the preset test duration. If the mean square error is smaller, it indicates that the experience quality of the VR multimedia within the preset test duration is more stable. Otherwise, it indicates that the experience quality of the VR multimedia within the preset test duration is more instable.

In conclusion, interaction experience quality evaluation is added to the process of determining the experience quality of the VR multimedia by the terminal in this embodiment of the present disclosure, but interaction with a user is exactly a main feature that distinguishes the VR multimedia from conventional media. Therefore, determining the experience quality of the VR multimedia in this embodiment of the present disclosure better complies with an actual situation of the VR multimedia, and the determined experience quality of the VR multimedia is also more accurate. In addition, in this embodiment of the present disclosure, when the fidelity experience score is determined, influence of distinctive parameters of the VR multimedia such as a field of view, a projection format, a stereo degree, a degree of freedom, and a spatial sound on fidelity experience is considered. Therefore, the fidelity experience score determined based on this is also more accurate. It should also be noted that, in this embodiment of the present disclosure, determining of the enjoyment experience score is not only related to a current event or a parameter in a unit event period, but also related to a previous MOS of the VR multimedia. This is equivalent to considering influence of previous play of the VR multimedia. Therefore, the determined enjoyment experience score is more comprehensive and more accurate.

Figure 10A:
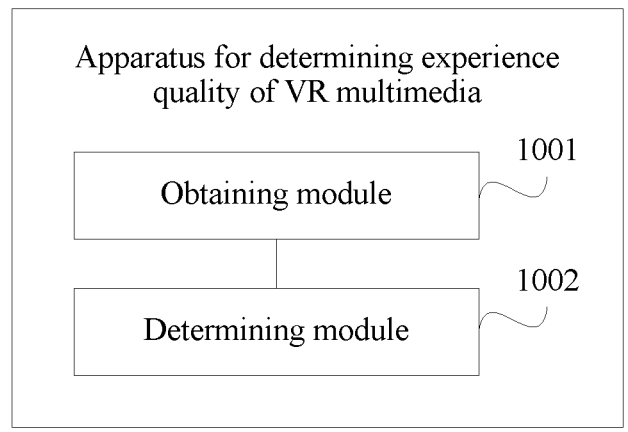
FIG. 10A is a schematic structural diagram of an apparatus for determining experience quality of VR multimedia according to an embodiment of the present disclosure.

Referring to FIG. 10A, an embodiment of the present disclosure provides an apparatus for determining experience quality of VR multimedia. The apparatus for determining experience quality of VR multimedia is configured to perform the foregoing method in any one of FIG. 4 to FIG. 9C. The apparatus for determining experience quality of VR multimedia includes an obtaining module 1001 and a determining module 1002.

The obtaining module 1001 is configured to perform step 401 or step 701 in the foregoing embodiment.

The determining module 1002 is configured to perform step 402 and step 403 in the foregoing embodiment, or configured to perform step 702, step 703, and step 704 in the foregoing embodiment.

Figure 10B:
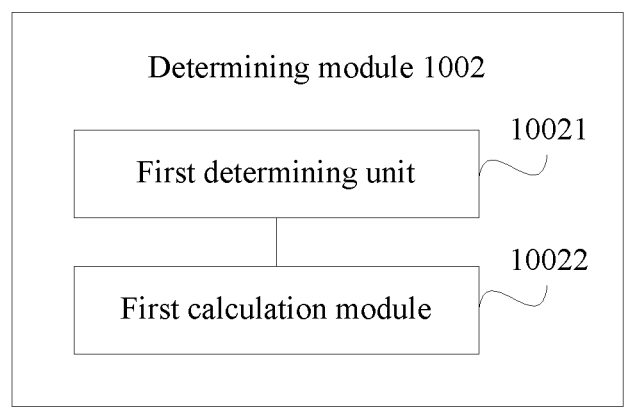
FIG. 10B is a schematic structural diagram of a determining module according to an embodiment of the present disclosure.

Optionally, referring to FIG. 10B, the determining module 1002 includes a first determining unit 10021 configured to determine a fidelity experience score, an enjoyment experience score, and an interaction experience score of the VR multimedia based on the first sensory parameter, the second sensory parameter, and the third sensory parameter of the VR multimedia, and a first calculation unit 10022 configured to use the determined fidelity experience score, enjoyment experience score, and interaction experience score as input parameters to calculate the MOS of the VR multimedia using a preset VR multimedia MOS calculation model.

Optionally, the first determining unit 10021 includes a determining subunit configured to, if a current time reaches a sampling time of the first sensory parameter of the VR multimedia, and a network media event or an interactive media event occurs at the current time, determine the fidelity experience score of the VR multimedia based on the first sensory parameter corresponding to the current time, where the network media event is an event that occurs due to a change of a network condition, and the interactive media event is an event that occurs due to interaction with a user, where the determining subunit is further configured to, if the event that occurs at the current time is the network media event, determine the enjoyment experience score of the VR multimedia based on the second sensory parameter corresponding to the current time, the currently determined fidelity experience score, and a MOS of the VR multimedia at an end of a previous network media event, and set the interaction experience score of the VR multimedia to an initial value, or the determining subunit is further configured to if the event that occurs at the current time is the interactive media event, determine the interaction experience score of the VR multimedia based on the third sensory parameter corresponding to the current time, and set the enjoyment experience score of the VR multimedia to an initial value.

Optionally, the first determining unit 10021 includes a determining subunit configured to, if a current time reaches a sampling time of the first sensory parameter of the VR multimedia, and a network media event and an interactive media event occur at the current time, determine the fidelity experience score of the VR multimedia based on the first sensory parameter corresponding to the current time, determine the enjoyment experience score of the VR multimedia based on the second sensory parameter corresponding to the current time, the currently determined fidelity experience score, and a MOS of the VR multimedia at an end of a previous network media event, and determine the interaction experience score of the VR multimedia based on the third sensory parameter corresponding to the current time.

Optionally, the first determining unit 10021 includes a determining subunit configured to if a current time does not reach a sampling time of the first sensory parameter of the VR multimedia, and a network media event occurs at the current time but no interactive media event occurs at the same time, and it is detected at the current time that the network media event is ended, determine the enjoyment experience score of the VR multimedia based on the second sensory parameter corresponding to the current time, a fidelity experience score recently determined before the current time, and a MOS of the VR multimedia at an end of a previous network media event, and set the interaction experience score of the VR multimedia to an initial value, where the determining subunit is further configured to, if the current time does not reach a sampling time of the first sensory parameter of the VR multimedia, and an interactive media event occurs at the current time but no network media event occurs at the same time, and it is detected at the current time that the interactive media event is ended, determine the interaction experience score of the VR multimedia based on the third sensory parameter corresponding to the current time, and set the enjoyment experience score of the VR multimedia to an initial value, or the determining subunit is further configured to, if the current time does not reach a sampling time of the first sensory parameter of the VR multimedia, and a network media event and an interactive media event occur at the current time, and it is detected at the current time that the network media event and/or the interactive media event are/is ended, determine the enjoyment experience score of the VR multimedia based on the second sensory parameter corresponding to the current time, a fidelity experience score recently determined before the current time, and a MOS of the VR multimedia at an end of a previous network media event, and determine the interaction experience score of the VR multimedia based on the third sensory parameter corresponding to the current time, and correspondingly, the first calculation unit 10022 is further configured to use the fidelity experience score recently determined before the current time, and the enjoyment experience score and the interaction experience score that are determined at the current time, as the input parameters to calculate the MOS of the VR multimedia using the preset VR multimedia MOS calculation model.

Optionally, the second sensory parameter includes a type of a network media event and a first duration, and the first duration is a duration of the network media event, and the determining subunit is further configured to, when the type of the network media event included in the second sensory parameter corresponding to the current time is a play event, use the first duration included in the second sensory parameter corresponding to the current time, the currently determined fidelity experience score, and the MOS of the VR multimedia at the end of the previous network media event as input parameters to calculate the enjoyment experience score of the VR multimedia using an enjoyment experience score calculation model corresponding to the play event, when the type of the network media event included in the second sensory parameter corresponding to the current time is a freeze event, use the first duration included in the second sensory parameter corresponding to the current time, the currently determined fidelity experience score, and the MOS of the VR multimedia at the end of the previous network media event as input parameters to calculate the enjoyment experience score of the VR multimedia using an enjoyment experience score calculation model corresponding to the freeze event, or when the type of the network media event included in the second sensory parameter corresponding to the current time is a media quality change event, determine a difference between the currently determined fidelity experience score and a fidelity experience score recently determined before the current time, as the enjoyment experience score of the VR multimedia.

Optionally, the third sensory parameter includes a type of an interactive media event and a second duration, and the second duration is a duration of the interactive media event, and the determining subunit is further configured to select, from a plurality of stored interaction experience score calculation models, an interaction experience score calculation model corresponding to the type of the interactive media event included in the third sensory parameter corresponding to the current time, and use the type of the interactive media event and the second duration included in the third sensory parameter corresponding to the current time, as input parameters to calculate the interaction experience score of the VR multimedia using the selected interaction experience score calculation model.

Optionally, the first determining unit 10021 includes a determining subunit configured to, if a current time reaches a sampling time of the first sensory parameter of the VR multimedia, and a network media event or an interactive media event occurs at the current time, determine the fidelity experience score of the VR multimedia based on the first sensory parameter corresponding to the current time, where the determining subunit is further configured to if the event that occurs at the current time is the network media event, determine the enjoyment experience score of the VR multimedia based on the second sensory parameter corresponding to the current time, the currently determined fidelity experience score, and a MOS of the VR multimedia at an end of a previous unit time period, and set the interaction experience score of the VR multimedia to an initial value, or the determining subunit is further configured to, where if the event that occurs at the current time is the interactive media event, determine the interaction experience score of the VR multimedia based on the third sensory parameter corresponding to the current time, and set the enjoyment experience score of the VR multimedia to an initial value.

Optionally, the first determining unit 10021 includes a determining subunit configured to, if a current time reaches a sampling time of the first sensory parameter of the VR multimedia, and a network media event and an interactive media event occur at the current time, determine the fidelity experience score of the VR multimedia based on the first sensory parameter corresponding to the current time, determine the enjoyment experience score of the VR multimedia based on the second sensory parameter corresponding to the current time, the currently determined fidelity experience score, and a MOS of the VR multimedia at an end of a previous unit time period, and determine the interaction experience score of the VR multimedia based on the third sensory parameter corresponding to the current time.

Optionally, the first determining unit 10021 includes a determining subunit configured to, if a current time does not reach a sampling time of the first sensory parameter of the VR multimedia, and a network media event occurs at the current time but no interactive media event occurs at the same time, and it is detected at the current time that the network media event is ended or that a unit time period is ended, determine the enjoyment experience score of the VR multimedia based on the second sensory parameter corresponding to the current time, a fidelity experience score recently determined before the current time, and a MOS of the VR multimedia at an end of a previous unit time period, and set the interaction experience score of the VR multimedia to an initial value, where the determining subunit is further configured to if the current time does not reach a sampling time of the first sensory parameter of the VR multimedia, and an interactive media event occurs at the current time but no network media event occurs at the same time, and it is detected at the current time that the interactive media event is ended or that the unit time period is ended, determine the interaction experience score of the VR multimedia based on the third sensory parameter corresponding to the current time, and set the enjoyment experience score of the VR multimedia to an initial value, or the determining subunit is further configured to, if the current time does not reach a sampling time of the first sensory parameter of the VR multimedia, and a network media event and an interactive media event occur at the current time, and it is detected at the current time that the unit time period is ended, or if the current time does not reach a sampling time of the first sensory parameter of the VR multimedia, and a network media event and an interactive media event occur at the current time, and it is detected at the current time that the network media event and/or the interactive media event are/is ended and it is not detected that the unit time period is ended, determine the enjoyment experience score of the VR multimedia based on the second sensory parameter corresponding to the current time, a fidelity experience score recently determined before the current time in the current unit time period, and a MOS of the VR multimedia at an end of a previous unit time period, and determine the interaction experience score of the VR multimedia based on the third sensory parameter corresponding to the current time, and correspondingly, the first calculation unit 10022 is further configured to use the fidelity experience score recently determined before the current time in the current unit time period, and the enjoyment experience score and the interaction experience score that are determined at the current time, as the input parameters to calculate the MOS of the VR multimedia using the preset VR multimedia MOS calculation model.

Optionally, the first sensory parameter includes video attribute information and a video parameter in the visual dimension, and audio attribute information and an audio parameter in the acoustic dimension, and the determining subunit is further configured to select, from a plurality of stored visual fidelity experience score calculation models, a visual fidelity experience score calculation model corresponding to the video attribute information included in the first sensory parameter corresponding to the current time, use the video parameter included in the first sensory parameter corresponding to the current time, as an input parameter to calculate a visual fidelity experience score at the current time using the selected visual fidelity experience score calculation model, select, from a plurality of stored acoustic fidelity experience score calculation models, an acoustic fidelity experience score calculation model corresponding to the audio attribute information included in the first sensory parameter corresponding to the current time, use the audio parameter included in the first sensory parameter of the current time, as an input parameter to calculate an acoustic fidelity experience score at the current time using the selected acoustic fidelity experience score calculation model, and determine the fidelity experience score of the VR multimedia based on the visual fidelity experience score and the acoustic fidelity experience score at the current time.

Optionally, the second sensory parameter includes a type of a network media event and a third duration, and the third duration is a duration of the network media event in a unit time period, and the determining subunit is further configured to, when the type of the network media event included in the second sensory parameter corresponding to the current time is a play event, use the third duration included in the second sensory parameter corresponding to the current time, the currently determined fidelity experience score, and the MOS of the VR multimedia at the end of the previous unit time period as input parameters to calculate the enjoyment experience score of the VR multimedia using an enjoyment experience score calculation model corresponding to the play event, when the type of the network media event included in the second sensory parameter corresponding to the current time is a freeze event, use the third duration included in the second sensory parameter corresponding to the current time, the currently determined fidelity experience score, and the MOS of the VR multimedia at the end of the previous unit time period as input parameters to calculate the enjoyment experience score of the VR multimedia using an enjoyment experience score calculation model corresponding to the freeze event, or when the type of the network media event included in the second sensory parameter corresponding to the current time is a media quality change event, determine a difference between the currently determined fidelity experience score and a fidelity experience score recently determined before the current time in a current unit time period, as the enjoyment experience score of the VR multimedia.

Optionally, the third sensory parameter includes a type of an interactive media event and a fourth duration, and the fourth duration is a duration of the interactive media event in the unit time period, and the determining subunit is further configured to select, from a plurality of stored interaction experience score calculation models, an interaction experience score calculation model corresponding to the type of the interactive media event included in the third sensory parameter corresponding to the current time, and use the type of the interactive media event and the fourth duration included in the third sensory parameter corresponding to the current time, as input parameters to calculate the interaction experience score of the VR multimedia using the selected interaction experience score calculation model.

Figure 10C:
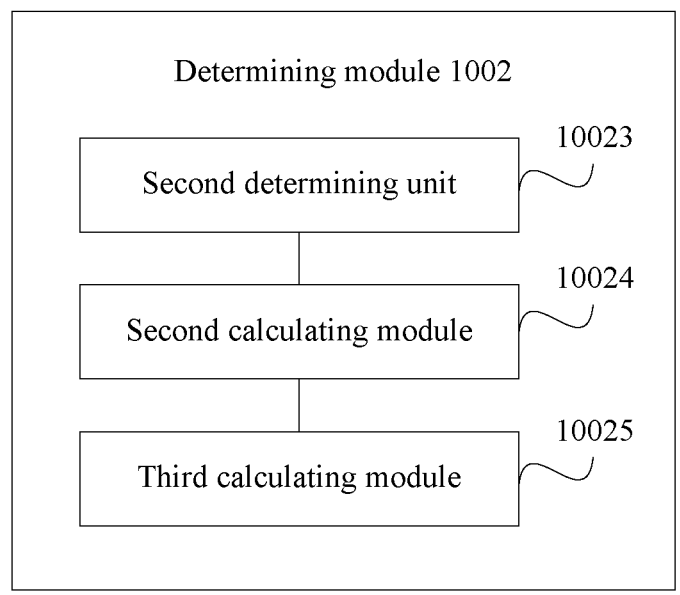
FIG. 10C is another schematic structural diagram of a determining module according to an embodiment of the present disclosure.

Optionally, referring to FIG. 10C, the determining module 1002 includes a second determining unit 10023 configured to, for each of the at least two perceptual dimensions, determine a fidelity experience score, an enjoyment experience score, and an interaction experience score of the VR multimedia in the perceptual dimension based on parameters that are obtained by performing sampling according to the perceptual dimension in the first sensory parameter, the second sensory parameter, and the third sensory parameter of the VR multimedia, a second calculation unit 10024 configured to use the fidelity experience score, the enjoyment experience score, and the interaction experience score of the VR multimedia in the perceptual dimension as input parameters to calculate an experience score of the VR multimedia in the perceptual dimension using a preset VR multimedia experience score calculation model in the perceptual dimension, and a third calculation unit 10025 configured to use experience scores of the VR multimedia in the at least two perceptual dimensions as input parameters to calculate an experience score of the VR multimedia using a preset VR multimedia MOS calculation model.

Optionally, the second determining unit 10023 includes a determining subunit configured to, if a current time reaches a sampling time of the first sensory parameter of the VR multimedia, and a network media event or an interactive media event occurs at the current time, determine the fidelity experience score of the VR multimedia in the perceptual dimension based on a parameter that is obtained by performing sampling according to the perceptual dimension in the first sensory parameter corresponding to the current time, where the determining subunit is further configured to, if the event that occurs at the current time is the network media event, determine the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous network media event, and set the interaction experience score of the VR multimedia in the perceptual dimension to an initial value, or the determining subunit is further configured to, if the event that occurs at the current time is the interactive media event, determine the interaction experience score of the VR multimedia in the perceptual dimension based on a parameter that is obtained by performing sampling according to the perceptual dimension in the third sensory parameter corresponding to the current time, and set the enjoyment experience score of the VR multimedia in the perceptual dimension to an initial value.

Optionally, the second determining unit 10023 includes a determining subunit configured to, if a current time reaches a sampling time of the first sensory parameter of the VR multimedia, and a network media event and an interactive media event occur at the current time, determine the fidelity experience score of the VR multimedia in the perceptual dimension based on a parameter that is obtained by performing sampling according to the perceptual dimension in the first sensory parameter corresponding to the current time, determine the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous network media event, and determine the interaction experience score of the VR multimedia based on a parameter that is obtained by performing sampling according to the perceptual dimension in the third sensory parameter corresponding to the current time.

Optionally, the second determining unit 10023 includes a determining subunit configured to, if a current time does not reach a sampling time of the first sensory parameter of the VR multimedia, and a network media event occurs at the current time but no interactive media event occurs at the same time, and it is detected at the current time that the network media event is ended, determine the enjoyment experience score of the VR multimedia in the perceptual dimension based on a parameter that is obtained by performing sampling according to the perceptual dimension in the second sensory parameter corresponding to the current time, a fidelity experience score in the perceptual dimension that is recently determined before the current time, and a MOS of the VR multimedia at an end of a previous network media event, and set the interaction experience score of the VR multimedia in the perceptual dimension to an initial value, where the determining subunit is further configured to if the current time does not reach a sampling time of the first sensory parameter of the VR multimedia, and an interactive media event occurs at the current time but no network media event occurs at the same time, and it is detected at the current time that the interactive media event is ended, determine the interaction experience score of the VR multimedia in the perceptual dimension based on a parameter that is obtained by performing sampling according to the perceptual dimension in the third sensory parameter corresponding to the current time, and set the enjoyment experience score of the VR multimedia in the perceptual dimension to an initial value, or the determining subunit is further configured to if the current time does not reach a sampling time of the first sensory parameter of the VR multimedia, and a network media event and an interactive media event occur at the current time, and it is detected at the current time that the network media event and/or the interactive media event are/is ended, determine the enjoyment experience score of the VR multimedia in the perceptual dimension based on a parameter that is obtained by performing sampling according to the perceptual dimension in the second sensory parameter corresponding to the current time, a fidelity experience score in the perceptual dimension that is recently determined before the current time, and a MOS of the VR multimedia at an end of a previous network media event, and determine the interaction experience score of the VR multimedia in the perceptual dimension based on a parameter that is obtained by performing sampling according to the perceptual dimension in the third sensory parameter corresponding to the current time, and correspondingly, the second calculation unit 10024 is further configured to use the fidelity experience score in the perceptual dimension that is recently determined before the current time, and the enjoyment experience score and the interaction experience score in the perceptual dimension that are determined at the current time, as the input parameters to calculate the experience score of the VR multimedia in the perceptual dimension using the preset VR multimedia experience score calculation model in the perceptual dimension.

Optionally, the second determining unit 10023 includes a determining subunit configured to, if a current time reaches a sampling time of the first sensory parameter of the VR multimedia, and a network media event or an interactive media event occurs at the current time, determine the fidelity experience score of the VR multimedia in the perceptual dimension based on a parameter that is obtained by performing sampling according to the perceptual dimension in the first sensory parameter corresponding to the current time, where the determining subunit is further configured to, if the event that occurs at the current time is the network media event, determine the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous unit time period, and set the interaction experience score of the VR multimedia in the perceptual dimension to an initial value, or the determining subunit is further configured to if the event that occurs at the current time is the interactive media event, determine the interaction experience score of the VR multimedia in the perceptual dimension based on a parameter that is obtained by performing sampling according to the perceptual dimension in the third sensory parameter corresponding to the current time, and set the enjoyment experience score of the VR multimedia in the perceptual dimension to an initial value.

Optionally, the second determining unit 10023 includes a determining subunit configured to, if a current time reaches a sampling time of the first sensory parameter of the VR multimedia, and a network media event and an interactive media event occur at the current time, determine the fidelity experience score of the VR multimedia in the perceptual dimension based on a parameter that is obtained by performing sampling according to the perceptual dimension in the first sensory parameter corresponding to the current time, determine the enjoyment experience score of the VR multimedia in the perceptual dimension based on a parameter that is obtained by performing sampling according to the perceptual dimension in the second sensory parameter corresponding to the current time, the currently determined fidelity experience score in the perceptual dimension, and a MOS of the VR multimedia at an end of a previous unit time period, and determine the interaction experience score of the VR multimedia based on a parameter that is obtained by performing sampling according to the perceptual dimension in the third sensory parameter corresponding to the current time.

Optionally, the second determining unit 10023 includes a determining subunit configured to, if a current time does not reach a sampling time of the first sensory parameter of the VR multimedia, and a network media event occurs at the current time but no interactive media event occurs at the same time, and it is detected at the current time that the network media event is ended or that a unit time period is ended, determine the enjoyment experience score of the VR multimedia in the perceptual dimension based on a parameter that is obtained by performing sampling according to the perceptual dimension in the second sensory parameter corresponding to the current time, a fidelity experience score recently determined before the current time, and a MOS of the VR multimedia at an end of a previous unit time period, and set the interaction experience score of the VR multimedia in the perceptual dimension to an initial value, where the determining subunit is further configured to if the current time does not reach a sampling time of the first sensory parameter of the VR multimedia, and an interactive media event occurs at the current time but no network media event occurs at the same time, and it is detected at the current time that the interactive media event is ended or that the unit time period is ended, determine the interaction experience score of the VR multimedia in the perceptual dimension based on a parameter that is obtained by performing sampling according to the perceptual dimension in the third sensory parameter corresponding to the current time, and set the enjoyment experience score of the VR multimedia in the perceptual dimension to an initial value, or the determining subunit is further configured to, if the current time does not reach a sampling time of the first sensory parameter of the VR multimedia, and a network media event and an interactive media event occur at the current time, and it is detected at the current time that the unit time period is ended, or if the current time does not reach a sampling time of the first sensory parameter of the VR multimedia, and a network media event and an interactive media event occur at the current time, and it is detected at the current time that the network media event and/or the interactive media event are/is ended and it is not detected that the unit time period is ended, determine the enjoyment experience score of the VR multimedia in the perceptual dimension based on a parameter that is obtained by performing sampling according to the perceptual dimension in the second sensory parameter corresponding to the current time, a fidelity experience score in the perceptual dimension that is recently determined before the current time in the current unit time period, and a MOS of the VR multimedia at an end of a previous unit time period, and determine the interaction experience score of the VR multimedia in the perceptual dimension based on a parameter that is obtained by performing sampling according to the perceptual dimension in the third sensory parameter corresponding to the current time, and correspondingly, the second calculation unit 10024 is further configured to use the fidelity experience score in the perceptual dimension that is recently determined before the current time in the current unit time period, and the enjoyment experience score and the interaction experience score in the perceptual dimension that are determined at the current time, as the input parameters to calculate the experience score of the VR multimedia in the perceptual dimension using the preset VR multimedia experience score calculation model in the perceptual dimension.

Optionally, the video attribute information in the visual dimension in the first sensory parameter includes at least one of a projection format, a stereo degree, and a degree of freedom, the video parameter in the visual dimension in the first sensory parameter includes at least one of a full view resolution and a field of view, and the audio attribute information in the acoustic dimension in the first sensory parameter includes an audio stereo degree.

Optionally, the second sensory parameter includes a type of a network media event and a corresponding duration, and the corresponding duration is a duration of the network media event.

Optionally, the type of the network media event included in the second sensory parameter includes a play event, a freeze event, or a media quality change event.

Optionally, the third sensory parameter includes a type of an interactive media event and a corresponding duration, and the corresponding duration is a duration of the interactive media event.

Optionally, the type of the interactive media event included in the third sensory parameter includes an initial loading event, an interactive loading event, or a media hysteresis event, the initial loading event is a loading event that occurs when the VR multimedia is initially played, the interactive loading event is a loading event that occurs due to interaction between the VR multimedia and a user, and the media hysteresis event is a hysteresis event that occurs between a media update and an action due to a user action.

Optionally, the at least two perceptual dimensions further include a feedback dimension, and the feedback dimension is a synchronization and association relationship between the visual dimension and another dimension than the visual dimension in the at least two perceptual dimensions, where a parameter that is obtained by performing sampling according to the feedback dimension in the first sensory parameter includes at least one of a time synchronization degree, an azimuth synchronization degree, and a force feedback indicator, the time synchronization degree is a time synchronization degree between the visual dimension and the acoustic dimension, the azimuth synchronization degree is an azimuth synchronization degree between the visual dimension and the acoustic dimension, and the force feedback indicator is used to indicate whether there is a force feedback matching the visual dimension, a parameter that is obtained by performing sampling according to the feedback dimension in the second sensory parameter includes at least one of a first synchronization degree change indicator, a second synchronization degree change indicator, and a third synchronization degree change indicator, the first synchronization degree change indicator is used to indicate whether the time synchronization degree changes, the second synchronization degree change indicator is used to indicate whether the azimuth synchronization degree changes, and the third synchronization degree change indicator is used to indicate whether a time synchronization degree between the visual dimension and the force feedback changes, and a parameter that is obtained by performing sampling according to the feedback dimension in the third sensory parameter includes a hysteresis indicator, and the hysteresis indicator is used to indicate whether a hysteresis event occurs between the force feedback and an action.

Optionally, the apparatus further includes a third determining unit configured to determine a mean value of all MOSs of the VR multimedia that are obtained through calculation within a preset test duration, where the preset test duration is a duration of determining experience quality of the VR multimedia.

Optionally, the apparatus further includes a fourth determining unit configured to determine a mean square error of all the MOSs of the VR multimedia that are obtained through calculation within the preset test duration, where the mean square error is used to indicate stability of all the MOSs of the VR multimedia.

In conclusion, interaction experience quality evaluation is added to a process of determining the experience quality of the VR multimedia by the terminal in this embodiment of the present disclosure, but interaction with the user is exactly a main feature that distinguishes the VR multimedia from conventional media. Therefore, determining the experience quality of the VR multimedia in this embodiment of the present disclosure better complies with an actual situation of the VR multimedia, and the determined experience quality of the VR multimedia is also more accurate. In addition, in this embodiment of the present disclosure, when the fidelity experience score is determined, influence of distinctive parameters of the VR multimedia such as a field of view, a projection format, a stereo degree, a degree of freedom, and a spatial sound on fidelity experience is considered. Therefore, the fidelity experience score determined based on this is also more accurate. It should also be noted that, in this embodiment of the present disclosure, determining of the enjoyment experience score is not only related to a current event or a parameter in a unit event period, but also related to a previous MOS of the VR multimedia. This is equivalent to considering influence of previous play of the VR multimedia. Therefore, the determined enjoyment experience score is more comprehensive and more accurate.

It should be noted that, when the apparatus for determining experience quality of VR multimedia according to the foregoing embodiment determines experience quality of VR multimedia, division of the foregoing functional modules is described as only an example. In actual applications, the foregoing functions may be allocated to different functional modules for completion according to requirements, that is, an internal structure of the device is divided into different functional modules for implementing all or some of the foregoing functions. In addition, the apparatus for determining experience quality of VR multimedia according to the foregoing embodiment and the embodiment of the method for determining experience quality of VR multimedia belong to the same idea. For a specific implementation process thereof, refer to the method embodiment. Details are not described again herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of the present disclosure are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method, performed by a terminal, for determining experience quality of virtual reality (VR) multimedia, wherein the method comprises:
   performing sampling according to at least one perceptual dimension to obtain a first sensory parameter and a second sensory parameter of the VR multimedia played on the terminal, wherein the at least one perceptual dimension comprises a visual dimension;
   performing sampling by the terminal according to at least two perceptual dimensions to obtain a third sensory parameter of the VR multimedia, wherein the at least two perceptual dimensions comprise the visual dimension and a feedback dimension; and
   determining a mean opinion score (MOS) of the VR multimedia based on the first sensory parameter, the second sensory parameter, and the third sensory parameter.

2. The method of claim 1, wherein the first sensory parameter is obtained by performing sampling according to the at least two perceptual dimensions.

3. The method of claim 1, wherein the first sensory parameter affects fidelity experience, wherein the second sensory parameter affects enjoyment experience, and wherein the third sensory parameter affects interaction experience.

4. The method of claim 1, further comprising:
   determining a fidelity experience score, an enjoyment experience score, and an interaction experience score of the VR multimedia based on the first sensory parameter, the second sensory parameter, and the third sensory parameter; and
   setting the fidelity experience score, the enjoyment experience score, and the interaction experience score as first input parameters to calculate a MOS.

5. The method of claim 4, further comprising setting the fidelity experience score, the enjoyment experience score, and the interaction experience score as first input parameters to calculate the MOS using a preset VR multimedia MOS calculation model.

6. The method of claim 4, further comprising:
   determining the fidelity experience score based on the first sensory parameter corresponding to a current time when the current time reaches a sampling time of the first sensory parameter and a network media event or an interactive media event occurs at the current time, wherein the network media event occurs due to a change of a network condition, and wherein the interactive media event occurs due to interaction with a user;
   determining the enjoyment experience score based on the second sensory parameter corresponding to the current time, the fidelity experience score, and a previous MOS at an end of a previous network media event and setting the interaction experience score to a first initial value when an event that occurs at the current time is the network media event; and
   determining the interaction experience score based on the third sensory parameter corresponding to the current time, and setting the enjoyment experience score to a second initial value when the event that occurs at the current time is the interactive media event.

7. The method of claim 4, further comprising:
   determining a current time reaches a sampling time of the first sensory parameter;
   determining a network media event and an interactive media event occur at the current time;
   determining the fidelity experience score based on the first sensory parameter corresponding to the current time;
   determining the enjoyment experience score based on the second sensory parameter corresponding to the current time, the fidelity experience score, and a previous MOS at an end of a previous network media event; and
   determining the interaction experience score based on the third sensory parameter corresponding to the current time.

8. The method of claim 4, further comprising:
   determining the enjoyment experience score based on the second sensory parameter corresponding to a current time, a first fidelity experience score determined before the current time, and a previous MOS at an end of a previous network media event and setting the interaction experience score to a first initial value when the current time does not reach a first sampling time of the first sensory parameter, a network media event occurs at the current time and an interactive media event does not occur at the same time, and the network media event ends at the current time;
   determining the interaction experience score based on the third sensory parameter corresponding to the current time, and setting the enjoyment experience score to a second initial value when the current time does not reach the first sampling time, the interactive media event occurs at the current time and the network media event does not occur at the same time, and the interactive media event ends at the current time;
   determining the enjoyment experience score based on the second sensory parameter corresponding to the current time, the first fidelity experience score, and the previous MOS;
   determining the interaction experience score based on the third sensory parameter corresponding to the current time when the current time does not reach the first sampling time, the network media event and the interactive media event occur at the current time, and the network media event or the interactive media event ends at the current time; and
   setting the first fidelity experience score, the enjoyment experience score, and the interaction experience score as the first input parameters to calculate the MOS using the preset VR multimedia MOS calculation model.

9. The method of claim 6, wherein the second sensory parameter comprises a type of the network media event and a first duration, wherein the first duration is of the network media event, and wherein the method further comprises:
   setting the first duration, the fidelity experience score, and the previous MOS as second input parameters to calculate the enjoyment experience score using an enjoyment experience score calculation model corresponding to a play event when the type of the network media event is the play event;

setting the first duration, the fidelity experience score, and the previous MOS as third input parameters to calculate the enjoyment experience score using an enjoyment experience score calculation model corresponding to a freeze event when the type of the network media event is the freeze event; and setting a difference between the fidelity experience score and a fidelity experience score determined before the current time as the enjoyment experience score when the type of the network media event is a media quality change event.

10. The method of claim 7, wherein the third sensory parameter comprises a type of the interactive media event and a second duration, wherein the second duration is of the interactive media event, and wherein the method further comprises:

selecting, from a plurality of stored interaction experience score calculation models, an interaction experience score calculation model corresponding to the type of the interactive media event; and setting the type of the interactive media event and the second duration as fourth input parameters to calculate the interaction experience score using the interaction experience score calculation model.

11. The method of claim 4, further comprising:

determining the fidelity experience score based on the first sensory parameter corresponding to a current time when the current time reaches a sampling time of the first sensory parameter and when a network media event or an interactive media event occurs at the current time;

determining the enjoyment experience score based on the second sensory parameter corresponding to the current time, the fidelity experience score, and a previous MOS at an end of a previous unit time period and setting the interaction experience score to a first initial value when an event that occurs at the current time is the network media event; and determining the interaction experience score based on the third sensory parameter corresponding to the current time and setting the enjoyment experience score to a second initial value when the event that occurs at the current time is the interactive media event.

12. The method of claim 4, further comprising:

determining that a current time reaches a sampling time of the first sensory parameter and that a network media event and an interactive media event occur at the current time;

determining the fidelity experience score based on the first sensory parameter corresponding to the current time;

determining the enjoyment experience score based on the second sensory parameter corresponding to the current time, the fidelity experience score, and a previous MOS at an end of a previous unit time period; and determining the interaction experience score based on the third sensory parameter corresponding to the current time.

13. The method of claim 4, further comprising:

determining the enjoyment experience score based on the second sensory parameter corresponding to a current time, a fidelity experience score determined before the current time, and a previous MOS at an end of a previous unit time period;

setting the interaction experience score to a first initial value when the current time does not reach a first sampling time of the first sensory parameter, a network media event occurs at the current time, and an interactive media event does not occur at the same time, and the network media event ends or a unit time period ends at the current time;

determining the interaction experience score based on the third sensory parameter corresponding to the current time;

setting the enjoyment experience score to a second initial value when the current time does not reach the first sampling time, the interactive media event occurs at the current time and the network media event does not occur at the same time, and the interactive media event ends or the unit time period ends at the current time;

determining the enjoyment experience score based on the second sensory parameter corresponding to the current time, a fidelity experience score determined before the current time in a current unit time period, and the previous MOS, and determining the interaction experience score based on the third sensory parameter corresponding to the current time when the current time does not reach the first sampling time, the network media event and the interactive media event occur at the current time, and the unit time period ends at the current time or when the current time does not reach the first sampling time, the network media event and the interactive media event occur at the current time, and the network media event or the interactive media event ends at the current time and the unit time period ends; and setting the fidelity experience score determined before the current time in the current unit time period and the enjoyment experience score and the interaction experience score determined at the current time as fifth input parameters to calculate the MOS using the preset VR multimedia MOS calculation model.

14. The method of claim 6, wherein the first sensory parameter comprises video attribute information and a video parameter in the visual dimension, and audio attribute information and an audio parameter in the acoustic dimension, and wherein the method further comprises:

selecting, from a plurality of stored visual fidelity experience score calculation models, a visual fidelity experience score calculation model corresponding to the video attribute information;

setting the video parameter as a sixth input parameter to calculate a visual fidelity experience score at the current time using the visual fidelity experience score calculation model;

selecting, from a plurality of stored acoustic fidelity experience score calculation models, an acoustic fidelity experience score calculation model corresponding to the audio attribute information;

setting the audio parameter as a seventh input parameter to calculate an acoustic fidelity experience score at the current time using the acoustic fidelity experience score calculation model; and determining the fidelity experience score based on the visual fidelity experience score and the acoustic fidelity experience score at the current time.

15. The method of claim 11, wherein the second sensory parameter comprises a type of the network media event and a third duration, wherein the third duration is of the network media event in a unit time period, and wherein the method further comprises:

setting the third duration, the fidelity experience score, and the previous MOS as eighth input parameters to calculate the enjoyment experience score using an enjoyment experience score calculation model corresponding to a play event when the type of the network media event is the play event;

setting the third duration, the fidelity experience score, and the previous MOS as ninth input parameters to calculate the enjoyment experience score using an enjoyment experience score calculation model corresponding to a freeze event when the type of the network media event is the freeze event; and determining a difference between the fidelity experience score and a previous fidelity experience score determined before the current time in a current unit time period as the enjoyment experience score when the type of the network media event is a media quality change event.

16. The method of claim 12, wherein the third sensory parameter comprises a type of the interactive media event and a fourth duration, wherein the fourth duration is of the interactive media event in a unit time period, and wherein the method further comprises:

selecting, from a plurality of stored interaction experience score calculation models, an interaction experience score calculation model corresponding to the type of the interactive media event; and setting the type of the interactive media event and the fourth duration as tenth input parameters to calculate the interaction experience score using the interaction experience score calculation model.

17. The method of claim 1, further comprising:

determining, for each of the at least two perceptual dimensions, a fidelity experience score, an enjoyment experience score, and an interaction experience score of the VR multimedia in a perceptual dimension based on parameters obtained by performing sampling according to the perceptual dimension in the first sensory parameter, the second sensory parameter, and the third sensory parameter;

setting the fidelity experience score, the enjoyment experience score, and the interaction experience score as eleventh input parameters to calculate a first experience score of the VR multimedia in the perceptual dimension using a preset VR multimedia experience score calculation model in the perceptual dimension; and setting experience scores of the VR multimedia in the at least two perceptual dimensions as twelfth input parameters to calculate a second experience score of the VR multimedia using a preset VR multimedia MOS calculation model.

18. The method of claim 17, further comprising:

determining the fidelity experience score based on a first parameter obtained by performing sampling according to the perceptual dimension in the first sensory parameter corresponding to a current time when the current time reaches a sampling time of the first sensory parameter and a network media event or an interactive media event occurs at the current time;

determining the enjoyment experience score based on a second parameter obtained by performing sampling according to the perceptual dimension in the second sensory parameter corresponding to the current time, the fidelity experience score, and a previous MOS of the VR multimedia at an end of a previous network media event;

setting the interaction experience score to a first initial value when an event that occurs at the current time is the network media event;

determining the interaction experience score based on a third parameter obtained by performing sampling according to the perceptual dimension in the third sensory parameter corresponding to the current time; and setting the enjoyment experience score to a second initial value when the event that occurs at the current time is the interactive media event.

19. The method of claim 17, further comprising:

determining a current time reaches a sampling time of the first sensory parameter, and a network media event and an interactive media event occur at the current time;

determining the fidelity experience score based on a first parameter obtained by performing sampling according to the perceptual dimension in the first sensory parameter corresponding to the current time;

determining the enjoyment experience score based on a second parameter obtained by performing sampling according to the perceptual dimension in the second sensory parameter corresponding to the current time, the fidelity experience score, and a previous MOS of the VR multimedia at an end of a previous network media event; and determining the interaction experience score based on a third parameter obtained by performing sampling according to the perceptual dimension in the third sensory parameter corresponding to the current time.

20. The method of claim 17, further comprising:

determining the enjoyment experience score based on a first parameter obtained by performing sampling according to the perceptual dimension in the second sensory parameter corresponding to a current time, a first fidelity experience score in the perceptual dimension that is determined before the current time, and a previous MOS of the VR multimedia at an end of a previous network media event;

setting the interaction experience score to a first initial value when the current time does not reach a sampling time of the first sensory parameter, a network media event occurs at the current time and an interactive media event does not occur at the same time, and at the current time, the network media event ends;

determining the interaction experience score based on a second parameter obtained by performing sampling according to the perceptual dimension in the third sensory parameter corresponding to the current time;

setting the enjoyment experience score to a second initial value when the current time does not reach the sampling time, the interactive media event occurs at the current time and the network media event does not occur at the same time, and at the current time, the interactive media event ends;

determining the enjoyment experience score based on a third parameter obtained by performing sampling according to the perceptual dimension in the second sensory parameter corresponding to the current time, the first fidelity experience score, and the previous MOS;

determining the interaction experience score based on a fourth parameter obtained by performing sampling according to the perceptual dimension in the third sensory parameter corresponding to the current time when the current time does not reach the sampling time, the network media event and the interactive media event occur at the current time, and at the current time the network media event or the interactive media event ends; and setting the first fidelity experience score and the enjoyment experience score and the interaction experience score in the perceptual dimension that are determined at the current time as the eleventh input parameters to calculate the first experience score.

21. The method of claim 17, further comprising:
determining the fidelity experience score based on a first parameter obtained by performing sampling according to the perceptual dimension in the first sensory parameter corresponding to a current time when the current time reaches a sampling time of the first sensory parameter, and a network media event or an interactive media event occurs at the current time;
determining the enjoyment experience score based on a second parameter obtained by performing sampling according to the perceptual dimension in the second sensory parameter corresponding to the current time, the fidelity experience score, and a previous MOS of the VR multimedia at an end of a previous unit time period;
setting the interaction experience score to a first initial value when an event that occurs at the current time is the network media event;
determining the interaction experience score based on a third parameter obtained by performing sampling according to the perceptual dimension in the third sensory parameter corresponding to the current time; and
setting the enjoyment experience score to a second initial value when the event that occurs at the current time is the interactive media event.

22. The method of claim 17, further comprising:
determining that a current time reaches a sampling time of the first sensory parameter and a network media event and an interactive media event occur at the current time;
determining the fidelity experience score based on a first parameter obtained by performing sampling according to the perceptual dimension in the first sensory parameter corresponding to the current time;
determining the enjoyment experience score based on a second parameter obtained by performing sampling according to the perceptual dimension in the second sensory parameter corresponding to the current time, the fidelity experience score, and a previous MOS of the VR multimedia at an end of a previous unit time period; and
determining the interaction experience score based on a third parameter obtained by performing sampling according to the perceptual dimension in the third sensory parameter corresponding to the current time.

23. The method of claim 17, further comprising:
determining the enjoyment experience score based on a first parameter obtained by performing sampling according to the perceptual dimension in the second sensory parameter corresponding to a current time, a first fidelity experience score determined before the current time, and a previous MOS of the VR multimedia at an end of a previous unit time period;
setting the interaction experience score to a first initial value when the current time does not reach a sampling time of the first sensory parameter, a network media event occurs at the current time and an interactive media event does not occur at the same time, and at the current time the network media event ends or a unit time period ends;
determining the interaction experience score based on a second parameter obtained by performing sampling according to the perceptual dimension in the third sensory parameter corresponding to the current time;
setting the enjoyment experience score to a second initial value when the current time does not reach the sampling time, the interactive media event occurs at the current time and the network media event does not occur at the same time, and at the current time the interactive media event ends or the unit time period ends;
determining the enjoyment experience score based on a third parameter obtained by performing sampling according to the perceptual dimension in the second sensory parameter corresponding to the current time, a second fidelity experience score in the perceptual dimension determined before the current time in a current unit time period, and the previous MOS;
determining the interaction experience score based on a fourth parameter obtained by performing sampling according to the perceptual dimension in the third sensory parameter corresponding to the current time when the current time does not reach the sampling time, the network media event and the interactive media event occur at the current time, and it is detected, at the current time, that the unit time period ends or when the current time does not reach the sampling time, the network media event and the interactive media event occur at the current time, and it is detected, at the current time, that the network media event or the interactive media event ends and it is not detected that the unit time period ends; and
setting the second fidelity experience score and the enjoyment experience score and the interaction experience score determined at the current time as the eleventh input parameters to calculate the first experience score.

24. The method of claim 1, wherein the video attribute information comprises at least one of a projection format, a stereo degree, or a degree of freedom, wherein the video parameter comprises at least one of a full view resolution or a field of view, and wherein the audio attribute information comprises an audio stereo degree.

25. The method of claim 1, wherein the second sensory parameter comprises a type of a network media event and a corresponding duration of the network media event.

26. The method of claim 25, wherein the type of the network media event comprises a play event, a freeze event, or a media quality change event.

27. The method of claim 1, wherein the third sensory parameter comprises a type of an interactive media event and a corresponding duration of the interactive media event.

28. The method of claim 10, wherein the type of the interactive media event comprises an initial loading event, an interactive loading event, or a media hysteresis event, wherein the initial loading event occurs when the VR multimedia is initially played, wherein the interactive loading event occurs due to interaction between the VR multimedia and a user, and wherein the media hysteresis event occurs between a media update and an action due to a user action.

29. The method of claim 1, wherein the at least two perceptual dimensions further comprise a feedback dimension comprising a synchronization and association relationship between the visual dimension and another dimension other than the visual dimension in the at least two perceptual dimensions, wherein a first parameter obtained by performing sampling according to the feedback dimension in the first sensory parameter comprises at least one of a time synchronization degree, an azimuth synchronization degree, or a force feedback indicator, wherein the time synchronization degree is between the visual dimension and the acoustic dimension, wherein the azimuth synchronization degree is between the visual dimension and the acoustic dimension, wherein the force feedback indicator indicates whether there is a force feedback matching the visual dimension, wherein a second parameter obtained by performing sampling according to the feedback dimension in the second sensory parameter comprises at least one of a first synchronization degree change indicator, a second synchronization degree change indicator, or a third synchronization degree change indicator, wherein the first synchronization degree change indicator indicates whether the time synchronization degree changes, wherein the second synchronization degree change indicator indicates whether the azimuth synchronization degree changes, wherein the third synchronization degree change indicator indicates whether a time synchronization degree between the visual dimension and the force feedback changes, wherein a third parameter obtained by performing sampling according to the feedback dimension in the third sensory parameter comprises a hysteresis indicator, and wherein the hysteresis indicator indicates whether a hysteresis event occurs between the force feedback and an action.

30. The method of claim 1, further comprising determining a mean value of all MOSs of the VR multimedia obtained through calculation within a preset test duration of determining experience quality of the VR multimedia.

31. The method of claim 1, further comprising determining a mean square error of all MOSs of the VR multimedia obtained through calculation within a preset test duration, wherein the mean square error indicates stability of the MOSs of the VR multimedia.

32. A terminal for determining experience quality of virtual reality (VR) multimedia, wherein the terminal comprises:
  a non-transitory computer readable medium comprising computer-executable instructions; and
  a processor coupled to the non-transitory computer readable medium and configured to execute the computer-executable instructions to cause the terminal to:
    perform sampling according to at least one perceptual dimension to obtain a first sensory parameter and a second sensory parameter of VR multimedia played on the terminal, wherein the at least one perceptual dimension comprises a visual dimension;
    perform sampling by the terminal according to at least two perceptual dimensions to obtain a third sensory parameter of the VR multimedia played on the terminal, wherein the at least two perceptual dimensions comprise the visual dimension and a feedback dimension; and
    determine a MOS of the VR multimedia based on the first sensory parameter, the second sensory parameter, and the third sensory parameter.

* * * * *